(12) United States Patent
Ramos et al.

(10) Patent No.: US 12,529,108 B2
(45) Date of Patent: Jan. 20, 2026

(54) COMPOSITIONS, METHODS AND KITS FOR CHARACTERIZING AND SCREENING FOR SMALL CELL OVARIAN CARCINOMA

(71) Applicants: THE TRANSLATIONAL GENOMICS RESEARCH INSTITUTE, Phoenix, AZ (US); BRITISH COLUMBIA CANCER AGENCY BRANCH, Vancouver (CA); THE UNIVERSITY OF BRITISH COLUMBIA, Vancouver (CA)

(72) Inventors: Pilar Ramos, Phoenix, AZ (US); William Hendricks, Phoenix, AZ (US); David Craig, Phoenix, AZ (US); Jeffrey M. Trent, Phoenix, AZ (US); Anthony N. Karnezis, Vancouver (CA); David Huntsman, Vancouver (CA); Hongwei Holly Yin, Phoenix, AZ (US); Yemin Wang, Vancouver (CA)

(73) Assignees: THE TRANSLATIONAL GENOMICS RESEARCH INSTITUTE, Phoenix, AZ (US); BRITISH COLUMBIA CANCER AGENCY BRANCH, Vancouver (CA); THE UNIVERSITY OF BRITISH COLUMBIA, Vancouver (CA)

( * ) Notice: Subject to any disclaimer, the term of this patent is extended or adjusted under 35 U.S.C. 154(b) by 62 days.

(21) Appl. No.: 16/592,753

(22) Filed: Oct. 3, 2019

(65) Prior Publication Data
US 2020/0032351 A1    Jan. 30, 2020

Related U.S. Application Data

(63) Continuation of application No. 15/127,965, filed as application No. PCT/US2015/022043 on Mar. 23, 2015, now abandoned.
(Continued)

(51) Int. Cl.
*C12Q 1/6886* (2018.01)
*A61K 31/5025* (2006.01)
(Continued)

(52) U.S. Cl.
CPC ........ *C12Q 1/6886* (2013.01); *A61K 31/5025* (2013.01); *A61K 31/713* (2013.01);
(Continued)

(58) Field of Classification Search
CPC ............ C12Q 1/6886; C12Q 2600/112; C12Q 2600/118; C12Q 2600/136; C12Q 2600/156; C12Q 2600/158
See application file for complete search history.

(56) References Cited

U.S. PATENT DOCUMENTS

| | | |
|---|---|---|
| 5,882,864 A | 3/1999 | An et al. |
| 2013/0197056 A1 | 8/2013 | Huntsman et al. |
| 2016/0326596 A1 | 11/2016 | Levine et al. |

FOREIGN PATENT DOCUMENTS

| | | |
|---|---|---|
| WO | 99/47706 A1 | 9/1999 |
| WO | 2000/056931 A1 | 9/2000 |

(Continued)

OTHER PUBLICATIONS

Jones, S.J. et al. Cancer Investigation 30:481-486. (Year: 2012).*
(Continued)

*Primary Examiner* — Diana B Johannsen
(74) *Attorney, Agent, or Firm* — FULLER IP LAW LLC; Rodney J. Fuller

(57) ABSTRACT

The present invention relates compositions, methods and kits for characterizing the type of and screening for the existence or predisposition for small cell carcinoma of the ovary, hypercalcemic type (SCCOHT). The invention also
(Continued)

relates to a method of treating a mammalian subject having SCCOHT or a predisposition for SCCOHT.

9 Claims, 26 Drawing Sheets

Specification includes a Sequence Listing.

Related U.S. Application Data

(60) Provisional application No. 61/968,551, filed on Mar. 21, 2014.

(51) Int. Cl.
  A61K 31/713   (2006.01)
  A61K 38/43    (2006.01)
  A61K 45/06    (2006.01)
  C12N 15/113   (2010.01)
  A61K 48/00    (2006.01)

(52) U.S. Cl.
  CPC .............. *A61K 38/43* (2013.01); *A61K 45/06* (2013.01); *C12N 15/1137* (2013.01); *C12N 15/1138* (2013.01); *A61K 48/005* (2013.01); *C12N 2310/14* (2013.01); *C12Q 2600/156* (2013.01)

(56) References Cited

FOREIGN PATENT DOCUMENTS

WO   2008/052798 A2   5/2008
WO   2014/028595 A1   2/2014

OTHER PUBLICATIONS

VanderMolen, K.M. et al. The Journal of Antibiotics 64:525-531. (Year: 2011).*
Wilson, B.G. et al. Molecular and Cellular Biology 34(6): 1136-1144 (online Jan. 13, 2014). (Year: 2014).*
Burnett, J.C. et al. Biotechnology Journal 6:1130-1146. (Year: 2011).*
Birks, D.K. et al. Pediatric Blood Cancer 60:1095-1102 (Feb. 2013). (Year: 2013).*
Foukes, W.D. et al. Journal of Pathology 233:209-214 (May 2014). (Year: 2014).*
Reed, N. et al. Annals of Oncology 21(Supplement 5):v31-v36. (Year: 2010).*
Shigetomi, H. et al. Oncology Reports 28:395-408. (Year: 2012).*
Medina, P.P. et al. Genes, Chromosomes & Cancer 41:170-177. (Year: 2004).*
Martinez-Borges, A. R., et al. Familial small cell carcinoma of the ovary. Pediatr Blood Cancer 2009; 53(7):1334-1336.
Stephens, B., et al. Molecular Characterization of a Patient's Small Cell Carcinoma of the Ovary of the Hypercalcemic Type. J Cancer 2012; 3:58-66.
Otte, A., et al. A tumor-derived population (SCCOHT-1) as cellular model for a small cell ovarian carcinoma of the hypercalcemic type. Int J Oncol 2012; 41(2):765-775.
Ulbright, T. M., et al. Poorly differentiated (small cell) carcinoma of the ovary in young women: evidence supporting a germ cell origin. Hum Pathol 1987; 18(2):175-184.
Peccatori, F., et al. Primary ovarian small cell carcinoma: four more cases. Gynecol Oncol 1993; 49:95-99.
Lamovec, J., et al. Familial occurrence of small-cell carcinoma of the ovary. Arch Pathol Lab Med 1995; 119(6):523-527.
Longy, M., et al. Familial cluster of ovarian small cell carcinoma: a new mendelian entity? J Med Genet 1996; 33(4):333-335.
Distelmaier, F., et al. Ovarian small cell carcinoma of the hypercalcemic type in children and adolescents: a prognostically unfavorable but curable disease. Cancer 2006; 107(9):2298-2306.
Mcdonald, J. M., et al. Small cell carcinoma of the ovary of hypercalcemic type: a case report. J Pediatr Surg 2012; 47(3):588-592.
Vogelstein, B., et al. Cancer genome landscapes. Science 2013; 339(6127):1546-1558.
Roberts, C. W., et al. The SWI/SNF complex-chromatin and cancer. Nat Rev Cancer 2004; 4(2):133-142.
Hendricks, K. B., et al. Role for BRG1 in cell cycle control and tumor suppression. Mol Cell Biol 2004; 24(1):362-376.
Huether, R., et al. The landscape of somatic mutations in epigenetic regulators across 1,000 paediatric cancer genomes. Nat Commun 2014; 5:3630.
Mckenna, E. S., et al. Loss of the epigenetic tumor suppressor SNF5 leads to cancer without genomic instability. Mol Cell Biol 2008; 28(20):6223-6233.
Hasselblatt, M., et al. SMARCA4-mutated atypical teratoid/rhabdoid tumors are associated with inherited germline alterations and poor prognosis. Acta Neuropahtol 2014; 128(3):453-456.
Bultman, S., et al. A Brg1 Null Mutation in the Mouse Reveals Functional Differences among Mammalian SWI/SNF Complexes. Mol Cell 2000; 6(6):1287-1295.
Bultman, S., et al. Characterization of mammary tumors from Brg1 heterozygous mice. Oncogene 2008; 27(4):460-468.
Fruhwald, M. C., et al. Non-linkage of familial rhabdoid tumors to SMARCB1 implies a second locus for the rhabdoid tumor predisposition syndrome. Pediatr Blood Cancer 2006; 47(3):273-278.
Cohen, S. M., et al. BRG1 co-localizes with DNA replication factors and is required for efficient replication form progression. Nucleic Acids Research 2010; 38(20):6906-6919.
Wilson, B. G., et al. SWI/SNF nucleosome remodellers and cancer. Nature Reviews Cancer 2011; 11(7):481-492.
Versteege, I., et al. Truncating mutations of hSNF5/INI1 in aggressive paediatric cancer. Nature 1998; 394(6689):203-206.
Schneppenheim, R., et al. Germline Nonsense Mutation and Somatic Inactivation of SMARCA4/BRG1 in a Family with Rhabdoid Tumor Predisposition Syndrome. The American Journal of Human Genetics 2010; 86(2):279-284.
Wiegand, K. C., et al. ARID1A mutations in endometriosis-associated ovarian carcinomas. N Engl J Med 2010; 363(16):1532-1543.
Reisman, D. N., et al. The expression of the SWI/SNF ATPase subunits BRG1 and BRM in normal human tissues. Applied Immunohistocchemistry & Molecular Morphology 2005; 13(1):66-74.
Bultman, S. J., et al. Maternal BRG1 regulates zygotic genome activation in the mouse. Genes & Development 2006; 20(13):1744-1754.
Wynn, D., et al. Small cell carcinoma of the ovary with hypercalcemia causes severe pancreatitis and altered mental status. Gynecol Oncol 2004; 95(3):716-718.
Pressey, J. G., et al. Successful Treatment of Preadolescents With Small Cell Carcinoma of the Ovary Hypercalcemic Type. J Pediatr Hemmatol Oncol 2013; 35(7):566-569.
Dickersin, G. R., et al. Small cell carcinoma of the ovary with hypercalcemia: A report of eleven cases. Cancer 1982; 49(1):188-197.
Eichhorn, J. H., et al. DNA content and proliferative activity in ovarian small cell carcinomas of the hypercalcemic type. Implications for diagnosis, prognosis, and histogenesis. Am J Clin Pathol 1992; 98(6):579-586.
Abeler, V., et al. Small cell carcinoma of the ovary. A report of six cases. Int J Gynecol Pathol 1988; 7(4):315-329.
Burton, P. B., et al. Parathyroid hormone-related peptide: expression in fetal and neonatal development. J Pathol 1992; 167(3):291-296.
Matias-Guiu, X., et al. Human parathyroid hormone-related protein in ovarian small cell carcinoma. An immunohistochemical study. Cancer 1994; 73(7):1878-1881.
Chen, L., et al. Small Cell Carcinoma of the Ovary with Hypercalcemia and Ectopic Parathyroid Hormone Production. Archives of Pathology and Laboratory Medicine 2005; 129(4):531-533.

(56) References Cited

OTHER PUBLICATIONS

Tavassoeli, F. A., et al. World Health Organization classification of Tumours. Pathology and genetics of tumours of the breast and female genital organs. Lyon, IARC Press, 2003.
Sholler, G. L., et al. Advanced Small Cell Carcinoma of the Ovary in a Pediatric Patient with Long-Term Survival and Review of the Literature. J Pediatr Hematol Oncol 2005; 27(3):169-172.
Harrison, M. L., et al. Small cell of the ovary, hypercalcemic type—analysis of combined experience and recommendation for management. A GCIG study. Gynecol Onocol 2006; 100(2):233-238.
Pressey, J. G. The treatment of small cell carcinoma of the ovary hypercalcemic type. Oncology Reviews 2010; 5(1):61-66.
Pautier, P., et al. Results of a prospective dose-intensive regimen in 27 patients with small cell carcinoma of the ovary of the hypercalcemic type. Ann Oncol 2007; 18(12):1985-1989.
Senekjian, E., et al. Vinblastine, Cisplatin, Cyclophosphamide, Bleomycin, Doxorubicin, and Etoposide in the Treatment of small Cell Carcinoma of the Ovary. Cancer 1989; 64(6):1183-1187.
Kanwar, V. S., et al. Advanced Small Cell Carcinoma of the Ovary in a Seventeen-Year-Old Female, Successfully Treated with Surgery and Multi-Agent Chemotherapy. Pediatric Blood & Cancer 2008; 50(5):1060-1062.
Seidman, J. D. Small Cell Carcinoma of the Ovary of the Hypercalcemic Type: p53 Protein Accumulation and Clinicopathologic Features. Gynecologic Oncology 1995; 59(2):283-287.
Pennington, K., et al. Homologous recombination defects are common in non-serous ovarian, fallopian tube, and peritoneal carcinomas. Presented at 2013 Society of Gynecologic Oncology Annual Meeting on Women's Cancer, Los Angeles, CA, Mar. 9-12, 2013; Featured Poster Session II, Abstract 82; Gynecologic Oncology 2013; 130(1):e34.
Upchurch, K. S., et al. Differential cyclic AMP responses to calcitonin among human ovarian carcinoma cell lines: A calcitonin responsive line derived from a rare tumor type. Journal of Bone and Mineral 1986; 1(3):299-304.
Hornung, R., et al. Photodynamic therapy for the hypercalcemic type of the small cell carcinoma of the ovary in a mouse xenograft model. Gynecologic Oncology 1999; 75(3):447-452.
Walt, H., et al. Hypercalcemic-type of Small Cell Carcinoma of the Ovary: Characterization of a New Tumor Line. Anticancer Research 2001; 21(5):3253-3260.
Ohi, S., et al. Establishment and characterization of a human ovarian small cell carcinoma, hypercalcemic type, cell line (OS-1) secreting PTH, PthrP and ACTH—special reference to the susceptibility of anti-cancer drugs. Human Cell 2004; 17(4):203-209.
Von Hoff, D. D., et al. Pilot Study Using Molecular Profiling of Patient's Tumors to find Potential Targets and Select Treatments for Their Refractory Cancers. Journal of Clinical Oncology 2010; 28(33):4877-4883.
Craig, D. W., et al. Genome and transcriptome sequencing in prospective metastatic triple-negative breast cancer uncovers therapeutic vulnerabilities. Mol Cancer Ther 2013; 12(1):104-116.
Evans, M. F., et al. Touchdown General Primer (GP5+/GP6+) PCR and optimized sample DNA concentration support the sensitive detection of human papillomavirus. BMC Clin Pathol 2005; 5:10.
De Rosa Husman, A. M., et al. The use of general primers GP5 and GP6 elongated at their 3' ends with adjacent highly conserved sequences improves human papillomavirus detection by PCR. J Gen Virol 1995; 76(Pt4):1057-1062.
Wen, J., et al. Expression of whey acidic protein (WAP) genes in tissues other than the mammary gland in normal transgenic mice expressing mWAP/hGH fusion gene. Molecular Reproduction and Development 1995; 41(4):399-406.
Jamin, S. P., et al. Requirement of Bmpr1a for Mullerian duct regression during male sexual development. Nature Genetics 2002; 32(2):408-410.

Edson, et al. Granulosa cell-expressed BMPR1A and BMPR1B have unique functions in regulating fertility but act redundantly to suppress ovarian tumor development. Molecular Endocrinology 2010; 24(6):1251-1266.
Middlebrook, B. S., et al. Smad1-Smad5 ovarian conditional knockout mice develop a disease profile similar to the juvenile form of human granulosa cell tumors. Endocrinology 2009; 150(12):5208-5217.
Kiefer, J., et al. High-throughput siRNA screening as a method of perturbation of biological systems and Identification of targeted pathways coupled with compound screening. Methods Mol Biol 2009; 563:275-287.
Tiedemann, R. E., et al. Kinome-wide RNAi studies in human multiple myeloma identify vulnerable kinase targets, including a lymphoid-restricted kinase, GRK6. Blood 2010; 115(8):1594-1604.
Dhruv, H., et al. Structural basis and targeting of the interaction between fibroblast growth factor inducible 14 and tumor necrosis factor-like weak inducer of apoptosis. Journal of Biological Chemistry 2013; 288(45):32261-32276.
Xie, L., et al. Kinome-wide siRNA screening identifies molecular targets mediating the sensitivity of pancreatic cancer cells to Aurora kinase inhbitors. Biochemical Pharmacology 2012; 83(4):452-461.
Graham, C., et al. Evaluation of the antitumor efficacy, pharmacokinetics, and pharmacodynamics of the histone deacetylase inhibitor depsipeptide in childhood cancer models in vivo. Clin Cancer Res 2006; 12(1):223-234.
Newbold, A., et al. Characterisation of the novel apoptotic and therapeutic activities of the histone deacetylase inhibitor romidepsin. Mol Cancer Ther 2008; 7:1066-1079.
Furumai, R., et al. FK228 (depsipeptide) as a natural prodrug that inhibits class I histone deacetylases. Cancer Res 2002; 62(17):4916-4921.
Konig, R., et al. A probability-based approach for the analysis of large-scale RNAi screens. Nat Methods 2007; 4(10):847-849.
Linger, R. M., et al. Taking aim at Mer and Axl receptor tyrosine kinases as novel therapeutic targets in solid tumors. Expert Opin Ther Targets 2010; 14(10):1073-1090.
Henderson-Smith, A., et al. SMG1 identified as a regulator of Parkinson's disease-associated alpha-synuclein through siRNA screening. PLoS One 2013; 8(10):e77711.
Hasselblatt, M., et al. Nonsense mutation and inactivation of SMARCA4 (BRG1) in an atypical teratoid/rhabdoid tumor showing retained SMARCB1 (IN1) expression. The American Journal of Surgical Pathology 2011; 35(6):933-935.
Ingelbrecht, I. L., et al. Different 3' End Regions Strongly Influence the Level of Gene Expression in Plant Cells. Plant Cell 1989; 1(7):671-680.
Jones, J. D. G., et al. High level expression of introduced chimaeric genes in regenerated transformed plants. EMBO J 1985; 4(10):2411-2418.
De Almeida, E. R. P., et al. Transgenic expression of two marker genes under the control of an Arabidopsis rbcS promoter: Sequences encoding the Rubisco transit peptide increase expression levels. Mol Gen Genet 1989; 218(1):78-86.
Wei, D., et al. SNF5/INI1 Deficiency Redefines Chromatin Remodeling Complex Composition During Tumor Development. Molecular Cancer Research 2014; 12(11):1574-1585.
Agarwal, R., et al. Ovarian cancer: strategies for overcoming resistance to chemotherapy. Nat Rev Cancer 2003; 3(7):502-516.
Ramos, P., et al. Small cell carcinoma of the ovary, hypercalcemic type, displays frequent inactivating germline and somatic mutations in SMARCA4. Nat Genet 2014; 46(5):427-429.
Kupryjanczyk et al., "Ovarian Small Cell Carcinoma of Hypercalcemic Type—Evidence of Germline Origin and SMARCA4 Gene Inactivation. A Pilot Study", Pol J. Pathol., 64(4):238-246 (Dec. 2013).
Zhang et al., "Exome Sequencing and Functional Analysis Identifies a Novel Mutation in EXT1 Gene That Causes Multiple Osteochondromas", PLoS One, 8(8):e72316 (Aug. 29, 2013).
Medina et al., "Frequent BRG1/SMARCA4-Inactivaing Mutations in Human Lung Cancer Cell Lines", Hum Mutat., 29(5):617-622 (May 2008).

(56) References Cited

OTHER PUBLICATIONS

Kerl et al., "The Histone Deacetylase Inhibitor SAHA Acts in Synergism with Fenretinide and Doxorubicin to Control Growth of Rhabdoid Tumor Cells", BMC Cancer, 13(286):1-11 (Jun. 13, 2013).
Wohrle et al., "Fibroblast Growth Factor Receptors as Novel Therapeutic Targets in SNF5-Deleted Malignant Rhabdoid Tumors", PLoS One, 8(10):e77652 (Oct. 30, 2013).
Eaton et al., "Spectrum of SMARCB1/INI1 Mutations in Familial and Sporadic Rhaboid Tumors", Pediatric Blood Cancer, 56(1):7-15 (Jan. 2011).
Oike et al., "A Synthetic Lethality-Based Strategy to Treat Cancers Harboring a Genetic Deficiency in the Chromatin Remodeling Factor BRG1", Cancer Res., 73(17):5508-5517 (Sep. 1, 2013).
International Search Report for PCT/US2015/022043 dated Jul. 9, 2015.
Written Opinion of the International Searching Authority for PCT/US2015/022043 dated Jul. 9, 2015.
International Preliminary Report on Patentability for PCT/US2015/022043 dated Sep. 21, 2016.
Malisic, E., et al. TP53 gene status and human papilloma virus infection in response to platinum plus taxane-based chemotherapy of epithelial ovarian carcinomas. J Buon 2011; 16(4):701-707.
Willis, A. L., et al. The Fibroblast Growth Factor-Inducible 14 Receptor is Highly Expressed in HER2-Positive Breast Tumors and Regulates Breast Cancer Cell Invasive Capacity. Molecular Cancer Research 2008; 6(5):725-734.
Eisen, M. B., et al. Cluster analysis and display of genome-wide expression patterns. Proc Natl Acad Sci USA 1998; 95(25):14863-14868.
Subramanian, A., et al. Genet set enrichment analysis: a knowledge-based approach for interpreting genome-wide expression profiles. Proc Natl Acad Sci USA 2005; 102(43):15545-15550.
Mootha, V. K., et al. PGC-1 alpha-responsive genes involved in oxidative phosphorylation are coordinately downregulated in human diabetes. Nat Genet 2003; 34(3):267-273.
Holley, T., et al. Deep clonal profiling of formalin fixed paraffin embedded clinical samples. PLoS ONE 2012; 7(11):e50586.
Beroukhim, R., et al. Assessing the significance of chromosomal aberrations in cancer: methodology and application to glioma. Proc Natl Acad Sci USA 2007; 104(50): 20007-20012.
Cheng, Z., et al. Bilateral breast metastasis from small-cell carcinoma of the ovary. Journal of Clinical Oncology 2008; 26(31):5129-5130.
Idei, Y., et al. Ovarian Small Cell Carcinoma with K-ras Mutation: A Case Report with Genetic Analysis. Human Pathology 1996; 27(1):77-79.
Niimi, S., et al. Recurrent small cell carcinoma of the ovary treated with docetaxel: A case report. International Journal of Gynecological Cancer 2006; 16(5):1944-1946.
Mccormick, T. C., et al. Aggressive small cell carcinoma of the ovary, hypercalcemic type with hypercalcemia in pregnancy, treated with conservative surgery and chemotherapy. International Journal of Gynecological Cancer 2009; 19(8):1339-1341.
Tewari, K., et al. Advanced-Stage Small Cell Carcinoma of the Ovary in Pregnancy: Long-Term Survival after Surgical Debulking and Multiagent Chemotherapy. Gynecol Oncol 1997; 66(3):531-534.
Navone, N. M., et al. p53 protein accumulation and gene mutation in the progression of human prostate carcinoma. J Natl Cancer Inst 1993; 85(20):1657-1669.
Wu, Q. J., et al. Detection of human papillomavirus-16 in ovarian malignancy. Br J Cancer 2003; 89(4):672-675.
Atalay, F., et al. Detection of human papillomavirus DNS and genotyping in patients with epithelial ovarian carcinoma. J Obstet Gynaecol Res 2007; 33(6):823-828.
Lauren, J., et al. A novel gene family encoding leucine-rich repeat transmembrane proteins differentially expressed in the nervous system. Genomics 2003; 81(4):411-421.
Wang, X., et al. Curcumin inhibits neurotensin-mediated interleukin-8 production and migration of HCT116 human colon cancer cells. Clin Cancer Res 2006; 12(18):5346-5355.
Nussbaum, S. R., et al. Hypercalcemia and ectopic secretion of parathyroid hormone by an ovarian carcinoma with rearrangement of the gene for parathyroid hormone. The New England Journal of Medicine 1990; 323(19):1324-1328.
Tsunematsu, R., et al. Hypercalcemia due to parathyroid hormone-related protein produced by primary ovarian clear cell adenocarcinoma: case report. Gynecol Oncol 2000; 76(2):218-222.
Forster, C., et al. Small cell carcinoma of the ovary, hypercalcemic type. A case report with immunohistochemical, ultrastructural and cytophotometeric analysis and review of the literature. Gen Diagn Pathol 1997; 142(5-6):365-370.
Reid, B. J., et al. Biomarkers in Barett's esophagus. Gastrointest Endosc Clin N Am 2003; 13(2):369-397.
Roberts, C. W., et al. The role of SMARCB1/INI1 in development of rhabdoid tumor. Cancer Biol Ther 2009; 8(5):412-416.
Lee, R. S., et al. A remarkably simple genome underlies highly malignant pediatric rhabdoid cancers. The Journal of Clinical Investigation 2012; 122(8):2983-2988.
Knutson, S. K., et al. Durable tumor regression in genetically altered malignant rhabdoid tumors by inhibition of methyltransferase EZH2. Proceedings of the National Academy of Sciences USA 2013; 110(19):7922-7927.
Wilson, B. G., et al. Epigenetic antagonism between polycomb and SWI/SNF complexes during oncogenic transformation. Cancer Cell 2010; 18(4):316-328.
Orvis, T., et al. BRG1/SMARCA4 inactivation promotes non-small cell lung cancer aggressiveness by altering chromatin organization. Cancer Research 2014; 74(22):6486-6498.
Ercan, S., et al. High nucleosome occupancy is encoded at X-linked gene promoters in C. elegans. Genome Res 2011; 21(2):237-244.
Langmead, B., et al. Ultrafast and memory-efficient alignment of short DNA sequences to the human genome. Genome Biology 2009: 10(3):R25.
Li, H., et al. The Sequence Alignment/Map format and SAMtools. Bioinformatics 2009; 25(16):2078-2079.
Chen, K., et al. DANPOS: dynamic analysis of nucleosome position and occupancy by sequencing. Genome Research 2013; 23(2):341-351.
Wang, K., et al. MapSplice: accurate mapping of RNA-seq reads for splice junction discovery. Nucleic Acids Res 2010; 38(18):e178.
Li, B., et al. RSEM: accurate transcript quantification from RNA-Seq data with or without a reference genome. BMC Bioinformatics 2011; 12:323.
Bullard, J. H., et al. Evaluation of statistical methods for normalization and differential expression in mRNA-Seq experiments. BMC Bioinformatics 2010; 11:94.
Tusher, V. G., et al. Significance analysis of microarrays applied to the ionizing radiation response. Proc Natl Acad Sci USA 2001; 98(9):5116-5121.
Bartlett, C., et al. BRG1 mutations found in human cancer cell lines inactivate Rb-mediated cell-cycle arrest. Journal of cellular physiology 2011; 226(8):1989-1997.
Berdasco, M., et al. Genetic syndromes caused by mutations in epigenetic genes. Hum Genet 2013; 132(4):359-383.
Shevchenko, A., et al. In-gel digestion for mass spectrometric characterization of proteins and proteomes. Nature Protocols 2006; 1(6):2856-2860.
Deodhar, K. K., et al. Immature teratoma of the ovary: a clinicopathological study of 28 cases. Indian J Pathol Microbiol 2011; 54(4):730-735.
Jacobson, T. A., et al. Gene expression analysis using long-term preserved formalin-fixed and paraffin-embedded issue of non-small cell lung cancer. Int J Oncol 2011; 38(4):1075-1081.
Abdueva, D., et al. Quantitative expression profiling in formalin-fixed paraffin-embedded samples by affymetrix microarrays. J Mol Diagn 2010; 12(4):409-417.
Di Cesare, S., et al. Expression profiling of formalin-fixed paraffin embedded primary human uveal melanomas using DASL matrices. J Cancer Res Clin Oncol 2010; 136(4):577-586.

(56) References Cited

OTHER PUBLICATIONS

Stricker, T. P., et al. Validation of a prognostic multi-gene signature in high-risk neuroblastoma using the high throughput digital NanoString nCounter system. Mol Oncol 2014; 8(3):669-678.
Shibata, K. et al. Establishment and characterization of an ovarian yolk sac tumor cell line reveals possible involvement of Nkx2.5 in tumor development. Oncology 2008; 74(1-2):104-111.
Kee, K., et al. Human DAZL, DAZ and BOULE genes modulate primordial germ-cell and haploid gamete formation. Nature 2009; 462(7270):222-225.
Wongtrakoongate, P., et al. STELLA facilities differentiation of germ cell and endodermal lineages of human embryonic stem cells. PLoS One 2013; 8(2):e56893.
Lan, C. W., et al. Differentiation of human embryonic stem cells into functional ovarian granulosa-like cells. J Clin Endocrinol Metab 2013; 98(9):3713-3723.
Shen, Y., et al. X-inactivation in female human embryonic stem cells is in a nonrandom pattern and prone to epigenetic alterations. Proceedings of the National Academy of Sciences USA 2008; 105(12):4709-4714.
Meerbrey, K. L., et al. The pINDUCER lentiviral toolkit for inducible RNA interference in vitro and in vivo. Proceedings of the National Academy of Sciences USA 2011; 108(9):3665-3670.
Clark, A. T., et al. Spontaneous differentiation of germ cells from human embryonic stem cells in vitro. Human Molecular Genetics 2004; 13(7):727-739.
Prokhorova, T. A., et al. Teratoma formation by human embryonic stem cells is site dependent and enhanced by the presence of Matrigel. Stem Cells and Development 2009; 18(1):47-54.
Young, R. H., et al. Small cell carcinoma of the ovary, hypercalcemic type: a clinicopathological analysis of 150 cases. Am J Surg Pathol 1994; 18(11):1102-1116.
Florell, S. R., et al. Ovarian small cell carcinoma of the hypercalcemic type in a 14 month old: the youngest reported case. Med Pediatr Oncol 1999; 32(4):304-307.
Shrimali, R. K., et al. Dose-dense and dose-intense chemotherapy for small cell ovarian cancer. 2 cases and review of literature. Med Oncol 2011; 28:766-770.
Estel, R., et al. Small cell carcinoma of the ovary of the hypercalcaemic type: an analysis of clinical and prognostic aspects of a rare disease on the basis of cases published in the literature. Arch Gynecol Obstet 2011; 284(5):1277-1282.
Mccluggage, W. G., et al. An immunohistochemical analysis of ovarian small cell carcinoma of hypercalcemic type. In J Gynecol Pathol 2004; 23(4):330-336.
Gamwell, L. F., et al. Small cell ovarian carcinoma: genomic stability and responsiveness to therapeutics. Orphanet J Rare Dis 2013; 8:33.
Eaton, K. W., et al. Spectrum of SMARCB1/INI1 mutations in familial and sporadic rhabdoid tumors. Pediatr Blood Cancer 2011; 56(1):7-15.
Serber, D. W., et al. The BRG1 Chromatin Remodeler Protects Against Ovarian Cysts, Uterine Tumors, and Mammary Tumors in a Lineage-Specific Manner. PLoS ONE 2012; 7(2):e31346.
Hoffman, G. R., et al. Functional epigenetics approach identifies BRM/SMARCA2 as a critical synthetic lethal target in BRG1-deficient cancers. Proc Natl Acad Sci USA 2014; 111(8):3128-3133.
Kononen, J., et al. Tissue microarrays for high-throughput molecular profiling of tumor specimens. Nat Med 1998; 4(7):844-847.
Witkowski, L., et al. Germline and somatic SMARCA4 mutations characterize small cell carcinoma of the ovary, hypercalcemic type. Nature Genet 2014; 46(5):438-443.
Jelinic, P., et al. Recurrent SMARCA4 mutations in small cell carcinoma of the ovary. Nature Genet 2014; 46(5):424-4226.
Hargreaves, D. C., et al. ATP-dependent chromatin remodeling: genetics, genomics and mechanisms. Cell Res 2011; 21(3):396-420.
Neigeborn, L., et al. Genes affecting the regulation of SUC2 gene expression by glucose repression in *Saccharomyces cerevisiae*. Genetics 1984; 108(4):845-858.
Stern, M., et al. Five SWI genes are required for expression of the HO gene in yeast. J Mol Biol 1984; 178(4):853-868.
Kadoch, C., et al. Proteomic and bioinformatics analysis of mammalian SWI/SNF complexes identifies extensive roles in human malignancy. Nat Genet 2013; 45(6):592-601.
Shain, A. H., et al. The spectrum of SWI/SNF mutations, ubiquitous in human cancers. PLoS One 2013; 8(1):e55119.
Helming, K. C., et al. Vulnerabilities of mutant SWI/SNF complexes in cancer. Cancer Cell 2014; 26(3):309-317.
Alkushi, A., et al. Identification of prognostically relevant and reproducible subsets of endometrial adenocarcinoma based on clustering analysis of immunostaining data. Mod Pathol 2007; 20(11):1156-1165.
Silva, E. G., et al. Association of low-grade endometroid carcinoma of the uterus and ovary with undifferentiated carcinoma: a new type of dedifferentiated carcinoma? Int J Gynecol Pathol 2006; 25(1):52-58.
Reisman, D. N. et al. Concomitant down-regulation of BRM and BRG1 in human tumor cell lines: differential effects on RB-mediated growth arrest vs CD44 expression. Oncogene 2002; 21(8):1196-1207.
Strobeck, M. W., et al. The BRG-1 subunit of the SWI/SNF complex regulates CDD44 expression. J Biol Chem 2001; 276:9273-9278.
Strobeck, M. W., et al. Compensation of BRG-1 function by Brm: insight into the role of the core SWI-SNF subunits in retinoblastoma tumor suppressor signaling. J Biol Chem 2002; 277:4782-4789.
Yamamichi, N., et al. Frequent loss of Brm expression in gastric cancer correlates with histologic features and differentiation state. Cancer Res 2007; 67(22):10727-10735.
Banine, F., et al. SWI/SNF chromatin-remodeling factors induce changes in DNA methylation to promote transcriptional activation. Cancer Res 2005; 65(9):3542-3547.
Anglesio, M. S., et al. Type specific cell line models for type-specific ovarian cancer research. PLoS One 2013; 8(9):e72162.
Dunaief, J. L., et al. The retinoblastoma protein and BRG1 form a complex and cooperate to induce cell cycle arrest. Cell 1994; 79(1):119-130.
Muchardt, C., et al. ras transformation is associated with decreased expression of the brm/SNF2alpha ATPase form the mammalian SWI-SNF complex. EMBO J 1998; 17(1):223-231.
Strober, B. E., et al. Functional interactions between the hBRM/hBRG1 transcriptional activators and the pRB family of proteins. Mol Cell Biol 1996; 16(4):1576-1583.
Strobeck, M. W., et al. BRG-1 is required for RB-mediated cell cycle arrest. Proc Natl Acad Sci USA 2000; 97(14):7748-7753.
Witkowski, L., et al. Familial rhabdoid tumour 'avant la lettre'—from pathology review to exome sequencing and back again. J Pathol 2013; 231(1):35-43.
Kuo, K. T., et al. Downregulation of BRG-1 repressed expression of CD44s in cervical neuroendocrine carcinoma and adenocarcinoma. Mod Pathol 2006; 19(12):1570-1577.
Carlson, J. W., et al. Biomarker-assisted diagnosis of ovarian, cervical and pulmonary small cell carcinomas: the role of TTF-1, WT-1 and HPV analysis. Histopathology 2007; 51(3):305-312.
Stoler, M. H., et al. Small-cell neuroendocrine carcinoma of the cervix. A human papillomavirus type 18-associated cancer. Am J Surg Pathol 1991; 15(1):28-32.
Gao, J., et al. Integrative analysis of complex cancer genomics and clinical profiles using the cBioPortal. Sci Signal 2013; 6(269):pl1.
Cerami, E., et al. The cBio cancer genomics portal: an open platform for exploring multidimensional cancer genomics data. Cancer Discov 2012; 2(5):401-404.
Cancer Genome Atlas Research Network. Integrated genomic analyses of ovarian carcinoma. Nature 2011; 474(7353):609-615.
Bashashati, A., et al. Distinct evolutionary trajectories of primary high-grade serous ovarian cancers revealed through spatial mutational profiling. J Pathol 2013; 231(1):21-34.
Wilson, B. G., et al. Residual complexes containing SMARCA2 (Brm) underlie the oncogenic drive of SMARCA4 (BRG1) mutation. Mol Cell Biol 2014; 34(6):1136-1144.
Reisman, D. N., et al. Loss of BRG1/BRM in human lung cancer cell lines and primary lung cancers: correlation with poor prognosis. Cancer Res 2003; 63(3):560-566.

(56) References Cited

OTHER PUBLICATIONS

Matsubara, D., et al. Lung cancer with loss of BRG1/BRM, shows epithelial mesenchymal transition phenotype and distinct histologic and genetic features. Cancer Sci 2013; 104(2):266-273.
Huang, H. N., et al. Loss of ARID1A expression and its relationship with PI3K-Akt pathway alterations and ZNF217 amplification in ovarian clear cell carcinoma. Mod Pathol 2014; 27(7):983-990.
Agaimy, A. The expanding family of SMARCB1(INI1)-deficient neoplasia: implications of phenotypic, biological, and molecular heterogeneity. Adv Anat Pathol 2014; 21(6):394-410.
Lee, C. H., et al. The clinicopathologic features of YMHAE-FAM22 endometrial stromal sarcomas: a histologically high-grade and clinically aggressive tumor. Am J Surg Pathol 2012; 36(5):641-653.
Kahali, B., et al. The silencing of the SWI/SNF subunit and anticancer gene BRM in Rhabdoid tumors. Oncotarget 2014; 5(10):3316-3332.
Li, L., et al. Concurrent loss of IN1, PBRM1, and BRM expression in epitheloid sarcoma: implications for the cocontritutions of multiple SWI/SNF complex members to pathogenesis. Hum Pathol 2014; 45(11):2247-2254.
Yamamichi, N., et al. The Brm gene suppressed at the post-transcriptional level in various human cell lines is inducible by transient HDAC inhibitor treatment, which exhibits antioncogenic potential. Oncogene 2005; 24(35):5471-5481.
Foulkes, W. D., et al. No small surprise—small cell carcinoma of the ovary, hypercalcaemic type, is a malignant habdoid tumour. J Pathol 2014; 233(3):209-214.
Clement, P. B. Selected miscellaneous ovarian lesions: small cell carcinomas, mesothelial lesions, mesenchymal and mixed neoplasms, and non-neoplastic lesions. Mod Pathol 2005; 18(Suppl 2):S113-S129.
Siegel, R., et al. Cancer statistics, 2013. CA: Cancer J Clin 2013; 63(1):11-30.

* cited by examiner

*SMARCA4* mutations identified in germline and tumor DNA from SCCO patients.

| Sample | Age at diagnosis (years) | SMARCA4 mutations in germline DNA | SMARCA4 mutations in tumor DNA (total predicted SNVs^) | Predicted protein alteration | SMARCA4 IHC |
|---|---|---|---|---|---|
| SCCO-002* | 26 | None | None (17) | None | Negative |
| SCCO-008 | 9 | c.T2935G | N/A | p.R979* | N/A |
| SCCO-010 | 6 | None | N/A | None | Positive |
| SCCO-017 | 10 | c.722-735delGGTCCCGGCCCGGCA | N/A | p.G241fs | Negative |
| SCCO-012 | 21 | N/A | None (153) | None | Negative |
| SCCO-014 | 33 | N/A | c.200delG, c.348delC (230) | p.E667fs, p.L1161fs | N/A |
| SCCO-015 | 27 | N/A | c.C3565T (306) | p.R1189* | N/A |
| DAH23 | N/A | N/A | Splice site mutation | | Negative |
| DAH456* | 39 | None | None | None | N/A |
| DAH457 | N/A | N/A | c.C3277T | p.R1093* | N/A |
| DG1006* | 34 | None | c.2855delA, c.4674-4678delAGCG | p.E952fs, p.S1591fs | N/A |
| DG1219* | N/A | None | Splice site mutation | | Negative |
| BIN-67 | Cell line | N/A | 2 Splice site mutations | | Negative |

*Cases with sequenced Tumor/Normal pair. N/A, sample not available.
^Number of total SNVs for tumors without a matching normal correspond to all detected SNVs not found in dbSNP.

FIGURE 1

SMARCA4 Immunohistochemistry (IHC) analysis of SCCO tumors.

| Sample | Age at diagnosis (years) | SMARCA4 IHC | SMARCA4 mutations (germline or tumor DNA) | Predicted protein alteration |
|---|---|---|---|---|
| SCCO-002* | 26 | Negative | None | None |
| SCCO-008 | 9 | N/A | c.T2935G | p.R979* |
| SCCO-010 | 6 | Positive | None | None |
| SCCO-017 | 10 | Negative | c.722-735delGGTCCGGCCCGGCA | p.G241fs |
| SCCO-012 | 21 | Negative | None | None |
| SCCO-014 | 33 | N/A | c.200delG, c.348delC | p.E667fs, p.L1161fs |
| SCCO-015 | 27 | N/A | c.C3565T | p.R1189* |
| DAH23 | N/A | Negative | Splice site mutation | |
| DAH456* | 39 | N/A | None | None |
| DAH457 | N/A | N/A | c.C3277T | p.R1093* |
| DG1006* | 34 | N/A | c.2855delA, c.4674-4678delAGCG | p.E952fs, p.S1591fs |
| DG1219* | N/A | Negative | Splice site mutation | |
| BIN-67 | Cell line | Negative | 2 Splice site mutations | |
| SCCO-001 | 22 | Negative | N/A | N/A |
| SCCO-004 | 32 | Negative | N/A | N/A |
| SCCO-006 | 32 | Negative | N/A | N/A |
| SCCO-007 | 25 | Negative | N/A | N/A |
| SCCO-009 | 27 | Negative | N/A | N/A |
| SCCO-011 | 30 | Negative | N/A | N/A |
| SCCO-016 | 10 | Negative | N/A | N/A |
| SCCO-018 | 5 | Positive | N/A | N/A |
| SCCO-019 | 27 | Negative | N/A | N/A |

*Cases with sequenced Tumor/Normal pair. N/A, sample not available.

FIGURE 2

Mutations identified in SWI/SNF complex subunits in SCCO.

| Sample | Age at diagnosis (years) | SMARCA4 mutations in germline DNA | SMARCA4 mutations in tumor DNA (total predicted SNVs) | Mutations in other SWI/SNF genes | Mutations in chromatin remodeling genes |
|---|---|---|---|---|---|
| SCCO-002* | 26 | None | None (17) | | |
| SCCO-008 | 9 | c.T2935G | N/A | | |
| SCCO-010 | 6 | None | N/A | SMARCC1 V729A, SMARCE1 E411* | |
| SCCO-017 | 10 | c.722-735delGGTCCCGGCCCGGCA | N/A | | |
| SCCO-012 | 21 | N/A | None (153) | | |
| SCCO-014 | 33 | N/A | c.200delG, c.348delC (230) | | |
| SCCO-015 | 27 | N/A | c.C3565T (306) | | SMARCA3 H503R, CHD1 P275S, CHD8 R1895C, CREBBP G263S, MLL T2731P, NCOR2 A2003T, TTF1 K538R, ZBP1 Q258R, ABP1 S592R and S592T |
| DAH23 | N/A | N/A | Splice site mutation | | |
| DAH456* | 39 | None | None | | ABP1 S592R and S592T, ZBP1 Q258R |
| DAH457 | N/A | N/A | c.C3277T | | |
| DG1006* | 34 | None | c.2855delA, c.4674-4678delAGCG | | SMARCE1P4 downstream deletion, SMARCE1P5 downstream deletion |
| DG1219* | N/A | None | Splice site mutation | SMARCC1 intron deletion | |
| BIN-67 | Cell line | N/A | 2 Splice site mutations | | SMARCC1 intron deletion, SMARCE1P4 downstream deletion, RB1 R621C, ZBP1 Q258R, ABP1 S592R and S592T |

*Cases with sequenced Tumor/Normal pair. N/A, sample not available.

| CHROM | POS_START | POS_END | Gene_Name | Tumor | Normal | |
|---|---|---|---|---|---|---|
| chr10 | 126678127 | 126678128 | CTBP2 | A/T | T/T | Thr>Ser |
| chr11 | 48346960 | 48346961 | OR4C3 | A/T | A/T | |
| chr14 | 44974188 | 44974189 | FSCB | C/C | C/A | |
| chr3 | 75787515 | 75787516 | ZNF717 | C/G | C/G | Arg>Arg |
| chr3 | 75787518 | 75787519 | ZNF717 | C/A | C/A | |

FIGURE 16B

| Gene | TUMOR | | | | | NORMAL | | | | | dbsnp135 |
|---|---|---|---|---|---|---|---|---|---|---|---|
| | 2 | 13 | 16 | 17 | | 2 | 9 | 11 | 22 | | dbsnp135 |
| CTBP2 | Het A/T | Het A/T | Het A/T | Het A/T | | Hom T/T | Hom T/T | Hom T/T | Hom T/T | | |
| OR4C3 | Het A/T | Het A/T | Het A/T | Het A/T | | Het A/T | Het A/T | Het A/T | Het A/T | | rs75493089;rs74589050 |
| FSCB | Het C/A | Hom C/C | Het C/A | Het C/A | | Hom C/C | Hom C/C | Hom C/C | Hom C/C | | rs11621923 |
| ZNF717 | Het C/G | Het C/G | Het C/G | Het C/G | | Het C/G | Het C/G | Het C/G | Het C/G | | rs79870536 |
| ZNF717 | Het C/A | Het C/A | Het C/A | Het C/A | | Het C/A | Het C/A | Het C/A | Het C/A | | rs76264776;rs181132116;rs76144260 |

| UniprotID | Gene | Spectral Counts | Total Unique Peptides |
|---|---|---|---|
| O14497 | ARID1A | 171 | 54 |
| P51531 | SMARCA2 | NA | NA |
| Q92922 | SMARCC1 | 473 | 58 |
| Q96GM5 | SMARCD1 | 139 | 37 |
| Q969G3 | SMARCE1 | 135 | 22 |
| P51532 | SMARCA4 | NA | NA |
| Q9NPI1 | BRD7 | 33 | 25 |
| Q92925 | SMARCD2 | 101 | 23 |
| Q12824 | SMARCB1 | 76 | 21 |
| P12956 | KU70 | 36 | 21 |
| P13010 | KU80 | 29 | 19 |

| Agent | Target | Phase | BIN67 IC50 (μM) | SCCOHT1 IC50 (μM) |
|---|---|---|---|---|
| Romidepsin | Class I HDACs | Approved | 0.000653 | 0.000435 |
| Panobinostat (LBH589) | Class I and II HDACs | Phase 3 | 0.03245 | 0.0026155 |
| Belinostat (PDX101) | Pan-HDAC | Approved | 1.489 | 0.234 |
| SAHA | Pan-HDAC | Approved | 3.774 | 12.584 |
| Entinostat (SNDX-275) | Class I HDAC | Phase 3 | 7.4345 | 1.284 |
| GSK343 | EZH2 | n/a | 14.345 | 8.6185 |
| Bromosporine | Bromodomain | n/a | 18.055 | 24.455 |
| JQ1 | Bromodomain | n/a | 19.950 | 21.880 |
| 5-azacytidine | DNA methyltransferase | Approved | 52.858 | 47.340 |
| OTX015 | Bromodomain | Phase 1 | 54.255 | 50.040 |
| EPZ-6438 | EZH2 | Phase 1 | 75.005 | 69.95 |
| 3-Deazaneplanocin A | EZH2 | n/a | >100 | >100 |
| Anacardic acid | HAT | n/a | >100 | 44.365 |
| MB-3 | HAT | n/a | >100 | >100 |

FIGURE 21

SEQUENCE LISTING

<160> NUMBER OF SEQ ID NOS: 23

<210> SEQ ID NO 1

```
<211> LENGTH: 15
<212> TYPE: DNA
<213> ORGANISM: Homo sapiens

<400> SEQUENCE: 1
ggtcccggcc cggca                                                  15

<210> SEQ ID NO 2
<211> LENGTH: 23
<212> TYPE: DNA
<213> ORGANISM: Artificial Sequence
<220> FEATURE:
<223> OTHER INFORMATION: Primer

<400> SEQUENCE: 2
tttgttactg tggtagatac tac                                         23

<210> SEQ ID NO 3
<211> LENGTH: 25
<212> TYPE: DNA
<213> ORGANISM: Artificial Sequence
<220> FEATURE:
<223> OTHER INFORMATION: Primer

<400> SEQUENCE: 3
gaaaaataaa ctgtaaatca tattc                                       25

<210> SEQ ID NO 4
<211> LENGTH: 20
<212> TYPE: DNA
<213> ORGANISM: Artificial Sequence
<220> FEATURE:
<223> OTHER INFORMATION: Primer

<400> SEQUENCE: 4
gaagagccaa ggacaggtac                                             20

<210> SEQ ID NO 5
<211> LENGTH: 20
<212> TYPE: DNA
<213> ORGANISM: Artificial Sequence
<220> FEATURE:
<223> OTHER INFORMATION: Primer

<400> SEQUENCE: 5
caacttcatc cacgttcacc                                             20

<210> SEQ ID NO 6
<211> LENGTH: 20
<212> TYPE: DNA
<213> ORGANISM: Artificial Sequence
<220> FEATURE:
<223> OTHER INFORMATION: Primer

<400> SEQUENCE: 6
cttccggctt cggtttccct                                             20

<210> SEQ ID NO 7
<211> LENGTH: 20
<212> TYPE: DNA
<213> ORGANISM: Artificial Sequence
<220> FEATURE:
<223> OTHER INFORMATION: Primer

<400> SEQUENCE: 7
gatgaatgga gacgcgcgct                                             20
```

```
<210> SEQ ID NO 8
<211> LENGTH: 20
<212> TYPE: DNA
<213> ORGANISM: Artificial Sequence
<220> FEATURE:
<223> OTHER INFORMATION: Primer

<400> SEQUENCE: 8
gttgcttgat gcagtctgcg                                               20

<210> SEQ ID NO 9
<211> LENGTH: 20
<212> TYPE: DNA
<213> ORGANISM: Artificial Sequence
<220> FEATURE:
<223> OTHER INFORMATION: Primer

<400> SEQUENCE: 9
ttcatgacat aagcgagtgg                                               20

<210> SEQ ID NO 10
<211> LENGTH: 20
<212> TYPE: DNA
<213> ORGANISM: Artificial Sequence
<220> FEATURE:
<223> OTHER INFORMATION: Primer

<400> SEQUENCE: 10
gatgtgctgc atccacttgg                                               20

<210> SEQ ID NO 11
<211> LENGTH: 20
<212> TYPE: DNA
<213> ORGANISM: Artificial Sequence
<220> FEATURE:
<223> OTHER INFORMATION: Primer

<400> SEQUENCE: 11
ttcagaaaag accccacagg                                               20

<210> SEQ ID NO 12
<211> LENGTH: 20
<212> TYPE: DNA
<213> ORGANISM: Artificial Sequence
<220> FEATURE:
<223> OTHER INFORMATION: Primer

<400> SEQUENCE: 12
ttagttgatt cctggtgggc                                               20

<210> SEQ ID NO 13
<211> LENGTH: 20
<212> TYPE: DNA
<213> ORGANISM: Artificial Sequence
<220> FEATURE:
<223> OTHER INFORMATION: Primer

<400> SEQUENCE: 13
gaactaaggc ggaatcagca                                               20

<210> SEQ ID NO 14
<211> LENGTH: 20
<212> TYPE: DNA
<213> ORGANISM: Artificial Sequence
<220> FEATURE:
```

```
<223> OTHER INFORMATION: Primer

<400> SEQUENCE: 14
tgtgcagaga gagaggctga                                              20

<210> SEQ ID NO 15
<211> LENGTH: 20
<212> TYPE: DNA
<213> ORGANISM: Artificial Sequence
<220> FEATURE:
<223> OTHER INFORMATION: Primer

<400> SEQUENCE: 15
cacgtaacac acaggggttg                                              20

<210> SEQ ID NO 16
<211> LENGTH: 20
<212> TYPE: DNA
<213> ORGANISM: Artificial Sequence
<220> FEATURE:
<223> OTHER INFORMATION: Primer

<400> SEQUENCE: 16
caatctcttg gcatcccttc                                              20

<210> SEQ ID NO 17
<211> LENGTH: 20
<212> TYPE: DNA
<213> ORGANISM: Artificial Sequence
<220> FEATURE:
<223> OTHER INFORMATION: Primer

<400> SEQUENCE: 17
cagtgctcca tgatgacacc                                              20

<210> SEQ ID NO 18
<211> LENGTH: 20
<212> TYPE: DNA
<213> ORGANISM: Artificial Sequence
<220> FEATURE:
<223> OTHER INFORMATION: Primer

<400> SEQUENCE: 18
tgggctgcaa aagctctaac                                              20

<210> SEQ ID NO 19
<211> LENGTH: 20
<212> TYPE: DNA
<213> ORGANISM: Artificial Sequence
<220> FEATURE:
<223> OTHER INFORMATION: Primer

<400> SEQUENCE: 19
agttttgcag ggagatgagg                                              20

<210> SEQ ID NO 20
<211> LENGTH: 20
<212> TYPE: DNA
<213> ORGANISM: Artificial Sequence
<220> FEATURE:
<223> OTHER INFORMATION: Primer

<400> SEQUENCE: 20
ggccaaagct ttctgaggat                                              20
```

```
<210> SEQ ID NO 21
<211> LENGTH: 20
<212> TYPE: DNA
<213> ORGANISM: Artificial Sequence
<220> FEATURE:
<223> OTHER INFORMATION: Primer

<400> SEQUENCE: 21
catgggagac tgggaaaggc                                                   20

<210> SEQ ID NO 22
<211> LENGTH: 20
<212> TYPE: DNA
<213> ORGANISM: Artificial Sequence
<220> FEATURE:
<223> OTHER INFORMATION: Primer

<400> SEQUENCE: 22
ccctgtagag ccttgggaag                                                   20

<210> SEQ ID NO 23
<211> LENGTH: 20
<212> TYPE: DNA
<213> ORGANISM: Artificial Sequence
<220> FEATURE:
<223> OTHER INFORMATION: Primer

<400> SEQUENCE: 23
gtccttgcca gaagatggag                                                   20
```

COMPOSITIONS, METHODS AND KITS FOR CHARACTERIZING AND SCREENING FOR SMALL CELL OVARIAN CARCINOMA

CROSS-REFERENCE TO RELATED PATENT APPLICATIONS

The present application is a continuation of U.S. patent application Ser. No. 15/127,965, filed on Sep. 21, 2016 (published as US20170107578), which is the U.S. National Stage of International Patent Application No. PCT/US2015/022043, filed on Mar. 23, 2015, which claims the benefit of U.S. Provisional Application No. 61/968,551 filed on Mar. 21, 2014, the contents of each of which are hereby incorporated by reference in their entireties.

INCORPORATION-BY-REFERENCE OF MATERIAL ELECTRONICALLY FILED

Incorporated by reference in its entirety herein is a computer-readable nucleotide/amino acid sequence listing submitted concurrently herewith and identified as follows: One 4,439 byte ASCII (text) file named "91482_166_Seq_Listing" created on Mar. 14, 2015.

TECHNICAL FIELD

The present invention relates compositions, methods and kits for characterizing and screening for the existence or predisposition for small cell carcinoma of the ovary, hypercalcemic type (SCCOHT). The present invention also relates to methods of treating a subject having SCCOHT or a predisposition for SCCOHT.

BACKGROUND

Small Cell Carcinoma of the Ovary, Hypercalcemic Type (SCCOHT) is a rare and highly aggressive form of ovarian cancer that affects young women and girls at an average age of 23 years. Most SCCOHT patients are diagnosed at an advanced stage and do not respond to chemotherapy. As a result, more than 75% of patients succumb to their disease within 1-2 years. Research to date has provided little biological information to guide the development of therapies for SCCOHT patients. The early age of onset and aggressive nature of SCCOHT highly suggest a genetic driver either in the germline or as an early somatic event. Moreover, there are several reports of SCCOHT cases occurring in family members, suggesting that SCCOHT can be heritable.

Recent studies implicate the SWI/SNF (BAF) chromatin remodeling complex as a major tumor suppressor because frequent inactivating mutations in at least seven SWI/SNF subunits have been identified in a variety of cancers. The genes of the SWI/SNF complex were found to be associated with one of the first chromatin remodeling complexes to be identified, with many of its subunits conserved from yeast to humans. In mammalian cells, the SWI/SNF complex comprises of 11-15 protein subunits that include SNF5 (SMARCB1) and one of the two mutually exclusive ATPases, BRG1 (SMARCA4) or BRM (SMARCA2). Genetic alterations in subunits of the SWI/SNF chromatin-remodeling complex are a key mechanism in tumorigenesis of several cancers. This is exemplified by rhabdoid tumors (RT), where frequent biallelic loss of the core SWI/SNF gene SMARCB1 is likely the primary driver of oncogenesis. Importantly, up to 20% of patients with RT bear germline heterozygous mutations in SMARCB1 and inactivating germline mutations of SMARCA4 in patients lacking SMARCB1 mutations. At a somatic level, however, SMARCA4 is the SWI/SNF subunit most commonly mutated in cancer.

Although the mutational landscape of SCCOHT is unknown, the similarities between SCCOHT and rhabdoid tumors (both are highly aggressive pediatric tumors with primitive histologic features, diploid cytogenetics, and are sometimes familial) suggest they may have similar molecular genetics. The need exists to develop an integrated genomic and pathologic assessment of SCCOHT to effectively screen a subject for the existence of or predisposition for SCCOHT, including determining if SMARCA4 or other members of the SWI/SNF complex are associated with SCCOHT development.

SUMMARY

The present invention relates generally to compositions, methods and kits for screening for the existence of or predisposition SCCOHT and to methods of characterizing the type of SCCOHT and treatment.

In one aspect, the present invention provides a method for screening a mammalian subject for the existence of or predisposition for SCCOHT. The method typically comprises obtaining a sample from the subject, screening for an inactivation alteration in a SWI/SNF complex; and determining that the subject has SCCOHT or a predisposition for SCCOHT if the SWI/SNF inactivation alteration is detected.

A second aspect of the invention is directed to a method of classifying the type of small cell carcinoma of the ovary, hypercalcemic type (SCCOHT) in a subject. For example, the method may provide a manner of classifying a molecular/genetic type of SCCOHT. The method comprises: screening a biological sample containing SCCOHT cells from a subject for an alteration in a SWI/SNF complex in vitro, wherein the alteration in the SWI/SNF complex results in inactivation of the SWI/SNF complex; and classifying the type of SCCOHT as a SWI/SNF inactivation induced cancer upon detecting an inactivation alteration in the SWI/SNF complex in the SCCOHT cells.

In certain embodiments, the inactivating alteration is in the wild-type SMARCA4 gene or its expression products in the sample. In certain aspects, the alteration of the wild-type SMARCA4 gene typically comprises an inactivating truncation mutation in the wild-type SMARCA4 gene such as a heterozygous nonsense mutation (c.T2935G) of the wild type SMARCA4 gene upstream of the helicase and bromodomains resulting in a truncated SMARCA4 protein product with a predicted protein alteration of p.R979*. In yet other aspects, the alteration of the wild-type SMARCA4 gene comprises a frameshift mutation in exon 4 (c.722-735del GGTCCCGGCCCGGCA) (SEQ ID NO: 1) of the wild type SMARCA4 gene removing all essential SMARCA4 functional domains resulting in a truncated SMARCA4 protein product with a predicted protein alteration of p.G241fs.

In a particular aspect, the alteration detected is a somatic alteration of the wild-type SMARCA4 gene or its expression products in the sample. In one exemplary aspect, the alteration of the wild-type SMARCA4 gene is detected by sequencing of genomic DNA from SCCOHT tumors and/or SCCOHT cell lines such as BIN-67. In the embodiment, the alteration of the wild-type SMARCA4 gene comprises a monoallelic or biallelic inactivating truncation mutation in the wild-type SMARCA4 gene within its ATPase domain or a resulting in a truncated SMARCA4 protein product or a splice site variation of the wild-type SMARCA4 gene resulting in a truncated SMARCA4 protein product. In another specific aspect, the inactivation alteration is in the SMARCC1 and/or SMARCE1 genes. In a particular embodiment, the inactivation alteration in the SMARCC1 and/or SMARCE1 genes comprises of at least one mutation selected from the group consisting of SMARCC1 V729A, SMARCC1 intron deletion, and SMARCE1 E411*.

In a third aspect, the present invention provides a method of identification of key factors in the tumorigenesis of SCCOHT, the method comprising: detecting the lack of SMARCA4 and/or SMARCB1 proteins in SCCOHT tumor cells compared to normal cells of the same mammalian source, the lack of SMARCA4 and/or SMARCB1 proteins indicating the tumor suppressor nature of these proteins in the pathogenesis of SCCOHT. The said SMARCA4 and SMARCB1 proteins are protein products of gene members of the SWI/SNF complex.

In a fourth aspect, the present invention provides a method of reducing the risk and/or reducing the progression of SCCOHT in a subject. The method generally comprises identifying a predisposition for SCCOHT in the subject by screening for the presence of one or more inactivating germline and/or somatic mutations in the wild-type SMARCA4, SMARCC1 and/or SMARCE1 genes, or identifying a lack of SMARCA4 or SMARCB1 protein expression in SCCOHT tumor cells of SCCOHT patients; and administering to the subject one or more therapeutic treatments consisting of at least one selected from the group consisting of: SMARCA4 or SMARCC1 or SMARCE1 gene therapy, SMARCA4 or SMARCB1 protein replacement therapy, and/or SMARCA4 or SMARCB1 protein mimetics.

In one aspect, the method comprises identifying a predisposition for SCCOHT in the subject by screening for the presence of one or more inactivating germline and/or somatic mutations in the wild-type SMARCA4 gene, or identifying a lack of SMARCA4 or SMARCB1 protein expression in SCCOHT tumor cells of SCCOHT patients; and administering to the subject one or more therapeutic treatments consisting of at least one selected from the group consisting of: SMARCA4 gene therapy, SMARCA4 or SMARCB1 protein replacement therapy, and/or SMARCA4 or SMARCB1 protein mimetics.

In another aspect, the present invention provides a composition and kit for determining if a subject is predisposed to SCCOHT or for classifying the type of SCCOHT the subject has, the kit comprising of at least one oligonucleotide for specifically determining a presence or an absence of an inactivation alteration in at least one gene selected from the group consisting of SMARCA4, SMARCC1, and SMARCE1 genes of the SWI/SNF complex, the inactivation alteration of SMARCA4 gene comprises of a heterozygous nonsense mutation (c.T2935G) of the wild type SMARCA4 gene upstream of the helicase and bromodomains, or a frameshift mutation in exon 4 (c.722-735del GTCCCGGCCCGGCA) (SEQ ID NO: 1) of the wild type SMARCA4 gene removing all essential SMARCA4 functional domains, the inactivation alteration of SMARCC1 comprises of SMARCC1 V729A, or SMARCC1 intron deletion, the inactivation alteration of SMARCE1 comprises of SMARCE1 E411*.

In yet another aspect, the present invention provides a composition and kit for determining if a subject is predisposed to SCCOHT or for classifying the type of SCCOHT the subject has, the kit comprising of at least one oligonucleotide for specifically determining a presence or an absence of an inactivation alteration in at least one gene selected from the group consisting of SMARCB1, SMARCA2, and SMARCA4 of the SWI/SNF complex. In one embodiment, the inactivation alteration of SMARCA4 gene comprises a heterozygous nonsense mutation (c.T2935G) of the wild type SMARCA4 gene upstream of the helicase and bromodomains, or a frameshift mutation in exon 4 (c.722-735del GTCCCGGCCCGGCA) (SEQ ID NO: 1) of the wild type SMARCA4 gene removing all essential SMARCA4 functional domains.

In some embodiments, the method further comprises detecting a somatic alteration of the wild-type SMARCB1 gene or its expression product in the sample. In one aspect, the somatic alteration of the wild-type SMARCB1 gene is a homozygous frameshift mutation, p.Asn34fs, resulting from the deletion of 14 base pairs in exon 2 of SMARCB1.

In other embodiments, the method comprises screening a sample for an inactivation alteration, where in the inactivation alteration comprises a mutation in the wild-type SMARCA4 gene and a mutation in the wild-type SMARCA2 gene.

In yet other embodiments, the present invention is directed to a therapy for preventing and/or reducing the progression of SCCOHT in a subject having SCCOHT or having a predisposition to SCCOHT, the method comprising: (a) identifying a subject having SCCOHT or having a predisposition to SCCOHT comprising: (i) obtaining a sample from the subject; (ii) detecting in the sample an inactivation mutation in a SWI/SNF complex, wherein the mutation inactivates the SMARCA4 gene and indicates a predisposition to SCCOHT; and (iii) identifying the subject as having SCCOHT or having a predisposition for SCCOHT if the SWI/SNF inactivation alteration is detected in the sample; and (b) treating the identified subject with an inhibitor of a target gene that is synthetic lethal with the SMARCA4 gene. In one embodiment, the target gene is selected from the group consisting of ARID1A, SMARCA2, SMARCC1, SMARCD1, SMARCE1, BRD7, SMARCD2, and SMARCB1.

In another aspect, the present invention relates to a method of identifying an ovarian tumor as a small cell carcinoma of the ovary, hypercalcemic type (SCCOHT), the method comprising: obtaining a sample from the subject; measuring the presence or absence of SMARCA4 protein and/or SMARCA2 protein in the sample; and determining that the ovarian tumor is SCCOHT if the SMARCA4 protein and/or SMARCA2 protein is absent in the sample. In one embodiment, the presence or absence of SMARCA4 protein and/or SMARCA2 protein in the sample is measured with an immunoassay or mass spectrometry.

In yet another aspect, the present invention is directed to a method of treating SCCOHT in a subject in need thereof, the method comprising administering to the subject an effective amount of an epigenetic agent selected from the group consisting of a modifier of acetylated histones, a DNA methylation inhibitor, a histone methyltransferase inhibitor, and a histone deacetylase (HDAC) inhibitor. In one aspect, the epigenetic agent is an HDAC inhibitor. In another aspect, the HDAC inhibitor is selected from the group consisting of Romidepsin, Panobinostat, Belinostat, suberoylanilide hydroxamic acid (SAHA), and Entinostat.

In certain embodiments, the present invention is directed to a method of treating SCCOHT in a subject in need thereof, the method comprising administering to the subject an effective amount of an fibroblast growth factor receptor (FGFR) inhibitor and/or a receptor tyrosine kinase (RTK) of the TYRO3/AXUJMerTK family (MERTK) inhibitor. In one aspect, the FGFR inhibitor is ponatinib. In another aspect, the FGFR inhibitor and/or MERTK inhibitor is an siRNA molecule.

BRIEF DESCRIPTION OF THE DRAWINGS

FIG. 1 shows SMARCA4 mutations identified in germline and tumor DNA from SCCOHT patients and in genomic DNA from SCCOHT cell line. To identify potential germline mutations associated with SCCOHT development, exome sequencing was performed on peripheral blood DNA from 7 SCCOHT patients. Truncating mutations were observed in the chromatin remodeling gene SMARCA4 in 2 of 7 patients examined, diagnosed at ages 9 and 10. The 9-year-old patient (SCCO-008) bore the germline heterozygous nonsense mutation, c.T2935G (p.R979*) which truncates SMARCA4 upstream of the helicase and bromodomains. Similarly, germline DNA of the 10-year-old patient (SCCO-017) contained a frameshift mutation in exon 4, c.722-735del GGTCCCGGCCCGGCA (p.G241fs) (SEQ ID NO: 1), removing all essential SMARCA4 functional domains. Further, in order to identify somatic mutations, sequencing of genomic DNA from 9 SCCOHT tumors (SCCO-017, SCCO-012, SCCO-014, SCCO-015, DAS23, DAH456*, DAH457, DG1006*, DG1219*0) and 1 SCCOHT cell line, BIN-67 was carried out. SMARCA4 inactivating mutations were identified in 6 of 9 tumors, and in the BIN-67 cells. Two tumors (SCCO-014, DG1006*) harbored 2 mutations each. Of potential functional relevance, and similar to the 2 germline mutations identified in SCCO-008 and SCCO-017, the majority of somatic mutations mapped to the ATPase domain of SMARCA4 and were predicted to result in truncated proteins. Consistent with mutations identified in tumors, BIN-67 cells harbored 2 SMARCA4 splice site mutations.

FIG. 2 shows SMARCA4 immunohistochemistry (IHC) analysis of SCCOHT tumors. Immunohistochemical analysis of 15 tumors (6 overlapping with 12 cases sequenced in FIG. 1 and an additional 9 SCCOHT validation cases) revealed that 13 of 15 tumors (87%) lacked SMARCA4 protein. SMARCA4 staining was seen in only 2 tumors (SCCO-010, SCCO-018), both from pediatric patients. One case (SCCO-010) had no germline SMARCA4 mutations by exome sequencing as shown in FIG. 1 while the mutational status of the second case (SCCO-010) was unknown. Germline DNA of the 10-year-old patient (SCCO-017) contained a frameshift mutation in exon 4, c.722-735del GGTCCCGGCCCGGCA (p.G241fs) (SEQ ID NO: 1), removing all essential SMARCA4 functional domains. Importantly, all samples with SMARCA4 mutations had no detectable SMARCA4 protein.

FIG. 6 shows mutations identified in SWI/SNF complex subunits in SCCOHT. Sequencing analysis revealed mutations in SWI/SNF complex members other than SMARCA4 in only 2 of the 12 SCCOHT samples analyzed. Despite the absence of mutations in other SWI/SNF subunits in SCCOHT, SMARCC1 and SMARCE1 mutations were noticed in two cases (SCCO-010, DG1219*). This suggests that inactivation of the SWI/SNF complex may be an important oncogenic driver in SCCOHT, with SMARCA4 mutations as the preferential mode of inactivation. Germline DNA of the 10-year-old patient (SCCO-017) contained a frameshift mutation in exon 4, c.722-735del GGTCCCGGCCCGGCA (p.G241fs) (SEQ ID NO: 1), removing all essential SMARCA4 functional domains.

FIG. 7 shows demographic, pathologic and clinical data of the SCCOHT patient cohort. Chemo Abbreviations: P=Paclitaxel; Tt=Taxotere; Cddp=Cisplatin; Cb=Carboplatin; Cy=Cyclophosphamide; B=Bleomycin; Db=Doxorubicin; E=Etoposide; V=Vinblastine; I=Ifosfamide; Av=Avastin; G=Gemcitabine; Am=Amrubicin; Ir=Irinotecan; Th=Thiotepa; M=Melphalan. Surgery Abbreviations: AB=Abdominal mass excision; ABL=Aortic bifurcation lymphadenectomy; AL=Aortic lymphadenectomy; Appy=Appendectomy; BSO=Bilateral salpingo-oophorectomy; CIL=Common iliac lymphadenectomy; EIL=External iliac lymphadenectomy; HPeriAL=High periaortic lymphadenectomy; IIL=Internal iliac lymphadenectomy; IR=Infrarenal lymphadenectomy; JRVCL=Juxta renal, vena caval lymphadenectomy; LAD=Lymphadenectomy; LSO=Left salpingo-oophorectomy; MesenAL=Mesenteric lymphadenectomy; O=Oophorectomy; OL=Obturator lymphadenectomy; OM=Omentectomy; PaLNS=Para-aortic lymph node sampling; ParaAL=Paraaortic lympadenectomy; PCL=Precaval lymphadenectomy; PelvL=Pelvic lymphadenectomy; PeriAL=Periaortic lymphadenectomy; PerientAL=Perien-- teric lymphadenectomy; PLNS=Pelvic lymph node sampling; RSO=Right salpingo-oophorectomy; SigRsxn=Sigmoid colon implant excision; SrpaoAL=Supra renal para aortic lymphadenectomy; TAH=Total abdominal hysterectomy; USO=Unilateral salpingo-oophorectomy; XLAP=Exploratory laparotomy. Other: NED=No evidence of disease; SD=Secondary debulking

FIG. 12A—Representative cell cycle and ploidy analysis of sorted diploid and tetraploid populations from SCCO-006 FFPE tumor sample. FIG. 12B—Genome-wide frequency plots of copy number alterations identified by aCGH analysis of 2N and 4N tumor cell populations from SCCO-006 FFPE tumor tissue. Individual and aggregate copy number aberration (CNA) plots are shown. FIG. 12C—Individual and aggregate genome-wide frequency plots of copy number alterations identified in the DNA of 4N cell populations isolated from 15 SCCOHT tumors. Sample plots were generated using Nexus software (Biodiscovery). Any region that surpassed our threshold for gain or loss (−0.35<x>0.4) is shown as a red (loss) or blue (gain) segment of change.

FIG. 13 depicts candidate therapeutic targets for SCCOHT identified by gene expression microarray analysis of 4 SCCOHT tumors compared to normal ovary tissue.

FIGS. 16A and 16B show single nucleotide polymorphisms unique to SCCOHT tumor cells.

FIG. 18A shows protein expression of SMARCA2 and SMARCA4 in BIN67 and SCCOHT1, immortalized primary granulosa line (SVOG) and adult granulosa cell tumor line (KGN). FIG. 18B shows SMARCA2 is induced by TSA treatment. FIGS. 18C and 18D show Lentivirus-based re-expression of SMARCA4/A2 in BIN67 cells inhibits cell growth.

FIGS. 19A and 19B show SWI/SNF Complex membership in BIN67 and SCCOHT1 cells. FIG. 19A shows whole cell extracts from BIN67 and SCCOHT1 (SCCOHT), G401 (MRT), D980R (HeLa) and A427 (NSCLC) cells were separated by SDS-PAGE and assessed for complex members using the designated antibodies. KU70 and KU80 proteins served as loading controls for nuclear proteins. FIG. 19B shows nuclear extracts from BIN67 cells were immunoprecipitated with an antibody against BAF155, separated by SDS-PAGE, in-gel digested and tryptic peptides identified after separation by two-dimensional reverse-phase/reverse-phase chromatography.

FIG. 21 depicts SCCOHT sensitivity to epigenetic agents. Cells plated at 1,000 cells/well in a 384-well plate were treated with indicated agents using a serial 3-fold 20-point dilution series. Cell viability was measured 3 days after treatment using CellTiter Glo. Surviving cells were measured and normalized to DMSO-treated cells and IC50s calculated by curve-fitting.

FIG. 22A shows the effect on viability of siRNA inhibition of FGFR1, FGFR4 and MERTK. Four unique sequences per target were tested; GFP sequence is used as a negative scramble control. Cell viability was measured using CellTiter Glo. FIG. 22B shows FGFR compounds profiling in a drug dose-dependent manner.

DETAILED DESCRIPTION

Figures 3A, 3B, 3C:
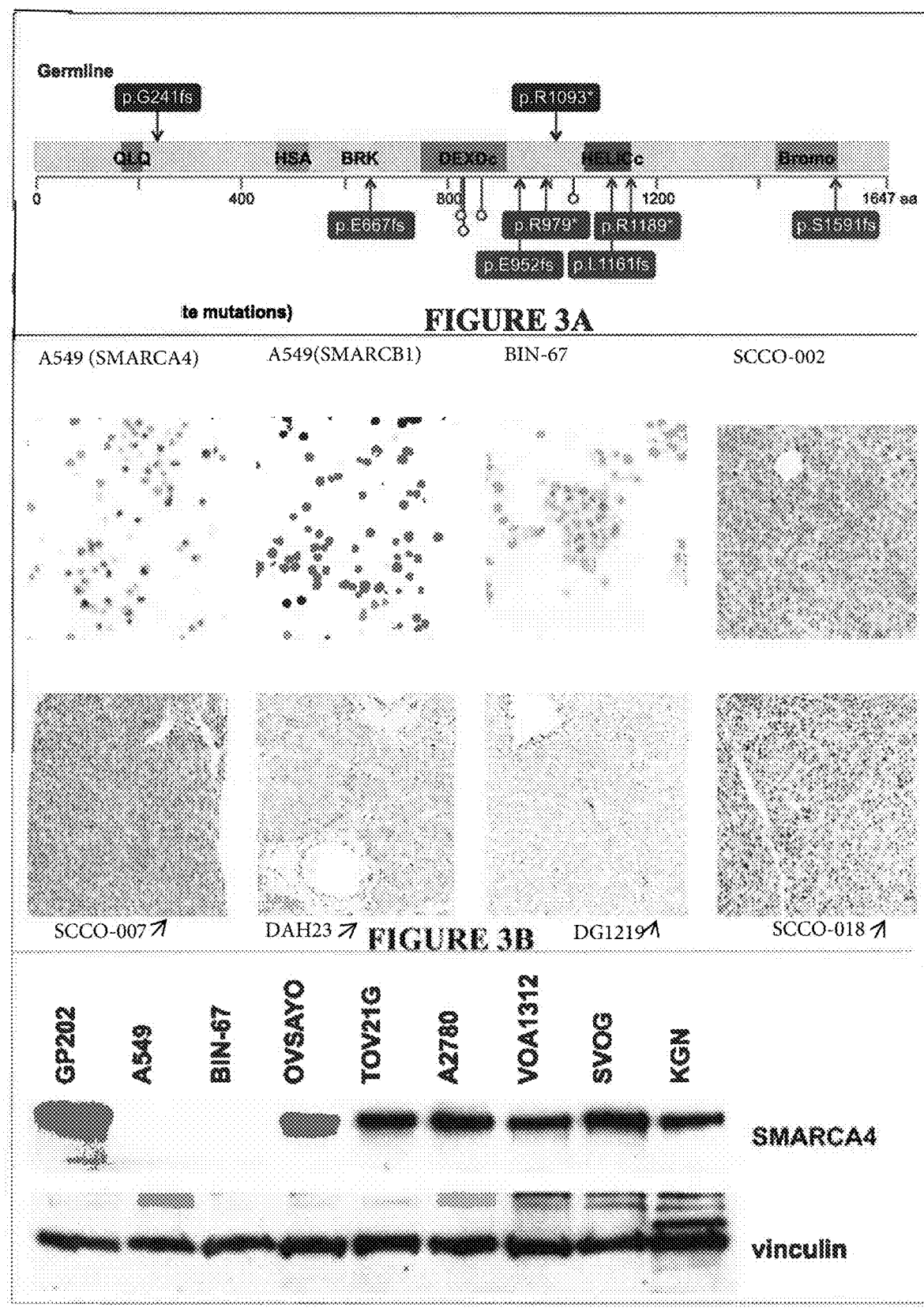
FIG. 3A depicts a schematic representation of SMARCA4 protein domains, showing the location of mutations (predicted protein alterations shown in Table 1: p.R979*, p.G241fs, p.E667fs, p.L1161fs, p.R1189*, p.R1093*, p.E952fs, p.S1591fs) identified in SCCOHT germline and tumor DNA samples. Gin, Leu, Gin (QLQ) motif, helicase/SANT-associated (HSA) domain, Brahma and Kismet (BRK) domain, DEAD-like helicase superfamily (DEXDc) and helicase superfamily c-terminal (HELICc) domain and bromodomain (Bromo).
FIG. 3B shows SMARCA4 IHC analysis. Representative images of four SMARCA4 negative SCCOHT tumors and one SMARCA4 negative cell line (BIN-67) are shown. SMARCA4 staining was seen in only 2 tumors, both from pediatric patients (one of which, SCCO-018 shown). Importantly, all samples with SMARCA4 mutations had no detectable SMARCA4 protein. This effect is specific to tumor cells, as normal cells within the same sections show robust SMARCA4 staining. IHC of A549 cells for SMARCA4 and SMARCB1 was used as negative and antibody specificity controls.
FIG. 3C shows SMARCA4 protein expression in representative cell lines from 5 major ovarian carcinoma subtypes (small cell, BIN-67; high-grade serous, OVSAYO; clear cell, TOV21G; endometrioid, A2780; low-grade serous, VOA1312), immortalized granulosa cells (SVOG), and an adult granulosa cell tumor cell line (KGN). Lung (A549) and gastric (GP202) carcinoma cell lines were included as negative and positive SMARCA4 expression controls, respectively. The BIN-67 SCCOHT cell line, which harbors 2 splice site mutations in SMARCA4, showed complete absence of SMARCA4 protein. In contrast, representative cell lines from 4 ovarian carcinoma subtypes, as well as immortalized granulosa cells (SVOG) and adult granulosa tumor cells (KGN) all maintained SMARCA4 expression.

As used herein, the verbs "comprise" and "include" as used in this description and in the claims and their conjugations are used in their non-limiting sense to mean that items following the words are included, but items not specifically mentioned are not excluded. In addition, reference to an element by the indefinite article "a" or "an" does not exclude the possibility that more than one of the elements are present, unless the context clearly requires that there is one and only one of the elements. The indefinite article "a" or "an" thus usually means "at least one".

As used herein, the term "subject" or "patient" refers to any vertebrate including, without limitation, humans and other primates (e.g., chimpanzees and other apes and monkey species), farm animals (e.g., cattle, sheep, pigs, goats and horses), domestic mammals (e.g., dogs and cats), laboratory animals (e.g., rodents such as mice, rats, and guinea pigs), and birds (e.g., domestic, wild and game birds such as chickens, turkeys and other gallinaceous birds, ducks, geese, and the like). In some implementations, the subject may be a mammal. In other implementations, the subject may be a human.

As used herein, the term "derived from" refers to the origin or source, and may include naturally occurring, recombinant, unpurified, or purified molecules. The proteins and molecules of the present invention may be derived from human or non-human molecules.

As used herein, the term "nucleic acid" refers to a polymeric form of nucleotides of any length, either ribonucleotides or deoxyribonucleotides, or analogs thereof. This term refers to the primary structure of the molecule, and thus includes double- and single-stranded DNA, as well as double- and single-stranded RNA. It also includes modified nucleic acids such as methylated and/or capped nucleic acids, nucleic acids containing modified bases, backbone modifications, and the like. The terms "nucleic acid" and "nucleotide sequence" are used interchangeably.

As used herein, the term "gene" refers to a nucleic acid or portion of a nucleic acid comprising a sequence that encodes a protein. It is understood in the art that a gene also comprises non-coding sequences, such as 5' and 3' flanking sequences (such as promoters, enhancers, repressors, and other regulatory sequences) as well as introns.

As used herein, the terms "polynucleotide", "polynucleotide sequence", "nucleic acid sequence", "nucleic acid fragment", and "isolated nucleic acid fragment" are used interchangeably herein. These terms encompass nucleotide sequences and the like. A polynucleotide may be a polymer of RNA or DNA that is single- or double-stranded, that optionally contains synthetic, non-natural or altered nucleotide bases. A polynucleotide in the form of a polymer of DNA may be comprised of one or more segments of cDNA, genomic DNA, synthetic DNA, or mixtures thereof. Nucleotides (usually found in their 5'-monophosphate form) are referred to by a single letter designation as follows: "A" for adenylate or deoxyadenylate (for RNA or DNA, respectively), "C" for cytidylate or deoxycytidylate, "G" for guanylate or deoxyguanylate, "U" for uridylate, "T" for deoxythymidylate, "R" for purines (A or G), "Y" for pyrimidines (C or T), "K" for G or T, "H" for A or C or T, "I" for inosine, and "N" for any nucleotide.

As used herein, the terms "polypeptide," "peptide," and "protein" are used interchangeably herein to refer to polymers of amino acids of any length. These terms also include proteins that are post-translationally modified through reactions that include glycosylation, acetylation and phosphorylation.

As used herein, the term "nucleotide" is defined as a modified or naturally occurring deoxyribonucleotide or ribonucleotide. Nucleotides typically include purines and pyrimidines, which include thymidine, cytidine, guanosine, adenine and uridine.

As used herein, the term "oligonucleotide" is defined as an oligomer of the nucleotides defined above.

As used herein, the term "nucleotide change" refers to, e.g., nucleotide substitution, deletion, and/or insertion, as is well understood in the art. For example, mutations can be those containing alterations that produce silent substitutions, additions, or deletions, but do not alter the properties or activities of the encoded protein or how the proteins are made.

As used herein, the term "protein modification" refers to, e.g., amino acid substitution, amino acid modification, deletion, and/or insertion, as is well understood in the art.

As used herein, the term "agent", as used herein, means a biological or chemical compound such as a simple or complex organic or inorganic molecule, a peptide, a protein or an oligonucleotide that modulates the function of a nucleic acid or polypeptide. A vast array of compounds can be synthesized, for example oligomers, such as oligopeptides and oligonucleotides, and synthetic organic and inorganic compounds based on various core structures, and these are also included in the term "agent". In addition, various natural sources can provide compounds for screening, such as plant or animal extracts, and the like. Compounds can be tested singly or in combination with one another.

As used herein, the term "at least a portion" of a nucleic acid or polypeptide means a portion having the minimal size characteristics of such sequences, or any larger fragment of the full length molecule, up to and including the full length molecule. For example, a portion of a nucleic acid may be 12 nucleotides, 13 nucleotides, 14 nucleotides, 15 nucleotides, 16 nucleotides, 17 nucleotides, 18 nucleotides, 19 nucleotides, 20 nucleotides, 22 nucleotides, 24 nucleotides, 26 nucleotides, 28 nucleotides, 30 nucleotides, 32 nucleotides, 34 nucleotides, 36 nucleotides, 38 nucleotides, 40 nucleotides, 45 nucleotides, 50 nucleotides, 55 nucleotides, and so on, going up to the full length nucleic acid. Similarly, a portion of a polypeptide may be 4 amino acids, 5 amino acids, 6 amino acids, 7 amino acids, and so on, going up to the full length polypeptide. The length of the portion to be used will depend on the particular application. A portion of a nucleic acid useful as hybridization probe may be as short as 12 nucleotides; in one embodiment, it is 20 nucleotides. A portion of a polypeptide useful as an epitope may be as short as 4 amino acids. A portion of a polypeptide that performs the function of the full-length polypeptide would generally be longer than 4 amino acids.

As used herein, the term "sequence identity" or "identity" in the context of two nucleic acid or polypeptide sequences includes reference to the residues in the two sequences which are the same when aligned for maximum correspondence over a specified comparison window. When percentage of sequence identity is used in reference to proteins it is recognized that residue positions which are not identical often differ by conservative amino acid substitutions, where amino acid residues are substituted for other amino acid residues with similar chemical properties (e.g., charge or hydrophobicity) and therefore do not change the functional properties of the molecule. Where sequences differ in conservative substitutions, the percent sequence identity may be adjusted upwards to correct for the conservative nature of the substitution. Sequences which differ by such conservative substitutions are said to have "sequence similarity" or "similarity." Means for making this adjustment are well-known to those of skill in the art. Typically this involves scoring a conservative substitution as a partial rather than a full mismatch, thereby increasing the percentage sequence identity. Thus, for example, where an identical amino acid is given a score of 1 and a non-conservative substitution is given a score of zero, a conservative substitution is given a score between zero and 1. The scoring of conservative substitutions is calculated, e.g., according to the algorithm of Meyers and Miller, Computer Applic. Biol. Sci., 4:11-17 (1988).

As used herein, "coding sequence" refers to a DNA sequence that codes for a specific amino acid sequence. "Regulatory sequences" refer to nucleotide sequences located upstream (5' non-coding sequences), within, or downstream (3' non-coding sequences) of a coding sequence, and which influence the transcription, RNA processing or stability, or translation of the associated coding sequence.

As used herein, "regulatory sequences" may include, but are not limited to, promoters, translation leader sequences, introns, and polyadenylation recognition sequences.

As used herein, "promoter" refers to a DNA sequence capable of controlling the expression of a coding sequence or functional RNA. The promoter sequence consists of proximal and more distal upstream elements, the latter elements often referred to as enhancers. Accordingly, an "enhancer" is a DNA sequence that can stimulate promoter activity, and may be an innate element of the promoter or a heterologous element inserted to enhance the level or tissue-specificity of a promoter. Promoters may be derived in their entirety from a native gene, or be composed of different elements derived from different promoters found in nature, or even comprise synthetic DNA segments. It is understood by those skilled in the art that different promoters may direct the expression of a gene in different tissues or cell types, or at different stages of development, or in response to different environmental conditions. It is further recognized that since in most cases the exact boundaries of regulatory sequences have not been completely defined, DNA fragments of some variation may have identical promoter activity. Promoters that cause a gene to be expressed in most cell types at most times are commonly referred to as "constitutive promoters".

As used herein, the "3' non-coding sequences" refer to DNA sequences located downstream of a coding sequence and include polyadenylation recognition sequences and other sequences encoding regulatory signals capable of affecting mRNA processing or gene expression. The polyadenylation signal is usually characterized by affecting the addition of polyadenylic acid tracts to the 3' end of the mRNA precursor. The use of different 3' non-coding sequences is exemplified by Ingelbrecht, I. L., et al. (1989) Plant Cell 1:671-680.

As used herein, the term "operably linked" refers to the association of nucleic acid sequences on a single nucleic acid fragment so that the function of one is regulated by the other. For example, a promoter is operably linked with a coding sequence when it is capable of regulating the expression of that coding sequence (i.e., that the coding sequence is under the transcriptional control of the promoter). Coding sequences can be operably linked to regulatory sequences in a sense or antisense orientation. In another example, the complementary RNA regions of the invention can be operably linked, either directly or indirectly, 5' to the target mRNA, or 3' to the target mRNA, or within the target mRNA, or a first complementary region is 5' and its complement is 3' to the target mRNA.

As used herein, the term "recombinant" refers to an artificial combination of two otherwise separated segments of sequence, e.g., by chemical synthesis or by the manipulation of isolated segments of nucleic acids by genetic engineering techniques.

As used herein, the phrases "recombinant construct", "expression construct", "chimeric construct", "construct", and "recombinant DNA construct" are used interchangeably herein. A recombinant construct comprises an artificial combination of nucleic acid fragments, e.g., regulatory and coding sequences that are not found together in nature. For example, a chimeric construct may comprise regulatory sequences and coding sequences that are derived from different sources, or regulatory sequences and coding sequences derived from the same source, but arranged in a manner different than that found in nature. Such construct may be used by itself or may be used in conjunction with a vector. If a vector is used then the choice of vector is dependent upon the method that will be used to transform host cells as is well known to those skilled in the art. For example, a plasmid vector can be used. The skilled artisan is well aware of the genetic elements that must be present on the vector in order to successfully transform, select and propagate host cells comprising any of the isolated nucleic acid fragments of the invention. The skilled artisan will also recognize that different independent transformation events will result in different levels and patterns of expression (Jones et al., (1985) EMBO J. 4:2411-2418; De Almeida et al., (1989) Mol. Gen. Genetics 218:78-86), and thus that multiple events must be screened in order to obtain lines displaying the desired expression level and pattern. Such screening may be accomplished by Southern analysis of DNA, Northern analysis of mRNA expression, immunoblotting analysis of protein expression, or phenotypic analysis, among others. The term "expression", as used herein, refers to the production of a functional end-product e.g., a mRNA or a protein (precursor or mature).

As used herein, the term "transformation" refers to the transfer of nucleic acid (i.e., a nucleotide polymer) into a cell. As used herein, the term "genetic transformation" refers to the transfer and incorporation of DNA, especially recombinant DNA, into a cell.

As used herein, the term "transformant" refers to a cell, tissue or organism that has undergone transformation. The original transformant is designated as "T0" or "$T_0$." Selfing the T0 produces a first transformed generation designated as "T1" or "$T_1$."

As used herein, the term "transgene" refers to a nucleic acid that is inserted into an organism, host cell or vector in a manner that ensures its function.

As used herein, the term "transgenic" refers to cells, cell cultures, organisms (e.g., plants), and progeny which have received a foreign or modified gene by one of the various methods of transformation, wherein the foreign or modified gene is from the same or different species than the species of the organism receiving the foreign or modified gene.

As used herein, "antisense inhibition" or "antisense silencing" refers to the production of antisense RNA transcripts capable of suppressing the expression of the target protein. "Co-suppression" refers to the production of sense RNA transcripts capable of suppressing the expression of identical or substantially similar foreign or endogenous genes (U.S. Pat. No. 5,231,020).

As used herein, the term "vector", "plasmid", or "construct" refers broadly to any plasmid or virus encoding an exogenous nucleic acid. The term should also be construed to include non-plasmid and non-viral compounds which facilitate transfer of nucleic acid into virions or cells, such as, for example, polylysine compounds and the like. The vector may be a viral vector that is suitable as a delivery vehicle for delivery of the nucleic acid, or mutant.

As used herein, the term "predisposed" when used with respect to cancer refers to an individual who is more susceptible to develop cancer than non-predisposed individuals. It should be noted that the predisposition is determined when the subject is free of the cancer or not yet diagnosed with the cancer. The cancer according to some embodiments of the invention can be any solid tumor, non-solid tumor and/or cancer metastases.

As used herein, the term "wild-type gene" refers to an allele that is most commonly found in nature or is otherwise designated normal. For the purpose of the present invention, the term "wild-type gene" means a normal gene.

As used herein, the term "mutant gene" refers to a gene that differs from a wild-type gene in DNA structure and sequence or function.

As used herein, the term "mutation" is meant to include all kinds of nuclear and/or mitochondrial gene mutations, including point mutations and small insertion/deletion mutations (e.g., 1-50-bp insertion or deletion mutation).

Mutations can lead to changes in the structure of an encoded protein or to a decrease or complete loss in its expression. Because a change in the DNA sequence affects all copies of the encoded protein, mutations can be particularly damaging to a cell or organism. In contrast, any alterations in the sequences of RNA or protein molecules that occur during their synthesis are less serious because many copies of each RNA and protein are synthesized.

A fundamental genetic difference between organisms is whether their cells carry a single set of chromosomes or two copies of each chromosome. The former are referred to as haploid; the latter, as diploid. Many simple unicellular organisms are haploid, whereas complex multicellular organisms (e.g., fruit flies, mice, humans) are diploid. Different forms of a gene (e.g., normal and mutant) are referred to as alleles. Since diploid organisms carry two copies of each gene, they may carry identical alleles, that is, be homozygous for a gene, or carry different alleles, that is, be heterozygous for a gene. A recessive mutation is one in which both alleles must be mutant in order for the mutant phenotype to be observed; that is, the individual must be homozygous for the mutant allele to show the mutant phenotype. In contrast, the phenotypic consequences of a dominant mutation are observed in a heterozygous individual carrying one mutant and one normal allele. Geneticists often distinguish between the genotype and phenotype of an organism. Strictly speaking, the entire set of genes carried by an individual is its genotype, whereas the function and physical appearance of an individual is referred to as its phenotype.

For a recessive mutation to give rise to a mutant phenotype in a diploid organism, both alleles must carry the mutation. However, one copy of a dominant mutant allele leads to a mutant phenotype. Recessive mutations inactivate the affected gene and lead to a loss of function. For instance, recessive mutations may remove part of or all the gene from the chromosome, disrupt expression of the gene, or alter the structure of the encoded protein, thereby altering its function. Conversely, dominant mutations often lead to a gain of function. For example, dominant mutations may increase the activity of a given gene product, confer a new activity on the gene product, or lead to its inappropriate spatial and temporal expression. Dominant mutations, however, may be associated with a loss of function. In some cases, two copies of a gene are required for normal function, so that removing a single copy leads to mutant phenotype. Such genes are referred to as haplo-insufficient. In other cases, mutations in one allele may lead to a structural change in the protein that interferes with the function of the wild-type protein encoded by the other allele. These are referred to as dominant negative mutations.

Some alleles can be associated with both a recessive and a dominant phenotype. For example, fruit flies heterozygous for the mutant Stubble (Sb) allele have short and stubby body hairs rather than the normal long, slender hairs; the mutant allele is dominant in this case. In contrast, flies homozygous for this allele die during development. Thus the recessive phenotype associated with this allele is lethal, whereas the dominant phenotype is not.

Recessive and dominant mutations can be distinguished because they exhibit different patterns of inheritance. The body (somatic) cells of most multicellular organisms divide by mitosis, whereas the germ cells that give rise to gametes (sperm and egg cells in higher plants and animals) undergo meiosis. Like body cells, premeiotic germ cells are diploid, containing two of each morphologic type of chromosome. Because the two members of each such pair of homologous chromosomes are descended from different parents, their genes are similar but not usually identical. Single-celled organisms (e.g., the yeast *S. cerevisiae*) that are diploid at some phase of their life cycle also undergo meiosis. One round of DNA replication, which makes the cell 4n, is followed by two separate cell divisions, yielding four haploid (1n) cells that contain only one chromosome of each homologous pair. The apportionment, or segregation, of homologous chromosomes to daughter cells during the first meiotic division is random; that is, the maternally and paternally derived members of each pair, called homologs, segregate independently, yielding germ cells with different mixes of paternal and maternal chromosomes. Thus parental characteristics are reassorted randomly into each new germ cell during meiosis. The number of possible varieties of meiotic segregants is $2^n$, where n is the haploid number of chromosomes. In the case of a single chromosome, meiosis gives rise to two types of gametes; one type carries the maternal homolog and the other carries the paternal homolog. mating of wild-type individuals with mutants carrying either a dominant or a recessive mutation.

Different Types of Mutations:

(a) Point mutations, which involve alteration in a single base pair, and small deletions generally directly affect the function of only one gene. Changes in a single base pair may produce one of three types of mutation: Missense mutations lead to a change in a single amino acid in the encoded protein. In a nonsense mutation, a nucleotide base change leads to the formation of a stop codon. This results in premature termination of translation, thereby generating a truncated protein. Frameshift mutations involve the addition or deletion of any number of nucleotides that is not a multiple of three, causing a change in the reading frame. Consequently, completely unrelated amino acid residues are incorporated into the protein prior to encountering a stop codon; (b) Chromosomal mutations, which involve alterations in large segments of DNA. Presumably these abnormalities arise owing to errors in the mechanisms for repairing double-strand breaks in DNA. Inversions occur when a break is rejoined to the correct chromosome but in an incorrect orientation; deletions, when a segment of DNA is lost; translocations, when breaks are rejoined to the wrong chromosomes; and insertions, when a segment from one chromosome is inserted into another chromosome.

As used herein, the term "inactivating alteration" includes any genetic alteration of the DNA which finally leads to a reduced function or even to a partial or complete loss of function (inactive) of the resultant expression products, such as, mRNA or the protein product. The genetic alteration can be due to a mutation. For example, in the present invention: (a) a heterozygous nonsense mutation (c.T2935G) of the wild type SMARCA4 gene upstream of the helicase and bromodomains results in an inactive (complete loss of function) SMARCA4 protein with a predicted protein alteration of p.R979*; (b) a frameshift mutation in exon 4 (c.722-735del GGTCCCGGCCCGGCA) (SEQ ID NO: 1) of the wild type SMARCA4 gene removing all essential SMARCA4 functional domains results in an inactive (complete loss of function) SMARCA4 protein product with a predicted protein alteration of p.G241fs.

As used herein, the term "truncation mutation" means a mutation in a DNA sequence that results in a truncated, and often nonfunctional or reduced functional protein product.

The present invention relates to methods and kits for screening for the existence or predisposition for small cell carcinoma of the ovary, hypercalcemic type (SCCOHT).

In a particular aspect, the present invention provides a method for diagnosing SCCOHT comprising detecting a germline alteration of the wild-type SMARCA4 gene or its expression products in a mammalian sample, said alteration indicating a predisposition to said SCCOHT. The alteration of the wild-type SMARCA4 gene comprises an inactivating truncation mutation in the wild-type SMARCA4 gene such as a heterozygous nonsense mutation (c.T2935G) of the wild type SMARCA4 gene upstream of the helicase and bromodomains resulting in a truncated SMARCA4 protein product with a predicted protein alteration of p.R979* or a frameshift mutation in exon 4 (c.722-735del GGTCCCGGCCCGGCA) (SEQ ID NO: 1) of the wild type SMARCA4 gene removing all essential SMARCA4 functional domains resulting in a truncated SMARCA4 protein product with a predicted protein alteration of p.G241fs.

In one aspect, the present disclosure provides a method for diagnosing SCCOHT comprising detecting a somatic alteration of the wild-type SMARCA4 gene or its expression products in a mammalian sample, the alteration indicating a predisposition to SCCOHT. The alteration of the wild-type SMARCA4 gene is detected by sequencing of genomic DNA from SCCOHT tumors and/or SCCOHT cell lines such as BIN-67. The alteration of the wild-type SMARCA4 gene comprises a monoallelic or biallelic inactivating truncation mutation in the wild-type SMARCA4 gene within its ATPase domain or resulting in a truncated SMARCA4 protein product or a splice site variation of the wild-type SMARCA4 gene resulting in a truncated SMARCA4 protein product.

In another aspect, the present invention provides a method of identification of key factors in the tumorigenesis of SCCOHT comprising: detecting the lack of SMARCA4 and/or SMARCB1 proteins in SCCOHT tumor cells compared to normal cells of the same mammalian source, the lack of SMARCA4 and/or SMARCB1 proteins indicating the tumor suppressor nature of these proteins in the pathogenesis of SCCOHT. The SMARCA4 and SMARCB1 proteins are protein products of gene members of the SWI/SNF complex.

In yet another aspect, the present invention provides a method of screening a subject for a predisposition for small cell carcinoma of the ovary, hypercalcemic type (SCCOHT), the method comprising: obtaining a sample from the subject; detecting in the sample a germline or somatic inactivation alteration in the SMARCC1 and/or SMARCE1 genes, the alteration indicating a predisposition to SCCOHT; and determining that the subject has a redisposition for SCCOHT if the SMARCC1 and/or SMARCE1 inactivation alteration is detected. The inactivation alteration in the SMARCC1 and/or SMARCE1 genes comprises of at least one mutation selected from the group consisting of SMARCC1 V729A, SMARCC1 intron deletion, and SMARCE1 E411*.

In certain embodiments, the present invention provides a method of development of therapy for prevention and/or reducing the progression of SCCOHT in a given subject comprising: identifying predisposition of a subject to SCCOHT based on the presence of inactivating germline and/or somatic mutations in the wild-type SMARCA4, SMARCC1 and/or SAARCE1 genes, or identifying lack of SMARCA4 or SMARCB1 protein expression in SCCOHT tumor cells of SCCOHT patients; and developing therapies to target the vulnerabilities of SMARCA4, SMARCB1 deficient cells in SCCOHT patients and/or prevent the development of SCCOHT in subjects with SCCOHT predisposition. The therapeutic approaches consist of at least one selected from the group consisting of SMARCA4 or SMARCC1 or SMARCE1 gene therapy, SMARCA4 or SMARCB1 protein replacement therapy, and/or SMARCA4 or SMARCB1 protein mimetics.

In one embodiment, the present invention provides a method of development of therapy for prevention and/or reducing the progression of SCCOHT in a given subject comprising: identifying predisposition of a subject to SCCOHT based on the presence of inactivating germline mutations in the wild-type SMARCA4 gene, or identifying lack of SMARCA4 or SMARCB1 protein expression in SCCOHT tumor cells of SCCOHT patients; and developing therapies to target the vulnerabilities of SMARCA4, SMARCB1 deficient cells in SCCOHT patients and/or prevent the development of SCCOHT in subjects with SCCOHT predisposition In other embodiments, the present invention provides a composition and kit for determining if an individual is predisposed to SCCOHT, the kit comprising of at least one oligonucleotide for specifically determining a presence or an absence of an inactivation alteration in at least one gene selected from the group consisting of SMARCA4, SMARCC1, and SMARCE1 genes of the SWI/SNF complex, the inactivation alteration of SMARCA4 gene comprises of a heterozygous nonsense mutation (c.T2935G) of the wild type SMARCA4 gene upstream of the helicase and bromodomains, or a frameshift mutation in exon 4 (c.722-735del GTCCCGGCCCGGCA) (SEQ ID NO: 1) of the wild type SMARCA4 gene removing all essential SMARCA4 functional domains, the inactivation alteration of SMARCC1 comprises of SMARCC1 V729A, or SMARCC1 intron deletion, the inactivation alteration of SMARCE1 comprises of SMARCE1 E411*.

In yet another embodiment, the present invention provides a composition and kit for determining if an individual is predisposed to SCCO, the kit comprising of at least one oligonucleotide for specifically determining a presence or an absence of an inactivation alteration in at least one gene selected from the group consisting of SMARCA4 and SMARCC1 genes of the SWI/SNF complex. In one aspect, the inactivation alteration of SMARCA4 gene comprises a heterozygous nonsense mutation (c.T2935G) of the wild type SMARCA4 gene upstream of the helicase and bromodomains, or a frameshift mutation in exon 4 (c.722-735del GTCCCGGCCCGGCA) (SEQ ID NO: 1) of the wild type SMARCA4 gene removing all essential SMARCA4 functional domains.

Small Cell Carcinoma of the Ovary (SCCO)

Small Cell Carcinoma of the Ovary (SCCO) is a rare, highly aggressive malignancy most often diagnosed in very young adults (average 23.4 years) and in a significant number of pediatric patients (Young and Scully, 1994; Florell et al., 1999; Distelmaier et al., 2006; Estel et al., 2011). SCCO primary tumors are usually large (average 14.7 cm) and with regional tumor spread (Young and Scully, 1994). Symptoms of SCCO are similar to those of more common forms of ovarian cancer except more than 70% of SCCO cases present with paraneoplastic hypercalcemia (Young and Scully, 1994), and can thus experience the paraneoplastic effects of this disorder, including pancreatitis and altered mental status (Wynn et al., 2004). SCCO tumors are thus also referred to as SCCOHT (Hypercalcemic Type). With just over 400 cases reported in the literature since Dickersin and Scully first described SCCOHT in 1982, the molecular biology of these rapidly dividing tumors remains poorly understood (Pressey et al., 2013). The early age of onset and aggressive nature of SCCOHT highly suggest an underlying genetic causation. Moreover, there are several reports of cases occurring in family members, suggesting that SCCOHT can be heritable (Ulbright et al., 1987; Lamovec et al., 1995).

The young age and the presence of paraneoplastic hypercalcemia in women with an undifferentiated, aggressive primary ovarian malignancy should already serve as strong indicators for the differential diagnosis of SCCOHT. In addition, even though the cellular origin of SCCOHT remains unknown, SCCOHT can be distinguished from more common types of ovarian cancer and small cell carcinomas by its histological appearance, immunoprofile, and cytogenetic characteristics. Histologically, SCCOHT tumors are composed of sheets of small, tightly packed cells, with scant cytoplasm and hyperchromatic nuclei, frequently interrupted by follicle-like structures. About 50% of SCCOHT tumors also contain populations of cells with abundant eosinophilic cytoplasm and large nuclei and are known as the "large-cell variant" of SCCOHT. As previously described by McCluggage et al. and others, SCCOHT tumors show a unique immunohistochemical staining pattern that includes expression of WT1, vimentin, cytokeratins and p53, and lack of inhibin, chromogranin, TTF1, S100 and AFP. Immunoreactivity for parathyroid hormone-related protein (PTHrP) has been detected in some tumors; however, the presence and strength of immunoreactivity does not seem to correlate with the presence or degree of hypercalcemia. Due to the consistently unique clinicopathological features, SCCOHT tumors are recognized as an independent entity and are classified under the "miscellaneous tumors of the ovary" by the World Health Organization.

Current treatment for SCCOHT consists of surgical debulking followed by chemotherapy and/or radiation or autologous stem cell transplantation. Despite recent successful outcomes reported in a proportion of pediatric and some adult SCCOHT cases following multi-agent and multi-modal treatment regimens, greater than 75% of patients succumb to their disease within 1-2 years of diagnosis, even if diagnosed at an early stage. In a study of 150 SCCOHT cases, Young and colleagues found that for patients diagnosed greater than stage IA, a more favorable prognosis was correlated with a) normal preoperative serum calcium, b) greater than 30 years of age at diagnosis, c) a tumor size less than 10 cm, and d) absence of large tumor cells. The majority of patients however, are not classified within these parameters.

The most successful chemotherapeutic regimens reported to date are the dose-intense combinations PAVEP (cisplatin, adriamycin, vepeside, cyclophosphamide) and VPCBAE (vinblastine, cisplatin, cyclophosphamide, bleomycin, doxorubicin, etoposide). The use of imatinib or bevacizumab in combination with VPCBAE has also been reported in two successfully treated patients whose tumors showed expression of c-KIT and of VEGF, respectively. A number of other research efforts aimed at identifying genetic defects and actionable therapeutic targets in SCCOHT, suggest that SCCOHT tumors lack the mutational spectrum characteristic of the major histopathological subtypes of ovarian cancer. SCCOHT tumors have been consistently found to express p53 protein; but no TP53 mutations associated with SCCOHT have been identified. Idei et al. (HumPath 1996) also did not find aberrations in p53 or adenomatous polyposis coli (APC) in the tumor of a 46-year old SCCOHT patient; but detected a K-ras codon-12 mutation. In a study by Pennington et al. where non-serous ovarian, fallopian tube, and peritoneal carcinomas were tested for the presence of germline and somatic mutations in 15 homologous recombination genes, of 2 SCCOHT cases analyzed, one had a germline mutation in CHEK2 and the other in the RAD50 gene. Finally, from the 7 familial SCCOHT cases reported in the literature to date, the only molecular genetic data generated was the absence of BRCA mutations in one affected family.

Chromatin remodeling complexes have been found to be involved in a variety of cancers. In eukaryotic cells, DNA is tightly wrapped around a core of histone proteins to form nucleosomes, the basic units of chromatin structure. Because nucleosomes can impede transcription factors binding to DNA, dynamic regulation of nucleosome positioning is found to play a critical role in transcriptional control and, in turn, numerous biological processes. Consequently, elucidating the mechanisms that modulate chromatin structure has been of great interest and has the potential to provide fundamental insight into the control of gene regulation. Nucleosomes are assembled, modified, and repositioned with the assistance of chromatin remodeling complexes.

Two broad classes of such complexes are known: those that covalently modify histones and those that use the energy of ATP hydrolysis to mobilize nucleosomes and remodel chromatin. The SWI/SNF complex was one of the first chromatin remodeling complexes to be identified, with many of its subunits conserved from yeast to humans. Studies showed that SWI/SNF complex may affect transcription by mobilizing nucleosomes in promoters and altering accessibility of DNA for transcription factors.

The SWI/SNF Chromatin Remodeling Complex

Transcription factor action and then the targeted gene expression are mainly regulated by SWI/SNF family of chromatin remodeling complexes. SWI/SNF complexes are large 2-MDa (1.14 MDa in yeast) multi-subunit conglomerates that are involved in either enhancement or suppression of the downstream genes. SWI/SNF complex genes were identified through two screens in yeast *Saccharomyces cerevisiae*. The first identified gene that is required for the expression of SUC2 for sucrose metabolism (sucrose non-fermenting (SNF) mutants), and the second screen showed another gene required for the activation of HO for mating-type switching (switch (SWI) mutants).

SWI/SNF complex is composed of three groups of subunits; 1) enzymatic (ATPase), 2) core subunits, and 3) accessory subunits. Though the exact mechanisms for modification of chromatin structure by SWI/SNF complexes remain incompletely understood, current knowledge suggests that ATPase-dependent disruption of histone-DNA association and resultant nucleosome "sliding" is the main mechanism [8,12]. The mammalian genome encodes 29 different SWI/SNF-like ATPases [12]. Accordingly, each SWI/SNF complex consists of only one of two ATPases, BRM (Brahma) or BRG1 (Brahma-Related Gene 1), which show 74% homology.

SWI/SNF complexes are classified into two major classes as BAF (BRG1 or BRM-Associated Factor; also known as SWI/SNF-A) or PBAF (Polybromo-Associated BAF; also known as SWI/SNF-B) complexes. BAF complexes contain either BRG1 (also known as SMARCA4, SNF2b, BAF190) or BRM (also known as SMARCA2, SNF2a) and PBAF complexes include only BRG1 as ATPase subunit. Each ATPase is accompanied with 10 to 12 proteins as core and accessory subunits. The core subunits include BAF155 (also known as SWI3, SRG3, SMARC1), BAF170 (also known as SMARCC2), and SNF5 (also known as SMARCB1, BAF47, INI1). Accessory subunits consist of BAF45 (a, b, c, d; encoded gene names PHF10, DPF1, DPF2, DPF3), BAF53 (a,b; encoded gene names ACTL6A, ACTL6B), BAF57 (encoded gene name SMARCE1), BAF60 (a,b,c; encoded gene name SMARCD1, SMARCD2, SMARCD3), BAF180 (encoded gene name PBRM1), BAF200 (encoded gene name ARID2), BRD7 and BAF250 (a,b; a: also known as ARID1A, SMARCF1, OSA1; b: also known as ARID1B, OSA2) [7,8]. ARID1A (BAF250a) and ARID1B (BAF250b) subunits are mutually exclusive and exist only in BAF complexes. BAF180, BAF200 and BRD7 are exclusively present in PBAF complexes.

The SWI/SNF complex is capable of facilitating both gene activation and repression and contributes to the regulation of lineage specificity and cell fate determination. Growing evidence indicates that the SWI/SNF complex serves a widespread role in tumor suppression. SNF5 was the first subunit linked to cancer and is inactivated in nearly all childhood malignant rhabdoid tumors as well as some cases of familial schwannomatosis, meningiomas, and epithelioid sarcomas. Recently, frequent and specific inactivating mutations in at least six other SWI/SNF subunits have been identified in a variety of cancers, including ARID1A, ARID1B, ARID2, PBRM1, BRD7, and BRG1. In mouse models, inactivation of Snf5 leads to rapid development of lethal cancers with 100% penetrance, and Brg1 haploinsufficient mice are tumor prone, establishing these subunits of the complex as bona fide tumor suppressors. Recent exome sequencing of 35 human SNF5-deficient rhabdoid tumors identified a remarkably low rate of mutations, with loss of SNF5 being essentially the sole recurrent event. Indeed, in two of the cancers, there were no other identified mutations.

Genetic alterations in subunits of the SWI/SNF chromatin-remodeling complex are a key mechanism in tumorigenesis of several cancers. This is exemplified by rhabdoid tumors (RT), where frequent biallelic loss of the core SWI/SNF gene SMARCB1 is likely the primary driver of oncogenesis [9]. Importantly, up to 20% of patients with RT bear germline heterozygous mutations in SMARCB1; and inactivating germline mutations of another SWI/SNF complex member, SMARCA4, were seen in two sisters with RT lacking SMARCB1 mutations. At a somatic level, SMARCA4 is the SWI/SNF subunit most commonly mutated in cancer. Although the mutational landscape of SCCOHT is unknown, because there are similarities in microscopic and cytogenetic characteristics of SCCOHT tumors and rhabdoid tumors, an integrated genomic and pathologic assessment of SCCOHT cancers is performed to determine if SMARCA4 or other members of the SWI/SNF are associated with SCCOHT development. In the present disclosure, frequent germline and somatic SMARCA4 mutations and protein loss in SCCOHT were reported for the first time.

As used herein, the phrase "biological sample" or "sample" encompasses a variety of sample types obtained from a subject and useful in the procedure of the invention. Biological samples may include, but are not limited to, solid tissue samples, liquid tissue samples, biological fluids, aspirates, cells and cell fragments. Specific examples of biological samples include, but are not limited to, solid tissue samples obtained by surgical removal, a pathology specimen, an archived sample, or a biopsy specimen, tissue cultures or cells derived therefrom and the progeny thereof, and sections or smears prepared from any of these sources. Non-limiting examples are samples obtained from breast tissue, lymph nodes, and breast tumors. Biological samples also include any material derived from the body of a vertebrate animal, including, but not limited to, blood, cerebrospinal fluid, serum, plasma, urine, nipple aspirate, fine needle aspirate, tissue lavage such as ductal lavage, saliva, sputum, ascites fluid, liver, kidney, breast, bone, bone marrow, testes, brain, ovary, skin, lung, prostate, thyroid, pancreas, cervix, stomach, intestine, colorectal, brain, bladder, colon, uterine, semen, lymph, vaginal pool, synovial fluid, spinal fluid, head and neck, nasopharynx tumors, amniotic fluid, breast milk, pulmonary sputum or surfactant, urine, fecal matter and other liquid samples of biologic origin, and may refer to either the cells or cell fragments suspended therein, or to the liquid medium and its solutes.

Determining Levels of Gene Expression

Determination of gene expression may be performed by one or more of the methods known to one of ordinary skill in the art. For example, gene expression levels may be determined by detection of (a) a gene polypeptide, (b) mRNA encoding a protein, (c) a portion of DNA which constitutes a gene, or (d) any combination thereof.

For example, levels of gene expression can be detected by measuring levels of protein using specific binding compositions. The detection of protein levels may be carried out using any of the methods known to one of ordinary skill in the art including, but not limited to, chemiluminescence methods, histochemical staining or biochemical detection (i.e., immuno-histochemistry assays), Western Blot analysis, flow cytometry, immuno-precipitation (or the equivalent thereof for non-antibody agents), Plasmon resonance absorbance measurement, and the like. In one embodiment of the invention, the method of detecting protein levels is an immunoassay (such as an ELISA), which includes the use of at least one antibody. In yet another embodiment of the invention, protein staining, in tissue sample for example, formalin-fixed, paraffin-embedded tissue sections can be carried out by immuno-histochemistry using an antibody, and determining the expression of the gene.

For example, one embodiment of the invention is performed using an IHC kit which uses a primary mouse monoclonal antibody, a secondary anti-mouse IgG antibody, a peroxidase blocker to quench the endogenous peroxidase activity and a chromogenic substrate. Measurement of the polypeptide encoded by a gene may include measurements of fragments of the polypeptide, wherein the fragments arise from transcriptional or translational variants of the gene; or alternatively, differently sized polypeptides arise as a result of post translational modifications including proteolysis of a larger portion of a polypeptide.

Detection of levels of mRNA encoding a gene may also serve as an indicator of gene expression. The methods used to detect mRNA levels are well known in the art, and include the detection of hybridization or amplification with the mRNA encoding a gene product. This detection may be carried out by analysis of mRNA either in vitro or in situ (e.g., in a tissue sample) using one of the methods known to one of ordinary skill in the art as exemplified in the Current Protocols in Molecular Biology (John Wiley & Sons, 1999); in U.S. Pat. No. 5,882,864; and the like. An mRNA detected will be any RNA transcript of a specific gene, or fragment thereof.

In one embodiment, one or more proteins in the SWI/SNF complex is detected using mass spectrometry or an immunoassay.

SWI/SNF complex proteins may be detected, for example, by mass spectrometry according to one embodiment. In a related embodiment, the markers are detected by SELDI. In another related embodiment, the marker or markers are detected by capturing the marker on a biochip having a hydrophobic surface and detecting the captured marker by SELDI. Suitable biochips include the IMAC3 ProteinChip® Array and the WCX2 ProteinChip® Array. In another related embodiment, markers are detected by nucleic acid arrays, e.g., DNA arrays or by PCR methods.

In one embodiment, the recited methods further comprise generating data on immobilized subject samples on a biochip, by subjecting the biochip to laser ionization and detecting intensity of signal for mass/charge ratio; and transforming the data into computer readable form; executing an algorithm that classifies the data according to user input parameters, for detecting signals that represent SWI/SNF complex proteins present in non-SCCOHT subject controls and are lacking in SCCOHT subjects.

In one embodiment, one or more of the SWI/SNF complex proteins are detected using laser desorption/ionization mass spectrometry, comprising providing a probe adapted for use with a mass spectrometer comprising an adsorbent attached thereto; contacting the subject sample with the adsorbent; desorbing and ionizing the biomarker or biomarkers from the probe; and detecting the desorbed/ionized markers with the mass spectrometer.

In one embodiment, least one or more SWI/SNF complex proteins are detected using immunoassays.

In one embodiment, the sample from the subject is one or more of blood, blood plasma, serum, urine, cells, organs, seminal fluids, bone marrow, saliva, stool, a cellular extract, a tissue sample, a tissue biopsy, and cerebrospinal fluid.

In one embodiment, the SWI/SNF complex proteins are measured by one or more of electrospray ionization mass spectrometry (ESI-MS), ESI-MS/MS, ESI-MS/(MS)n, matrix-assisted laser desorption ionization time-of-flight mass spectrometry (MALDI-TOF-MS), surface-enhanced laser desorption/ionization time-of-flight mass spectrometry (SELDI-TOF-MS), desorption/ionization on silicon (DIOS), secondary ion mass spectrometry (SIMS), quadrupole time-of-flight (Q-TOF), atmospheric pressure chemical ionization mass spectrometry (APCI-MS), APCI-MS/MS, APCI-(MS)n, atmospheric pressure photoionization mass spectrometry (APPI-MS), APPI-MS/MS, and APPI-(MS)n, quadrupole mass spectrometry, fourier transform mass spectrometry (FTMS), and ion trap mass spectrometry, where n is an integer greater than zero.

Kits

The present invention provides a kit to determine the levels of gene expression in the biological sample. Such a kit will comprise a reagent for detecting the mRNA encoding a gene, the corresponding polypeptide, or any combination or fragment thereof. The reagent will comprise one or more molecules capable of specifically binding a nucleic acid sequence (DNA or RNA) encoding a gene, or the corresponding polypeptide.

The kit may comprise one or more nucleic acid reagents for the detection of mRNA encoding a gene (either sense or antisense). The one or more nucleic acid reagents may be used for hybridization and/or amplification of the mRNA encoding the gene. The kit may comprise one or more pairs of primers for amplifying the mRNA encoding the gene. The kit may further comprise samples of total mRNA derived from tissue of various physiological states, such as normal, and metastatically progressive tumor, for example, to be used as controls. The kit may also comprise buffers, nucleotide bases, and other compositions to be used in hybridization and/or amplification reactions. Each solution or composition may be contained in a vial or bottle and all vials held in close confinement in a box for commercial sale. Another embodiment of the present invention encompasses a kit for use in detecting mRNA encoding a gene in a biological sample comprising oligonucleotide probes effective to bind with elevated affinity to mRNA encoding the gene in vitro or in situ and containers for each of these probes.

In a further embodiment, the invention encompasses a kit for use in determining the level of gene expression in a biological sample comprising one or more agents, such as, for example, one or more antibodies, specific for one or more polypeptides or fragments. In one particular embodiment, the kit will comprise one or more agents and one or more nucleic acid markers wherein the agents and nucleic acid markers are modified in a fashion appropriate for carrying out immuno-polymerase chain reaction assays.

One preferred embodiment of the invention is directed to a kit for determining the levels of gene expression in a mammalian biological sample, wherein said levels of gene expression is an indicator of the prognosis of SCCOHT, said kit comprising: a) an antibody that specifically binds to a gene product or an antigen binding fragment thereof, b) a reagent useful for detecting the extent of interaction between said antibody and the gene; c) a reagent or solution useful for antigen retrieval; and c) positive and/or negative control samples. Said antibody may be directly linked to an indicator reagent, wherein said indicator reagent is selected from the group consisting of fluorescent, colorimetric, immunoperoxidase and isotopic reagents. Alternatively, the kit may further include a second indicator antibody linked to an indicator reagent, wherein said indicator reagent is selected from the group consisting of fluorescent, calorimetric, immunoperoxidase and isotopic reagents.

In one embodiment, the kit contains at least one primary antibody, at least one labeled secondary antibody, and at least one substrate (e.g., TMB). Alternatively, the kits can contain radiolabeled secondary antibody in place of the secondary antibody labeled with an enzyme. The kits may also contain disposable supplies for carrying out detection assays (e.g., microtiter plates, pipettes).

Methods of Treatment

In some embodiments, the present invention comprises the treatment of a subject suffering from SCCOHT. The terms "treating" or "treatment" of a disease includes inhibiting the disease, i.e., arresting or reducing the development of the disease or its clinical symptoms, or relieving the disease, i.e., causing regression of the disease or its clinical symptoms.

A preferred embodiment of the invention is treatment of a disease that consists of relieving the disease.

In another preferred, the treatment is specific to the gene or genes that are identified as upregulated or downregulated in the subject.

This invention is further illustrated by the following additional examples that should not be construed as limiting. Those of skill in the art should, in light of the present disclosure, appreciate that many changes can be made to the specific embodiments which are disclosed and still obtain a like or similar result without departing from the spirit and scope of the invention.

EXAMPLES

Example 1. Materials and Methods

Sample collection: A web-based IRB-approved HIPAA-compliant protocol was established to facilitate collection of biospecimens from consenting patients with small cell carcinoma of the ovary, their legal proxy if under 18 years of age, or the loved ones of deceased patients. Self-reported demographic and medical history data were also collected. At the University of British Columbia, 5 cases of SCCO of hypercalcemic type were collected from the Ovarian Cancer Research Program (OvCaRe) tissue bank in Vancouver, British Columbia, Canada; the University of Toronto in Toronto, Canada; the Children's Oncology Group at Nationwide Children's Hospital in Columbus, Ohio, USA; and the Hospital de la Santa Creu i Sant Pau at Autonomous University of Barcelona, Spain. The study was approved by the institutional review board.

Genomic DNA isolation: Gentra Puregene Kit (Qiagen) or AllPrep Kit (Qiagen) were used for DNA isolation. Fresh-frozen tissue was disrupted and homogenized in Buffer RLT plus (Qiagen; Valencia, CA), using the Bullet Blender™, Next Advance (Next Advance Inc; Averill Park, NY), and transferred to a microcentrifuge tube containing Buffer RLT plus and 1.6 mm stainless steel beads. Blood leukocytes (buffy coat) were isolated from whole blood by centrifugation at room temperature and resuspended in Buffer RLT plus. All samples were homogenized, centrifuged at full speed, and lysates were transferred to the Qiagen AllPrep DNA spin column (Qiagen). Genomic DNA was purified following the manufacturer's protocol. DNA was quantified using the Nanodrop spectrophotometer (Nanodrop; Wilmington, DE) based on 260/280 nm and 260/230 nm absorbance ratios, and by Qubit Assay (Life Technologies).

Exome library preparation: Briefly, ~3 µg of high quality genomic DNA was fragmented to a target size of 150 to 200 bp on the Covaris E210 system (Covaris; Woburn, MA). Fragmentation was verified on a 2% TAE gel and fragmented samples were end repaired using New England Biolab's NEBNext kit (New England Biolab; Ipswich, MA). Repaired samples were purified using Ampure XP beads, adenylated at the 3' end using the NEBNext kit, and purified again with Ampure XP beads. Illumina index adapters were next ligated onto A-tailed products and purified with Ampure XP beads. Samples were next PCR amplified using Herculase II polymerase (Agilent; Santa Clara, CA). Samples were then run on the Agilent Bioanalyzer to verify amplification and to quantify samples. Samples were adjusted to 147 ng/jL for a 16 hour hybridization to exonic probes using Agilent's SureSelect All Exon 50 Mb Plus kit. Captured products were then selected for, purified, and PCR amplified. Final libraries were verified and quantified using the Agilent Bioanalyzer.

PCR free whole genome library preparation: 3 µg of genomic DNA from each sample was fragmented to a target size of 300-350 base pairs (bp). Overhangs in the fragmented samples were repaired and adenine bases were ligated on. Diluted paired-end Illumina adapters were then ligated onto the A-tailed products. Following ligation, samples were run on a 3% TAE gel to separate products. Ligation products at 300 bp and 350 bp were selected for each sample, isolated from gel punches, and purified. Products were quantified using Agilent's High Sensitivity DNA chip on the Agilent 2100 Bioanalyzer.

Paired-end next generation sequencing: Tumor and normal libraries were prepared for 100 bp paired-end sequencing. Clusters were generated using Illumina's cBot and HiSeq Paired End Cluster Generation Kits and sequenced on Illumina's HiSeq 2000 using Illumina's-HiSeq Sequencing Kit.

Mapping and variant analysis: For whole genome and exome sequencing fastq files were aligned with BWA 0.7.4 to GRCh37.70 and the SAM output were converted to a sorted BAM file using samtools 0.1.19. BAM files went through indel realignment, mark duplicates, and recalibration steps in this order with GATK 2.5 where dpsnp137 was used for known SNPs and Mills_and_1000G_gold_standard.indels.b37.vcf was used for known indels. Lane level sample BAMs were then merged with Picard 1.91 if they were sequenced across multiple lanes. Variant calling was done with Unified Genotyper and the output VCF files were recalibrated with VariantRecalibrator from GATK 2.5. SnpEff 3.2 and SnpSift 1.7 was then used to annotate these VCF files with database version GRCh37.70.

Immunohistochemistry: A tissue microarray (TMA) representing nine SCCOHT patient cases was fabricated for this study as previously describedl. Each case included at least two representative core punches 0.6 mm in diameter. While no patient-matched normal ovary was available, two cases were obtained with uninvolved fallopian tube and were included in the TMA. Whole slide sections from 6 additional SCCOHT tumor cases were used for an immunohistochemical validation cohort. Paraffin blocks were also prepared from formalin fixed A549 and BIN-67 cells. The unstained slides were processed using a Ventana Discovery XT system (Ventana Medical Systems) using a rabbit monoclonal SMARCA4/BRG1 antibody (Abcam, clone EPNCIR111A, catalogue number ab110641, 1:25 dilution) and mouse monoclonal SMARCB1/INI1 antibody (BD Transduction Laboratories, clone 25/BAF47, catalogue number 612110, 1:50 dilution). The SMARCB1 antibody was used to confirm antigenic reactivity of tumor cells and cell lines that were negative for SMARCA4. Tumors were scored positive if any tumor cell nuclei showed moderate to strong (definite) positive nuclear staining. Tumors were scored negative when tumor cells showed no nuclear staining only if there was adequate nuclear staining of an internal positive control (endothelial cells, fibroblasts or lymphocytes). No cytoplasmic staining was seen for SMARCA4.

Western Blot analysis: Whole cell extracts were prepared in RIPA buffer containing protease and phosphatase inhibitors. Lysates were electrophoresed on 8% SDS-PAGE gels, blotted to nitrocellulose, probed overnight with primary antibodies to SMARCA4 (see above) and vinculin (Sigma), then incubated for 1 hr with HRP-conjugated secondary antibodies (Sigma), and visualized using ECL-Plus (GE Life Sciences). The lung cancer cell line A549, previously shown to lack SMARCA4 protein2, was used as a negative control.

DNA methylation analysis: Global DNA methylation was evaluated using the Infinium HumanMethylation450 BeadChip Array. Briefly, 1 µg of each sample DNA underwent bisulfite conversion using using the EZ DNA methylation kit according to the manufacturer's recommendation for the Illumina Infinium Assay. Bisulfite-treated DNA was then hybridized to arrays according to the manufacturer's protocol. We used GenomeStudio V2011.1 (Illumina) for methylation data assembly and acquisition as well as background correction and normalization. Methylation levels for each CpG residue are presented as β values, estimating the ratio of the methylated signal intensity over the sum of the methylated and unmethylated intensities at each locus. The average β value reports a methylation signal ranging from 0 to 1 representing completely unmethylated to completely methylated values, respectively. All probes with detection p-values >0.01 were removed. Differential methylation was performed in GenomeStudio by comparing 8 SCCOHT samples to two individual pools of normal fallopian tissue. Resultant β values were assigned a DiffScore to measure statistical significance. All p-values were corrected by calculating a false discovery rate. Probes with DiffScores ≥13 or ≤−13 and delta β values ≥0.2 or ≤−0.2 were considered statistically significant and differentially methylated.

Focused methylation analysis of SMARCA4 included evauation of all 44 CpG probes distributed across the SMARCA4 gene on the 450K-methylation array, including the promoter and 5'UTR. The probe distribution is seen in the scatter plot of delta beta values, where each blue dot represents a probe (Figure S1). CpG islands are annotated in a separate track below the cytogenetic band. There was no evidence of SMARCA4 hypermethylation in all 8 SCCOHT samples when compared to normal fallopian tissue. However, there were two probes (indicated by a red box in Figure S1) that demonstrated hypomethylation. The first is located in a Shore, downstream of a promoter CpG Island. The second is located in a Shelf, upstream of a gene body CpG Island. The variance of the probes across the samples was very low and no difference in methylation was seen between tumors with a SMARCA4 mutation (n=5) and those that were wild-type (n=3). The data suggest that other mechanisms (epigenetic or non-epigenetic) may be contributing to loss of protein expression, especially in the case of SMARCA4 wild-type SCCOHT.

Example 2. Identification of Germline Mutations Associated with SCCOHT Development SCCOHT displays germline mutations in SMARCA4 gene. To identify potential germline mutations associated with SCCOHT development, exome sequencing was performed on peripheral blood DNA from 7 SCCOHT patients. Truncating mutations were observed in the chromatin remodeling gene SMARCA4 in 2 of 7 patients examined, diagnosed at ages 9 and 10 (FIG. 1 and FIG. 3A). The 9-year-old patient bore the germline heterozygous nonsense mutation c.T2935G (p.R979*) which truncates SMARCA4 upstream of the helicase and bromodomains. Similarly, germline DNA of the 10-year-old patient contained a frameshift mutation in exon 4, c.722-735del GGTCCCGGCCCGGCA (p.G241fs) (SEQ ID NO: 1), removing all essential SMARCA4 functional domains.

SCCOHT displays somatic mutations in SMARCA4 gene. As germline mutations indicate more widespread occurrence of somatic mutations in the same gene, whether somatic inactivation of SMARCA4 occurred in SCCOHT was observed. Sequencing of genomic DNA from 9 SCCOHT tumors and 1 SCCOHT cell line, BIN-67, identified SMARCA4 inactivating mutations in 6 of 9 tumors, and in the BIN-67 cells (see FIG. 1 and FIG. 3A). Interestingly, 2 tumors harbored 2 mutations each, potentially indicating biallelic inactivation. Of potential functional relevance, and similar to the 2 germline mutations identified above in Example 1, the majority of somatic mutations mapped to the ATPase domain and are expected to result in truncated proteins. A matching germline DNA for only 4 of 9 patients was from the Cohort at TGen (please refer to materials and methods), none of which harbored SMARCA4 mutations. However, since there was no matching germline DNA for the remaining 5 patients, 4 of which had SMARCA4 mutations in their tumors, the possibility that some of the detected mutations may also be present in patients' germlines cannot be excluded. Consistent with mutations identified in tumors, the SCCOHT cell line, BIN-67 harbored 2 SMARCA4 splice site mutations (FIG. 1).

Example 3. Immunohistochemical Analysis of SMARCA4 Expression in SCCOHT Tumors

Figure 4:
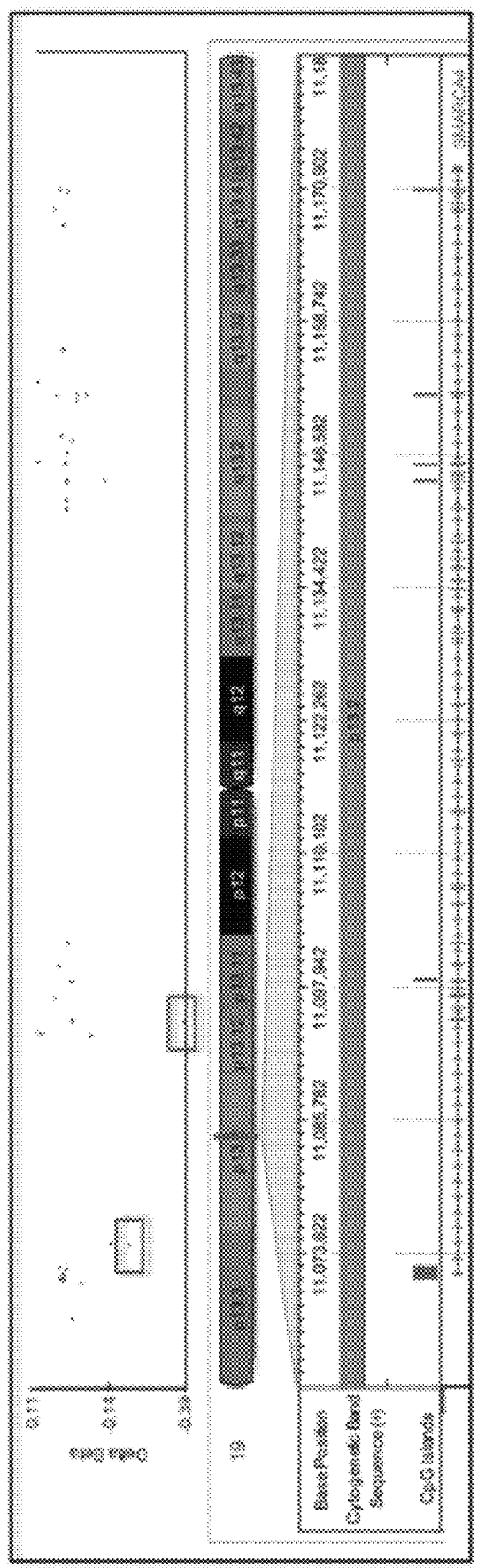
FIG. 4 shows a genome view of SMARCA4 450K methylation data. The top panel is a scatter plot displaying delta beta values of all 44 SMARCA4 CpG probes in 8 SCCOHT samples. Only two probes demonstrate differential hypomethylation (indicated by a red box). The upper limit of the y axis does not exceed 0.11, indicative of a lack of differential hypermethylation for any probe.
Figure 5:
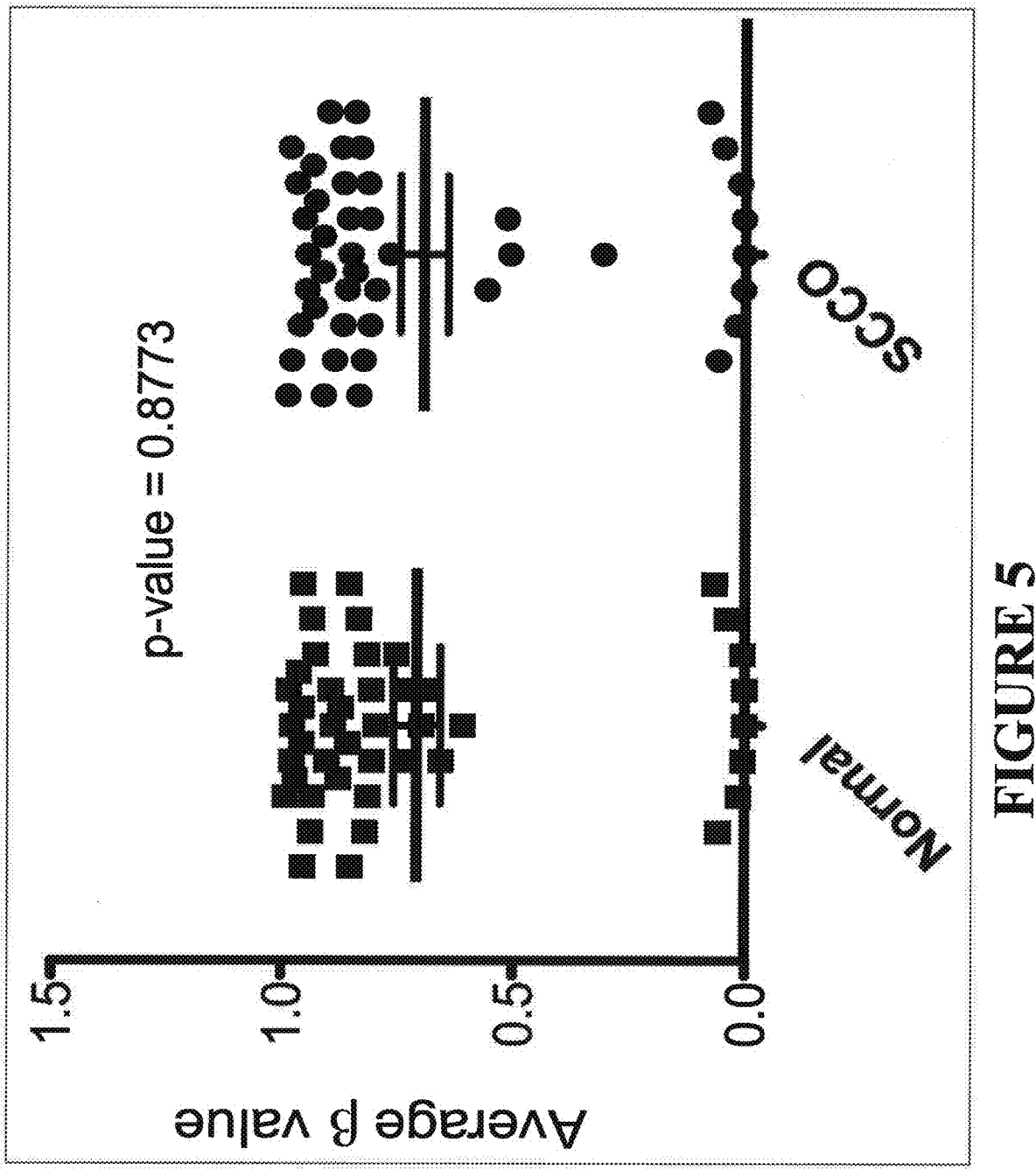
FIG. 5 shows vertical scatter plot of the average 3 values 44 SMARCA4 450K CpG methylation probes in 8 SCCOHT and 2 pools of normal fallopian tissue. There is no significant SMARCA4 methylation difference between normal tissue and SCCOHT.

SCCOHT tumors display loss of SMARCA4 protein. To evaluate possible functional effects of mutations on the SMARCA4 gene product, SMARCA4 protein expression was assessed in SCCOHT tumors (FIG. 2). Immunohistochemical (IHC) analysis of 15 tumors (6 overlapping with 12 cases sequenced above and an additional 9 SCCOHT validation cases) revealed that 13 of 15 tumors (87%) lacked SMARCA4 protein (FIG. 3B). SMARCA4 staining was seen in only 2 tumors, both from pediatric patients. One case had no germline SMARCA4 mutations by exome sequencing while the mutational status of the second case was unknown. Importantly, all samples with SMARCA4 mutations had no detectable SMARCA4 protein. This effect is specific to tumor cells, as normal cells within the same sections show robust SMARCA4 staining (FIG. 3B). The SMARCA4 antibody recognizes an epitope containing amino acids 240 to 277. Therefore, excepting the p.G241fs mutation in the germline of SCCO-002, all other mutants are predicted to yield proteins detectable by this antibody. As such, the complete loss of SMARCA4 protein is expected to be consistent with nonsense mediated decay of the mutant transcript. However, loss of SMARCA4 protein in tumors without SMARCA4 mutations and in tumors without evidence of biallelic SMARCA4 mutations, suggests that other mechanisms contribute to loss of SMARCA4 protein. DNA methylation, however, appears not to be such a mechanism (FIGS. 4 and 5).

The high prevalence of SMARCA4 mutations in SCCOHT has not been previously reported in other, more common ovarian carcinomas. The expression of SMARCA4 was examined in 300 ovarian carcinomas by Immunohistochemistry (IHC). SMARCA4 protein loss was only seen in 6 tumors (2%, data not shown). In addition, while the BIN-67 SCCOHT cell line, which harbors 2 splice site mutations in SMARCA4, showed complete absence of SMARCA4 protein by Western blot (FIG. 3C), the representative cell lines from 4 ovarian carcinoma subtypes, as well as immortalized granulosa cells (SVOG) and adult granulosa tumor cells (KGN) all maintained SMARCA4 expression (FIG. 3C).

Example 4. Identification of SCCOHT Mutations in SMARCC1 and SMARCE1

SCCOHT displayed mutations in two other SWI/SWF genes, SMARCC1 and SMARCE1. High prevalence of germline and sporadic SMARCA4 mutations strongly supports the role of the SWI/SNF complex in the pathogenesis of SCCOHT. However, sequencing analysis revealed that mutations in other SWI/SNF complex members were only present in 2 of the 12 SCCOHT samples analyzed (FIG. 6). This is interesting in light of the relatively high frequency of co-occurring mutations in SWI/SNF members in serous and clear cell ovarian cancers. Despite the absence of mutations in other SWI/SNF subunits in SCCOHT, a lack of SMARCB1 protein expression was noticed in the tumor of SCCO-010 (data not shown), a case with no SMARCA4 mutations, but with SMARCC1 and SMARCE1 mutations. Thus, inactivation of the SWI/SNF complex may be an important oncogenic driver in SCCOHT, with SMARCA4 mutations as the preferential mode of inactivation.

The loss of normal SWI/SNF complex function may therefore represent a key tumorigenic step in SCCOHT. The presence of inactivating germline SMARCA4 mutations in some patients suggests that SCCOHT may arise in the context of genetic predisposition. Further sequencing studies of SCCOHT patients and families could provide important information about the inheritance patterns of SMARCA4 mutations and could have clinical implications for screening, early detection and management of SCCOHT. In addition to providing a clue to the pathogenesis of SCCOHT these findings provide the opportunity to develop treatment approaches for SCCOHT based on targeting vulnerabilities of SMARCA4 deficient cells.

Example 5. Additional Materials and Methods

Patient samples. Due to the rarity of SCCOHT tumors, we established a web-based IRB-approved protocol to facilitate collection of biospecimens from SCCOHT patients, their legal proxy if under 18 years of age, or the loved ones of deceased patients following informed consent. Tumors were obtained from 15 participants between November 2010 and December 2012 from Medical Centers throughout the United States. Communication with participants occurred through an Honest Broker within the TGen Office of Research Compliance in adherence with HIPAA Law. All participant biospecimens, and study-related data forms were coded prior to laboratory research investigation. Two of the 15 SCCOHT cases were obtained through material transfer agreement with Dr. Richard Roden, Department of Pathology, The Johns Hopkins University, Baltimore MD. Details of the SCCOHT cohort are provided in FIG. 7. Fifteen fresh frozen non-SCCOHT ovarian tumor specimens used for gene expression microarray-based comparison with 4 fresh frozen SCCOHT tumors were previously obtained by the Cunliffe Laboratory.

Tissue microarray and immunohistochemistry. All FFPE tumors were first examined with H&E staining using whole sections to identify pathologically distinct areas of interest. TMAs were then constructed by punching two 0.6 mm diameter cores from each "donor" tumor tissue block and re-embedding them into a new paraffin block as previously described 37. The TMA contained a total of 40 tissue punches from 10 independent tumor samples. Tissue cores from patient-matched uninvolved fallopian tube tissue were included as controls. IHC analysis for Topoisomerase II Alpha (EMD Millipore; Darmstadt, Germany), Calretinin (Leica Microsystems; Buffalo Grove, IL), CD56 (NCAM-1) (Thermo Scientific; Lafayette, CO), Alpha-Fetoprotein (Dako; Carpinteria, CA), Oct-3/4 (Biocare Medical; Concorde, CA), and p53 (Dako; Carpinteria, CA) was performed by PhenoPath Laboratories (Seattle, WA).

HPV detection. Genomic DNA was extracted from fresh-frozen tumors and cell lines using the Qiagen DNeasy kit (Qiagen; Valencia, CA). HPV DNA were detected by PCR amplification using general primers GP5+ and GP6+38. These primers have been designed to amplify the 150 bp conserved sequence of L1 viral gene of a broad spectrum of HPV genotypes (6, 11, 13, 16, 18, 30-35, 39, 40, 42, 45, 51-53, 56, 58, 61, 66, 68) (de Roda et al., 1995).

DNA from HeLa cells containing HPV18 and HPV-negative MCF7 cells were used as PCR positive and negative controls, respectively. Human β globin amplification was used to test sample DNA quality. Genomic DNA (200 ng) was amplified in 25 µL reaction volume. The HPV DNA amplification reaction included 0.125 µL 2× Platinum Taq (Invitrogen; Carlsbad, CA. Catalog #10966-018); 0.5 µL 10 µM GP5+ and 0.5 µL 10 µM GP6+ primer for L1 gene; 2.5 µL 10×PCR buffer, 0.2 µL 25 mM dNTP mix; and 1.25 µL 50 mM MgCl2. PCR amplification of the β globin gene included 0.125 µL Herculase II Fusion DNA Polymerase (Agilent Technologies; Palo Alto, CA); 0.625 µL 10 µM sense and 0.625 µL 10 µM antisense β globin gene primers; 5 µL 5×PCR buffer; and 0.25 µL 25 mM dNTP mix. Presence of amplified L1 and β globin gene were checked by electrophoresis on a 2% agarose gel.

Gene expression microarray analysis. Total RNA was isolated from fresh-frozen tumors using Qiagen RNeasy micro kit (Qiagen; Valencia, CA). Four SCCOHT tumors were analyzed by gene expression microarray analysis: Cases 2, 12, 14 and 15 (see FIG. 7 for clinicopathological information). Histopathological examination of SCCOHT cases 2 and 12 prior to RNA extraction confirmed samples had the SCCOHT tumor characteristic of extremely high tumor-cell-content. Normal ovarian RNA from 2 different individuals (32 and 37 years of age) was obtained from OriGene (Rockville, MD). The 2 samples were pooled (100 ng of each) and used as a reference to compare SCCOHT tumors to normal ovarian tissue. For differential analysis of SCCOHT vs. non-SCCOHT ovarian carcinomas, a pool of 200 ng of RNA from each of 15 epithelial ovarian tumors of various histotypes (6 serous, 6 endometrioid, 2 clear cell, 1 mucinous) and from the 4 SCCOHT tumors was used as a common reference. The RNA integrity and purity of all samples was measured using a 2100 Bioanalyzer (Agilent Technologies; Palo Alto, CA) and a Nanodrop ND-1000 Spectrophotometer (Nanodrop; Wilmington, DE). Labeled cRNA probes were prepared and hybridized to Agilent 4×44K (V2) microarrays following manufacturer protocols (Agilent Technologies; Palo Alto, CA). Slides were washed and scanned at 5 µm using an Agilent Microarray Scanner (model G2505B) in an ozone-controlled environment, and data extracted, processed and normalized using Agilent Feature Extraction software (v10.5). The variance of the abundance measurements on a single chip was calculated as previously described 41. Gene expression ratios greater than each chip-based variance were considered statistically sig-

TABLE 1

Primers' sequences and PCR conditions

| | Primer sequences (5'-3') | PCR conditions |
|---|---|---|
| GP5+ | TTTGTTACTGTGGTAGATACTAC (SEQ ID NO: 2) | 95° C., min-initial denaturation |
| GP6+ | GAAAAATAAACTGTAAATCATATTC (SEQ ID NO: 3) | 94° C., 1 min; 55° C. to 40° C. in 1° C. decrements, 2 min; 72° C., 1.5 min-16 cycles, 94° C., 1 min; 40° C., 2 min; 72° C., 1.5 min-24 cycles, 72° C., 4 min-final extension* |
| β globin | GAAGAGCCAAGGACAGGTAC (SEQ ID NO: 4) CAACTTCATCCACGTTCACC (SEQ ID NO: 5) | 95° C., 2 min-initial denaturation, 95° C., 20 sec; 63° C., 20 sec; 72° C., 30 sec-30 cycles, 72° C., 3 min-final extension |

*Methods from Malisic et al. 2011.

nificant at p<0.001. Data files have been deposited in GEO at accessions GSE49887 and GSE49888, respectively.

Gene expression microarray data filtering and cluster analysis. Data was filtered using the p-value of the ratio as calculated by Agilent's Feature Extraction software (v10.5). From the gene expression microarray analysis of SCCOHT tumors vs. normal ovary, genes selected were significantly up- or down-regulated (p<0.001) in all SCCOHT tumors. To remove gene redundancy, if multiple array probes for a single gene showed consistent deregulation, the average of all the Log 2Ratios was calculated and used for further analysis. Also, probes for unknown genes and open reading frames were removed. The Log 2Ratio values for each gene were averaged across the four tumor datasets, with the resultant list of average ratios serving as the starting point for pathway enrichment analysis, ligand selection, and drug target analyses. Two-dimensional hierarchical clustering was performed as previously described 42 using uncentered Pearson correlation and average centroid linkage.

To investigate biological differences between SCCOHT and 15 epithelial ovarian tumors, we first searched for the most differentially expressed significant genes between the two groups (SCCOHT vs. non-SCCOHT). The filtering criteria used to accomplish this was the following: significant (p<0.001) genes in all 4 SCCOHT tumors with a standard deviation between them of SD Log 2Ratio<2.1, deviating from the tumor reference pool at SD Log 2Ratio>0.5, and keeping the standard deviation within the reference pool at SD Log 2Ratio>1.2. After removal of gene redundancy (as described above), a final list of 3,284 genes was obtained, which was used for 2D unsupervised clustering and pathway enrichment analysis as described below.

Multi-dimensional scaling (MDS) analysis. The Cancer Genome Atlas (TCGA) was used to perform MDS analysis as previously described.

Pathway enrichment analysis. Functional pathway enrichment analysis of genes differentially expressed in SCCOHT tumors compared to normal ovary was performed using MetaCore™ (Thomson Reuters); including GO (gene ontology), network processes and canonical pathway maps. Due to the preponderance of GO categories associated with the cell cycle, we selectively subtracted 213 genes mapped to the cell cycle GO category and repeated the search in MetaCore™.

To identify biological functions differentially enriched in SCCOHT compared to non-SCCOHT tumors, we used single sample Gene Set Enrichment Analysis (ssGSEA) (www.thebroadinstitute.org) 43,44 using only the c5 gene set library (GSEA|MSigDB), which contains sets from the GO database. ssGSEA is an extension of Gene Set Enrichment Analysis (GSEA) that calculates separate enrichment scores for each pairing of a sample and gene set. Each ssGSEA enrichment score represents the degree to which the genes in a particular gene set are coordinately up- or down-regulated within a sample. In this manner ssGSEA projects a single sample's gene expression profile from the space of single genes onto the space of gene sets. The resulting dataset was then used to perform marker selection analysis. We conducted the ssGSEA analysis.

Ligand Selection Analysis. To identify genes coding for secreted ligands within the list of identified significantly deregulated genes between SCCOHT and normal ovary that might be involved in the development of hypercalcemia in SCCOHT patients, we used GeneGo Direct Interactions network analysis and filtered for Receptor Ligand Object Types. The resulting list of genes was then ranked by the Log 2Ratio expression value.

Therapeutic target analysis. For the identification of actionable therapeutic targets unique to SCCOHT tumors, we cross-referenced significant differentially expressed genes identified by the gene expression microarray analysis of SCCOHT tumors vs. normal ovary, with experimentally validated drug-target relationships contained within GeneGo and within the TargetNow™ list of biomarkers used to guide treatment selection of individual patients (CARIS Life Sciences, Phoenix, AZ).

Flow cytometric analysis. Tumor cell nuclei were isolated, DAPI-stained, and flow sorted from 50 µm FFPE scrolls as previously described 45. Only for SCCOHT case 8, cell nuclei were isolated from 10 µm FFPE tissue slides. DNA content and cell cycle were analyzed using the software program MultiCycle (Phoenix Flow Systems; San Diego, CA). DNA content based flow assays were used to identify and purify 50,000 nuclei from the 2N (G1) populations, 4N (G2/M) populations and used for array-Comparative Genomic Hybridization.

Array-Comparative Genomics Hybridization (aCGH). DNA from 50,000 flow sorted tumor cell nuclei was extracted and amplified as previously described (Holley at el. 2012). SCCOHT samples 16 and 17 were not flow sorted, as they were obtained at a later time, and their DNA was extracted directly from frozen specimens and analyzed by aCGH as described next. A 100 ng aliquot of pooled 46, XX DNA (Promega; Madison, WI) was amplified with the matching amplification protocol to generate a suitable reference for each aCGH experiment. Samples and reference templates were then differentially labeled with Cy-5 dUTP and Cy-3 dUTP respectively, using a BioPrime labeling kit (Invitrogen; Carlsbad, CA). All labeling reactions were assessed using a Nanodrop ND-1000 spectrophotometer (Nanodrop; Wilmington, DE). Labeled sample and reference were co-hybridized to 400K oligonucleotide CGH arrays (Agilent Technologies; Palo Alto, CA) following manufacturer recommendations. Slides were washed and scanned at 3 µm using an Agilent 2565C Microarray Scanner in an ozone-controlled environment; and data was extracted, processed and normalized using Agilent Feature Extraction Software (v10.7).

Data analysis was performed using Nexus Copy Number Software (BioDiscovery; Hawthorne, CA). Recurrent copy number alterations were identified using Genomic Identification of Significant Targets in Cancer (GISTIC) (46 implemented in Nexus v6.0. GISTIC identifies regions of the genome that are significantly amplified or deleted across a set of samples. After identifying the locations and magnitudes (as log 2 signal intensity ratios) of chromosomal aberrations in multiple tumors, GISTIC scores each aberration with a G score that considers the amplitude of the aberration as well as the frequency of its occurrence across samples. False Discovery Rate q-values are then calculated for the aberrant regions. Regions with q-values below 0.1 were considered significant.

Example 6. SCCOHT Tumor Histologic Architecture

Figure 7:
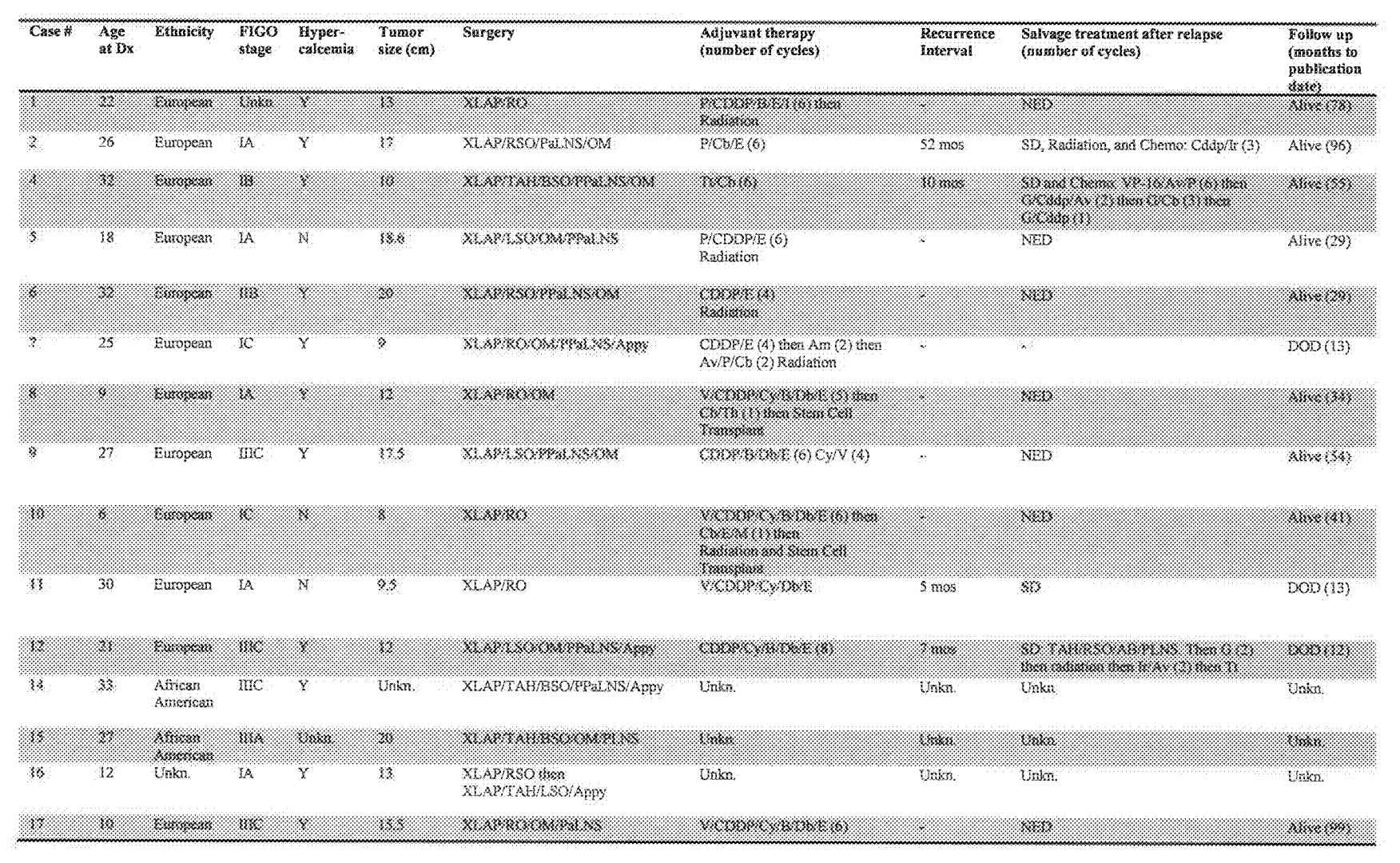
Figure 8:
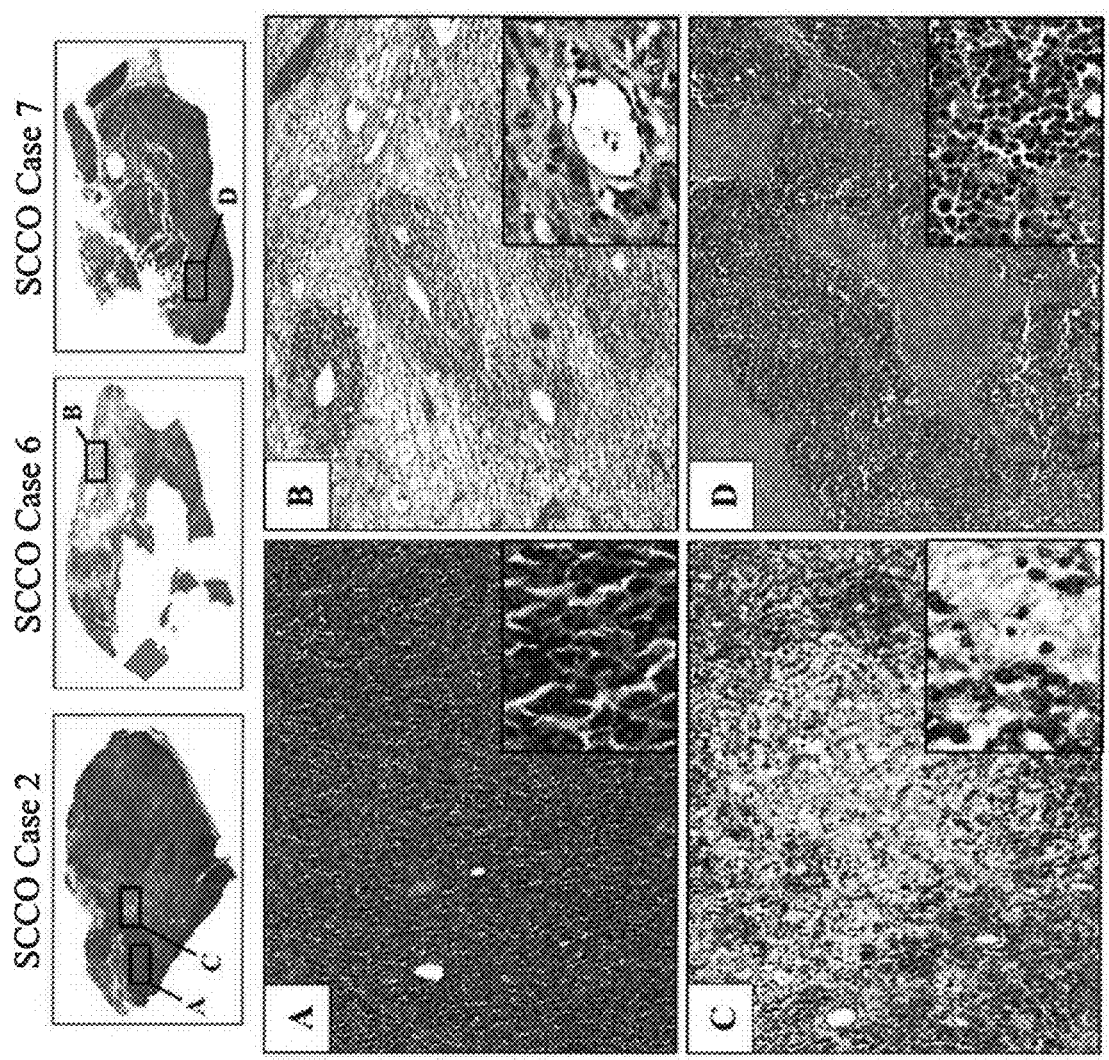
FIG. 8 depicts common histologic features of SCCOHT tumors. Upper Panel. Low-resolution H&E images from 3 SCCOHT cases. Lower Panels. Higher magnification images of common histologic features: (A) regions of tightly packed tumor cells with hyperchromatic nuclei and scant cytoplasm; (B) blood vessel-like structures; (B and C) areas of acellular hyalinization, fibrinoid organization and tumor scar tissue with large areas of acellular stroma (e.g. loose eosinophilic areas in B and C); (D) areas of leaky capillaries and vessels, and the early stages of organizing hyalinization.

Tumor specimens from 15 SCCOHT patients were obtained as described in the Materials and Methods. Epidemiologic, pathologic and clinical features of this cohort are shown in FIG. 7. Consistent with previous reports (Young et al 1994), the average age at diagnosis for our participants was 22 years (range 6-33 years), and 11/15 cases (73%) presented with paraneoplastic hypercalcemia. The average primary tumor size (maximum linear dimension) was 13 cm (range 8-20 cm), and all cases were unilateral with 70% of cases involving the right ovary. Two individuals in our cohort are African American (cases 14 and 15), while the rest are all of European descent. Although the majority of SCCOHT cases described in the literature involved white European women, there are also reports of Chinese, Japanese, Hispanic and African American SCCOHT patients 27,47-51. Correlations between different clinical factors were investigated. Our histologic evaluation of all FFPE case blocks by H&E staining showed findings consistent with previous observations. Common architecture includes broad sheets of tightly packed tumor cells with uniform hyperchromatic round nuclei, few areas of necrosis, scant cytoplasm, numerous mitotic figures and scant/absent immune cells. Regions of the tumor are often highly vascularized and show a trabecular configuration. Frequent areas of acellular hyalinization, fibrinoid organization and tumor scar tissue leading to large areas of acellular stroma (where tumors appear to have outgrown their blood supply) were observed. Additional common features included follicle-like spaces, leaky capillaries and vessels, and early stages of organizing hyalinization. Large-cell variants with pleomorphic nuclei and large cytoplasm were focally apparent in 3 of our specimens (SCCOHT cases 9, 10 and 17). See FIG. 8 for images representative of H&E observations.

Example 7. Immunohistochemical Profile of 15 SCCOHT Tumor Cases

Immunohistochemical data were extracted from the medical records and pathology reports obtained with each of the SCCOHT cases in our cohort. In addition, we performed immunohistochemical stains for calretinin, CD56, AFP, Oct-3/4, and p53 on cases for which immunohistochemical data for these markers was not provided. In agreement with previous reports, we found a consistent immmunostaining profile for SCCOHT tumor cells (Table 2) that is inefficient in identifying the histological origin of this tumor type. 100% of stained cases were negative for the germ cell markers AFP (12/12), PLAP (2/3) and OCT3/4 (10/10), the sex-cord stromal maker α-inhibin (10/10), and for the calcium-binding protein S100 (8/8), a marker of neural crest cells. SCCOHT cells were also negative for chromogranin (5/8) and synaptophysin (3/4), both protein markers expressed in neuroendocrine cells. The majority of tumors were positive for cytokeratins, WT-1 and vimentin. Also, similar to J. Seidman's IHC analysis of 15 SCCOHT tumors where 80% positivity for p53 expression was reported, we found all of our tested cases showed strong p53 immunostaining (10/10). Nuclear accumulation of p53 protein has been shown to be strongly associated with missense TP53 mutations 52; however, all SCCOHT tumors analyzed to date lacked TP53 mutations. Examination of the immunoprofile of the 5 SCCOHT tumors containing large cell variants did not show any relevant differences from that of tumors with only small cells.

TABLE 2

Immunohistochemical analysis of SCCOHT tumors.

| Molecular Marker | Number Stained | Number Positive | % Positive | Number Negative | % Negative |
| --- | --- | --- | --- | --- | --- |
| AFP | 12 | 0 | 0% | 12 | 100% |
| Calretinin | 12 | 3 | 25% | 8 | 67% |
| CD56 | 12 | 8* | 67% | 4 | 33% |
| EMA | 12 | 7 | 58% | 3 | 25% |
| Inhibin | 10 | 0 | 0% | 10 | 100% |
| OCT3/4 | 10 | 0 | 0% | 10 | 100% |
| P53 | 10 | 10 | 100% | 0 | 0% |
| Chromogranin | 8 | 2* | 25% | 5 | 63% |
| S100 | 8 | 0 | 0% | 8 | 100% |
| Synaptophysin | 7 | 3* | 43% | 4 | 57% |
| CD99 | 7 | 5 | 71% | 2 | 29% |
| WT-1 | 6 | 6 | 100% | 0 | 0% |
| AE-1/AE-3 | 6 | 6* | 100% | 0 | 0% |
| Vimentin | 5 | 4 | 80% | 1 | 20% |
| ER | 5 | 0 | 0% | 5 | 100% |
| Desmin | 4 | 0 | 0% | 4 | 100% |
| Pancytokeratin | 4 | 4* | 100% | 0 | 0% |
| Myogenin | 4 | 0 | 0% | 4 | 100% |
| PR | 4 | 0 | 0% | 4 | 100% |
| PLAP | 3 | 1 | 33% | 2 | 67% |
| LCA (CD45) | 3 | 0 | 0% | 3 | 100% |
| HCG | 3 | 0 | 0% | 3 | 100% |
| Cam5.2 | 3 | 2* | 67% | 1 | 33% |
| OCT4 | 3 | 0 | 0% | 3 | 100% |
| Smooth muscle actin | 3 | 2 | 67% | 1 | 33% |
| PTH | 3 | 1 | 33% | 2 | 67% |

*At least half of the stains were only focally or weakly positive

Data from all ancillary molecular studies performed on 15 SCCOHT cases abstracted from pathology reports. Immunostains for p53, Calretinin, AFP, CD56 and Oct-3/4 were performed on FFPE sections for an additional 9 cases.

Example 8. Detection of HPV DNA in SCCOHT Tumors

Figure 9:
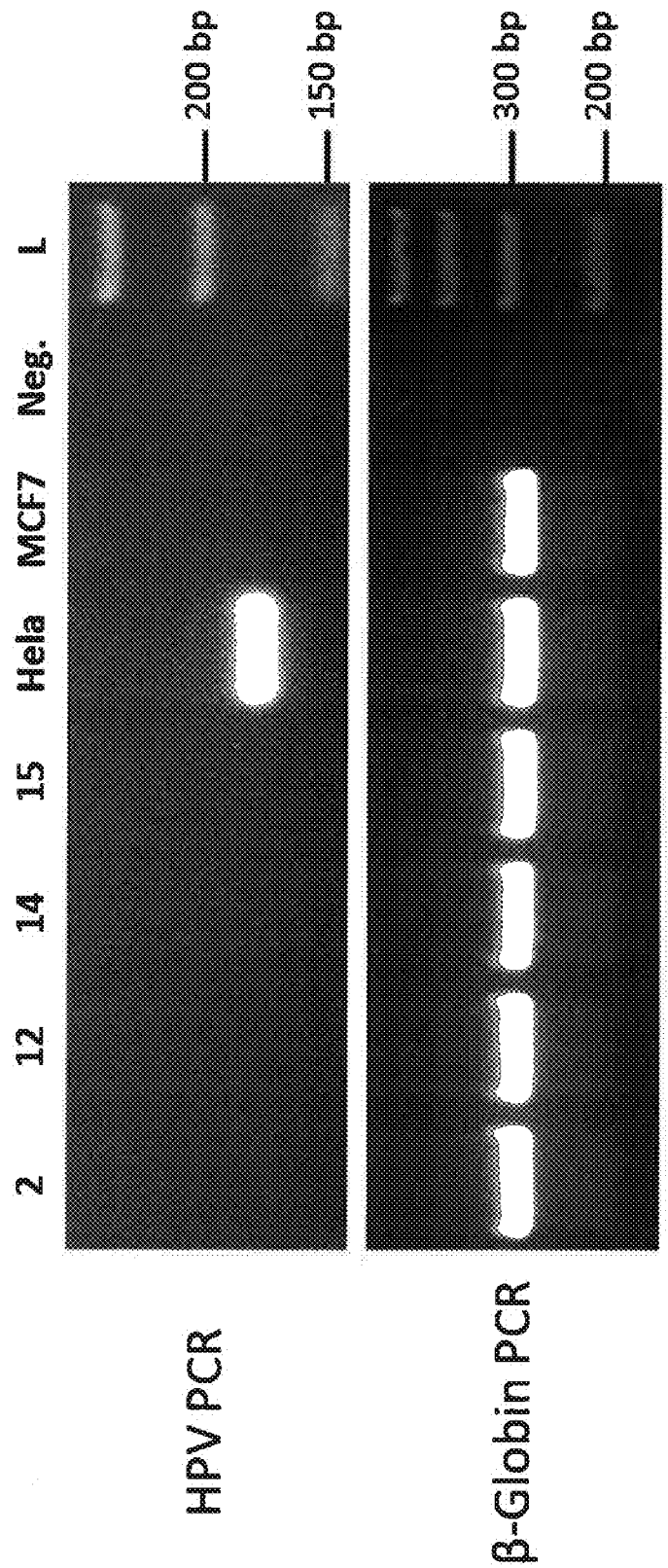
FIG. 9 depicts PCR amplification with GP5+/GP6+. PCR for control gene beta-globin. 100-bp DNA ladder.

The role of HPV in the development of precancerous and cancerous lesions of the lower part of the female genital tract (vulva, vagina and cervix) has been previously established. More recently, some authors have examined the presence and the potential role of HPV infection in ovarian carcinoma development. In a study by Carlson and colleagues, they tested 9 SCCOHT tumors for HPV, and all were negative (Carlson et al. 2007). We were able to test 4 of our SCCOHT tumor samples for HPV infection, and found all of them to be negative by PCR amplification of the L1 viral gene (see FIG. 9).

Example 9. Gene Expression Profiling of SCCOHT Tumors

Gene expression profiling of SCCOHT tumors compared to normal ovary RNA showed genes coding for neurotransmitters are highly up-regulated in SCCOHT tumors. Although the cell type of origin of SCCOHT is not known, we compared the gene expression profile of 4 SCCOHT tumors (cases 2, 12, 14 and 15) and 2 age-matched normal ovary samples, hoping to gain insight into the molecular biology driving this rare tumor. Using Agilent gene expression microarray analysis, we identified a total of 5,299 genes with significant differential expression (Log Ratio p-value<0.001) between SCCOHT tumors and normal ovary. Among them, 2,019 genes were consistently up-regulated in all four tumors (average expression ratios ranging from 1.2 to 208); and 2,255 genes were down-regulated (average expression ratios ranging from 0.6 to 0.0005). Interestingly, a high proportion of the top overexpressed genes in SCCOHT, are nervous system-specific genes. For example, LRRTM4, a gene believed to play a role in the development and maintenance of the nervous system; and CDH10, a cadherin predominantly expressed in the brain and involved in synaptic adhesions, axon growth and guidance, are both consistently overexpressed in all 4 tumors at ratios above 100-fold. Moreover, using GeneGo enrichment analysis, we determined that many of these highly overexpressed nervous-system genes, code for secreted ligands that might be involved in SCCOHT tumorigenesis. Some of these genes include Neurexophilin-1 (NXPH1), a secreted protein known to interact with neurexins to promote adhesion between dendrites and axons; and the neuropeptide NTS, previously shown to act as a potent mitogen in colorectal cancer.

The mechanism leading to hypercalcemia in about 70% of SCCOHT patients remains unclear. Bone, parathyroid or adrenal gland metastases have not been described in SCCOHT cases. The fact that elevated serum calcium levels return to normal following surgical excision of SCCOHT tumors, strongly suggest that the primary tumor is responsible for the hypercalcemia, most likely mediated by the secretion of some hormone or factor by the SCCOHT tumor cells. Production of parathyroid hormone (PTH) or parathyroid hormone-related protein (PTHrP) by tumor cells of ovarian carcinomas has been previously shown to be the cause of hypercalcemia in those cases. However, expression of PTH or PTHrP in SCCOHT tumors does not seem to correlate with the presence or degree of hypercalcemia. Among the four SCCOHT cases we analyzed by gene expression microarray, serum calcium levels were elevated in cases 2, 12 and 14, and unknown for case 15. Expression of PTHrp was elevated in cases 2, 14 and 15 (3.6 to 4.8 fold higher than in normal ovary), but decreased in case 12 (3.4 fold downregulated compared to normal ovary). Furthermore, aCGH analysis did not show amplification in the locus for either PHT or PHTrp.

Two-dimensional hierarchical clustering showed that all 4 SCCOHT tumors shared a very similar gene expression profile. Only tumor sample SCCOHT 12 had a cluster of 863 genes (643 upregulated and 220 genes downregulated) with a different expression pattern compared to the other 3 SCCOHT tumors. Gene Ontology enrichment analysis showed that these 863 genes are part of immune response signaling pathways. The H&E for this case, SCCOHT 12, showed an elevated population of lymphocytic infiltrate in the tumor sample, which could explain the expression signature present in this case and not in the other 3 cases.

Example 10. Pathway Enrichment Analysis

To identify pathways and processes that are most significantly altered in the SCCOHT tumors compared to normal ovarian cells, we conducted enrichment analysis of the differential expressed genes using MetaCore. The top 10 pathways and top 10 process networks identified as significantly (p-value<0.005) altered in the tumor tissue are listed in FIG. 10. Ontologies for cell cycle regulation, chromosome organization, and DNA repair were strongly evident. This result was not surprising given the highly proliferative nature of these tumors.

Figure 11:
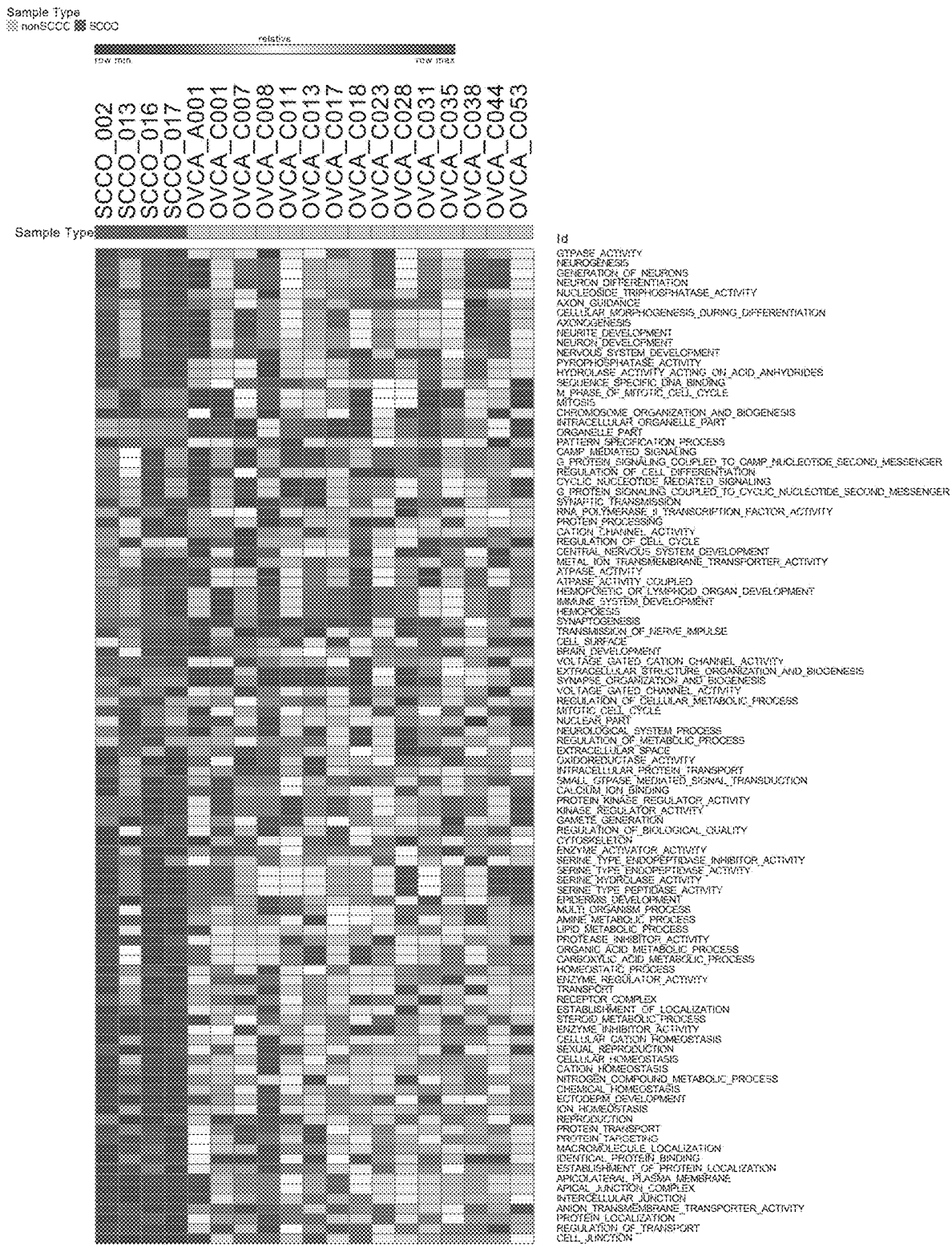
FIG. 11 shows a gene ontology (GO) analysis with SCCOHT vs. non-SCCOHT samples.

We then wondered what other functional processes we might uncover under the preponderance of GO categories associated with the cell cycle; hence, we selectively subtracted genes mapped to the cell cycle GO network and repeated the GO analysis. Most strikingly, this analysis revealed ontologies related to functions and development of the nervous system (FIG. 11).

Example 11. Flow Cytometry and aCGH Analysis

Figure 12A:
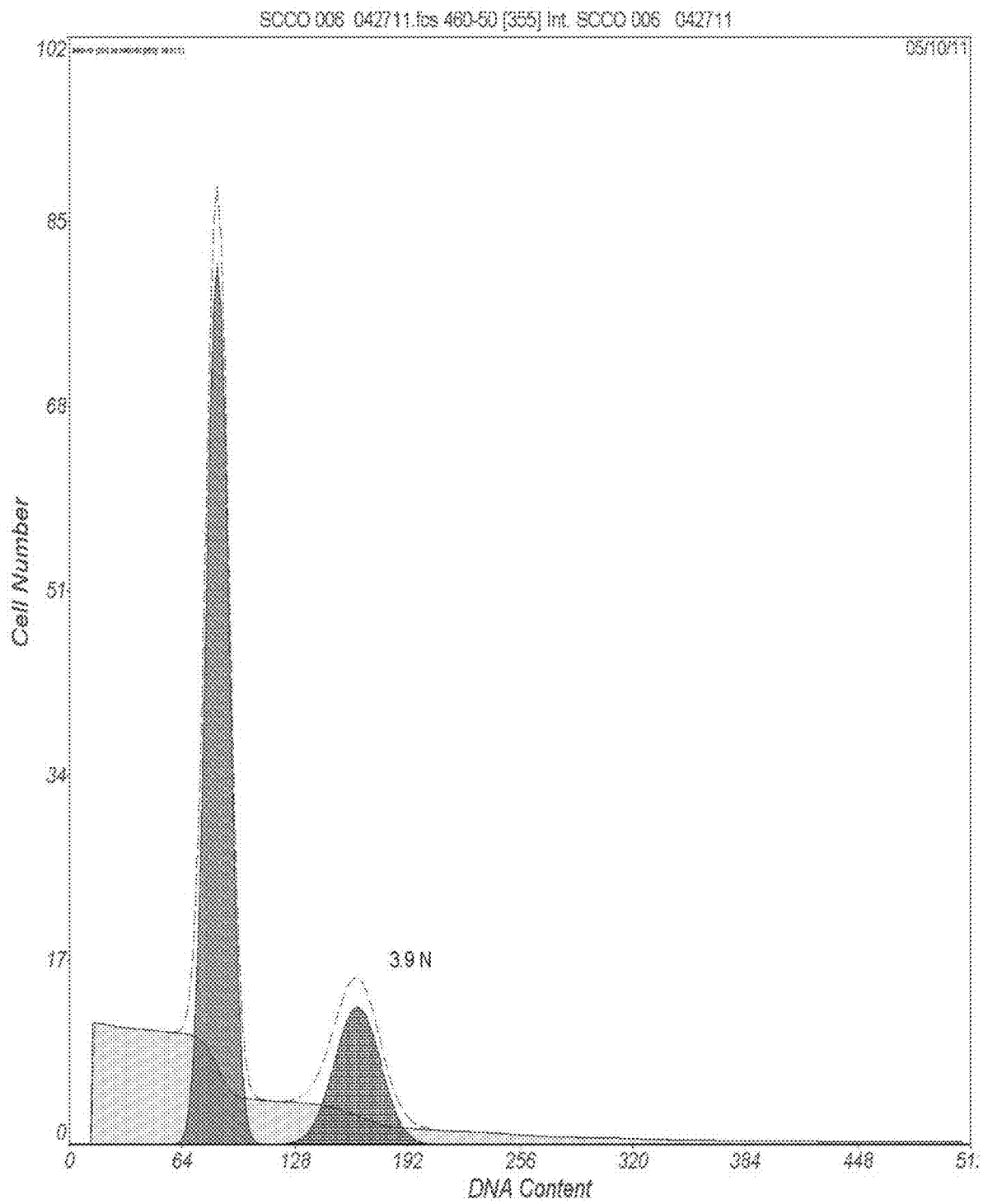
FIGS. 12A-12C depict flow sorting and aCGH analysis of formalin fixed paraffin embedded (FFPE) tumor samples from SCCOHT patients.

Unlike most poorly differentiated, highly malignant tumors, SCCOHT tumors are characteristically diploid. To evaluate the genome landscape of SCCOHT tumors in our cohort we performed both flow cytometry and aCGH analysis. We first used DAPI-based DNA content measures to identify and sort any distinct diploid and aneuploid tumor populations. All the 13 tumor cases investigated (cases SCCOHT 16 and SCCOHT 17 were not analyzed by flow cytometry but were by aCGH) had prominent 2N (diploid G1) cell populations accompanied by a smaller 4N fraction (FIG. 12A). No aneuploid peaks were identified. Of the 13 SCCOHT samples, 8 had elevated 4N fractions of ≥6% (Table 3), a possible indication of p53 loss of heterozygosity (LOH) 61. For 5 of the cases, it was not possible to perform the cell cycle curve fitting due to the presence of cellular debris that is often present in DNA samples isolated from FFPE. Also, we did not find any correlation between the percentage of each cell cycle fraction and the stage or outcome of the patients.

TABLE 3

Cell cycle analysis of SCCOHT tumors by flow cytometry.

| SCCOHT Case ID | FACS peaks | % G1 | % G2 | % S | FIGO stage | Follow up (months) |
|---|---|---|---|---|---|---|
| 1 | 2N 4N | 86.25 | 7.385 | 6.365 | Unk. | Alive (78) |
| 2 | 2N 4N | 52.681 | 5.986 | 41.333 | IA | Alive (96) |
| 4 | 2N 4N | 82.832 | 10.179 | 6.989 | IB | Alive (55) |
| 5 | 2N 4N | ND | ND | ND | IA | Alive (29) |
| 6 | 2N 4N | 75.914 | 24.086 | 0 | IIB | Alive (29) |
| 7 | 2N 4N | 75.719 | 16.45 | 7.831 | IC | DOD (13) |
| 8 | ND | ND | ND | ND | IA | Alive (34) |
| 9 | 2N 4N | 80.59 | 9.7 | 9.683 | IIIC | Alive (54) |
| 10 | 2N 4N | ND | ND | ND | IC | Alive (41) |
| 11 | 2N 4N | 88 | 4.513 | 7.473 | IA | DOD (13) |
| 12 | 2N 4N | 88.015 | 4.513 | 7.473 | IIIC | DOD (12) |
| 16 | 2N 4N | 74.43 | 14.5 | 11.07 | IA | Unk. |
| 17 | ND | ND | ND | ND | IIIC | Alive (99) |
|  |  | Mean % G1 = 78.3 | Mean % G2 = 10.8 |  |  |  |

ND = Not determined due to cell debris.
Unk. = Unknown.

Figure 10:
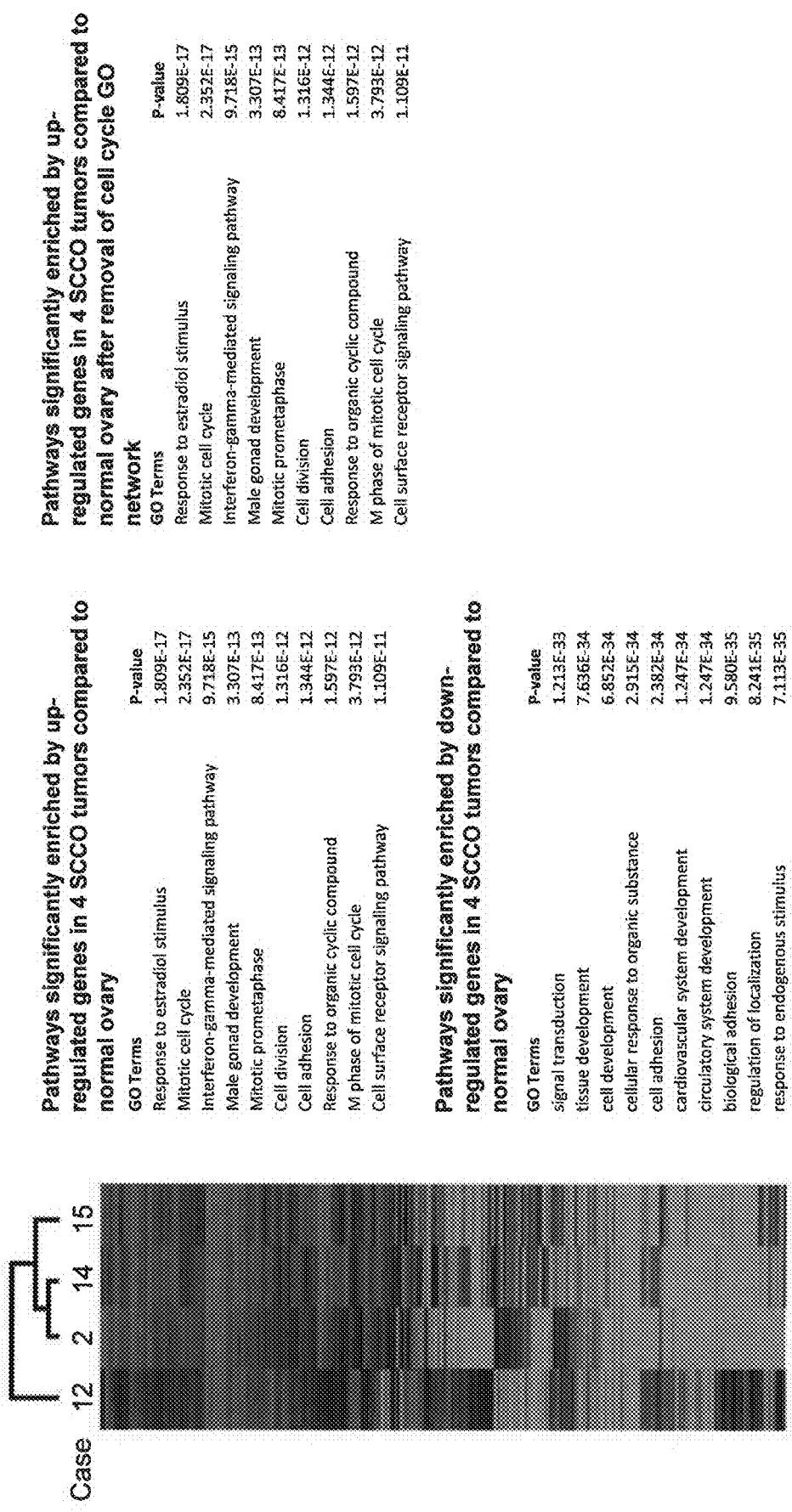
FIG. 10 shows gene expression microarray analysis of 4 SCCOHT tumors vs. normal ovary. Unsupervised, 2-dimensional hierarchical clustering of 5,299 genes significantly differentially expressed between 4 fresh-frozen SCCOHT tumors and 2 age-matched normal ovary RNA samples. Gene ontology analysis of genes consistently deregulated in 4 SCCOHT tumors. Genes were averaged and ranked by the average Log 2Ratios. GeneGO pathway enrichment analysis was performed on up-regulated (Average Log 2Ratio>1) and down-regulated (Average Log 2Ratios≤1).
Figure 12B:
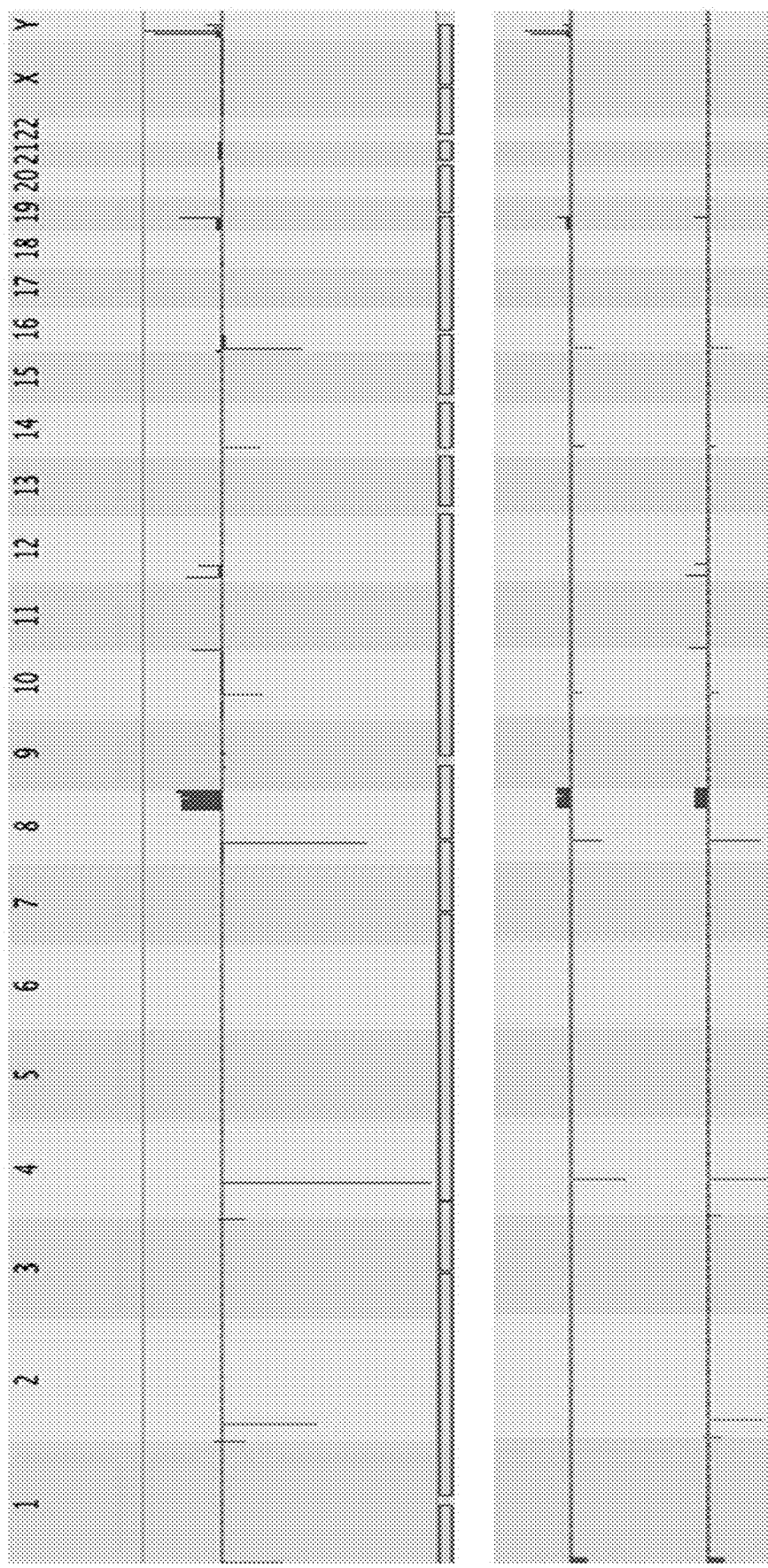
Figure 12C:
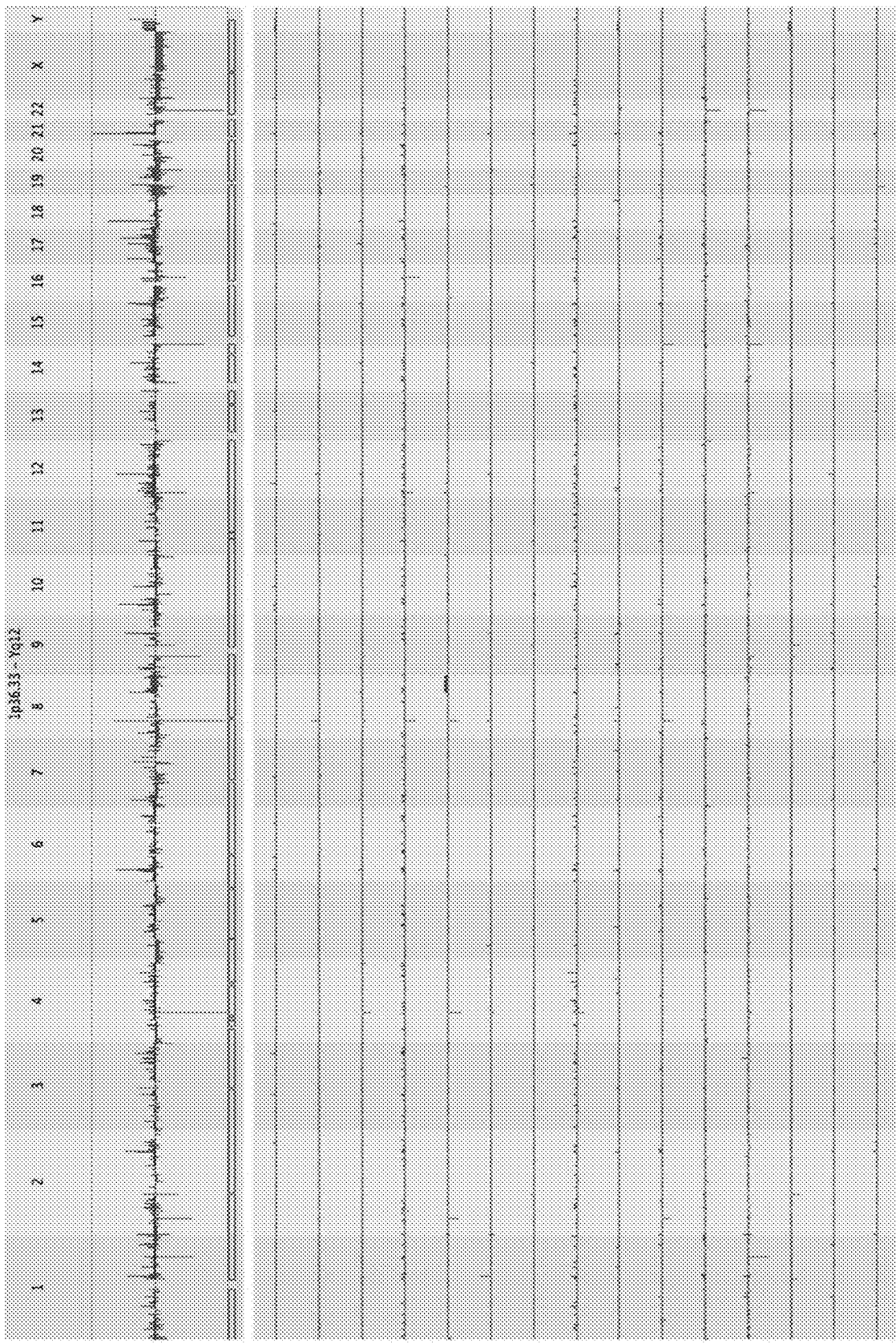

For each flow sorted tumor case, aCGH analysis of 2N and 4N cell populations gave identical genomic profiles (FIG. 12B), confirming that the observed 4N fraction corresponds to diploid G2 tumor cells. Using Genomic Identification of Significant Targets in Cancer (GISTIC) we identified a small number of recurrent amplifications and deletions in the 15 SCCOHT tumors analyzed. Genes contained within these regions were identified and their expression was investigated in the data obtained from the gene expression microarray analysis of 4 SCCOHT tumors vs. normal ovary (FIG. 10).

Example 12. Gene Expression Profiling of SCCOHT Tumors Compared to Non-SCCOHT Ovarian Carcinomas of the Ovary Using Agilent 44Kv2 gene expression microarrays, we investigated how the transcriptional profile of SCCOHT compares to those of non-SCCOHT ovarian tumors. SCCOHT tumors were hybridized against a pool containing RNA from 15 epithelial ovarian tumors of various histologies: 6 serous, 6 endometrioid, 2 clear cell, and 1 mucinous. This analysis identified 3,284 significant genes most differentially expressed between SCCOHT and non-SCCOHT tumors. Unsupervised 2-dimensional hierarchical clustering showed SCCOHT tumors clustering tightly and distinctly from all other tumors and revealed clusters of genes unique to SCCOHT. Several up-regulated genes that code for ligands in the SCCOHT tumors are listed in Table 4.

TABLE 4

Up-regulated genes that code for ligands in 4 SCCOHT tumors.

| Gene Name | Description | Average Log2Ratio in 4 SCCOHT tumors vs. normal ovary | p-Value |
| --- | --- | --- | --- |
| NXPH1 | Neurexophilin-1 | 7.162197571 | 0 |
| NTS | Neurotensin/neuromedin N | 7.081064182 | 0 |
| NMU | Neuromedin-U | 4.65533562 | 0 |
| BMP5 | Bone morphogenetic protein 5 | 4.520459768 | 0 |
| ULBP1 | NKG2D ligand 1 | 4.443879537 | 0 |
| MST1 | Hepatocyte growth factor-like protein | 3.917452375 | 0 |
| TNFSF13B | Tumor necrosis factor ligand superfamily member 13B | 3.658930394 | 0 |
| DLL3 | Delta-like protein 3 | 3.539283686 | 0 |
| BMP4 | Bone morphogenetic protein 4 | 3.226308205 | 0 |
| HGF | Hepatocyte growth factor | 3.143123225 | 0 |
| IL6 | Interleukin-6 | 3.143123225 | 0 |
| VGF | Neurosecretory protein VGF | 3.121071102 | 0 |
| FGF11 | Fibroblast growth factor 11 | 3.038543048 | 0 |
| PTHLH | Parathyroid hormone-related protein | 2.468034541 | 0 |
| NTN1 | Netrin-1 | 2.384400905 | 0 |
| EFNB2 | Ephrin-B2 | 2.267672637 | 0 |
| TGFB2 | Transforming growth factor beta-2 | 2.11636043 | 0 |
| WNT3 | Proto-oncogene Wnt-3 | 2.089633942 | 0 |
| BMP3 | Bone morphogenetic protein 3 | 2.079664654 | 0 |
| CD70 | CD70 antigen | 1.875514764 | 0 |

Example 13. Potential Therapeutic Targets Based on Gene Expression Data

Figure 13:
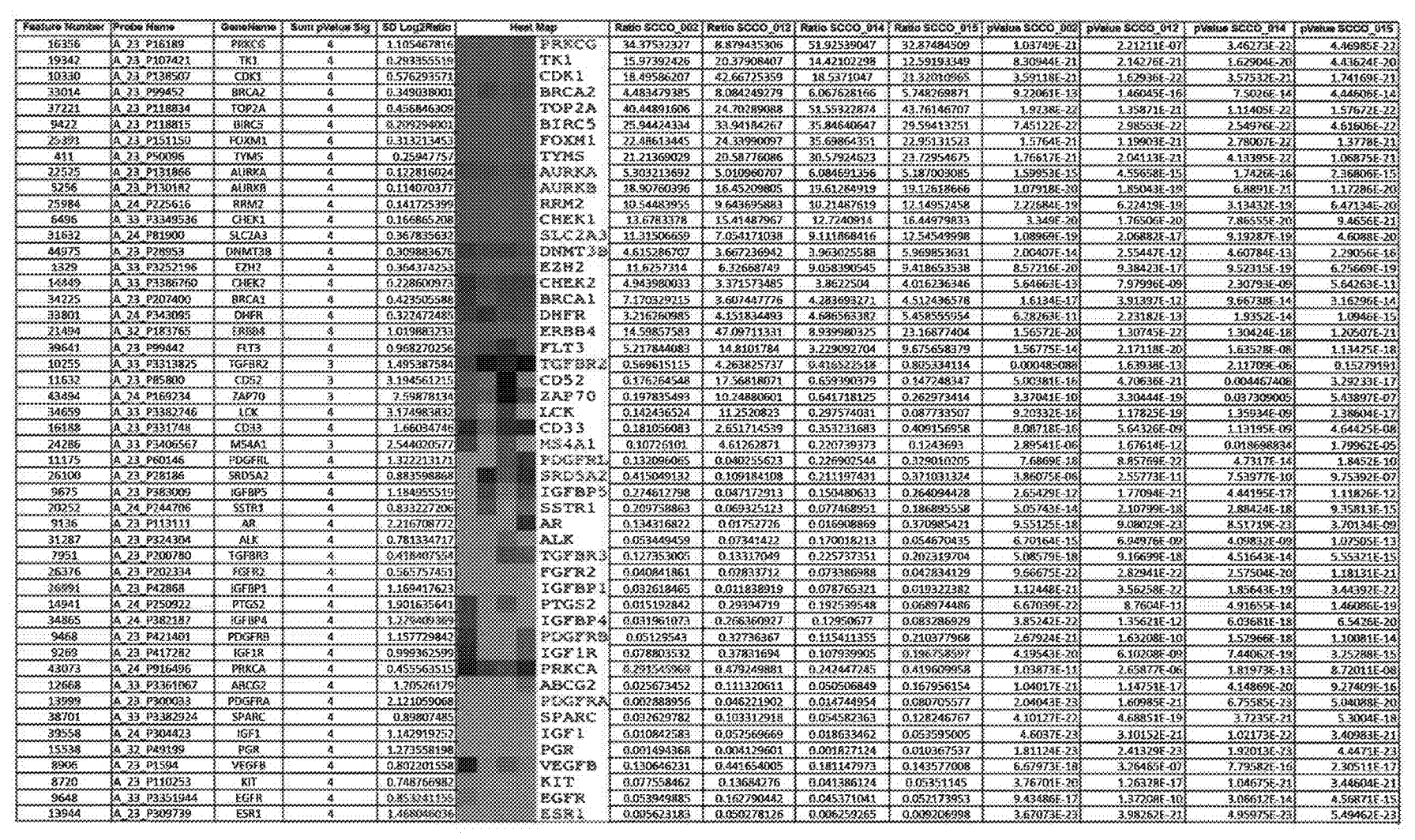
Figure 14:
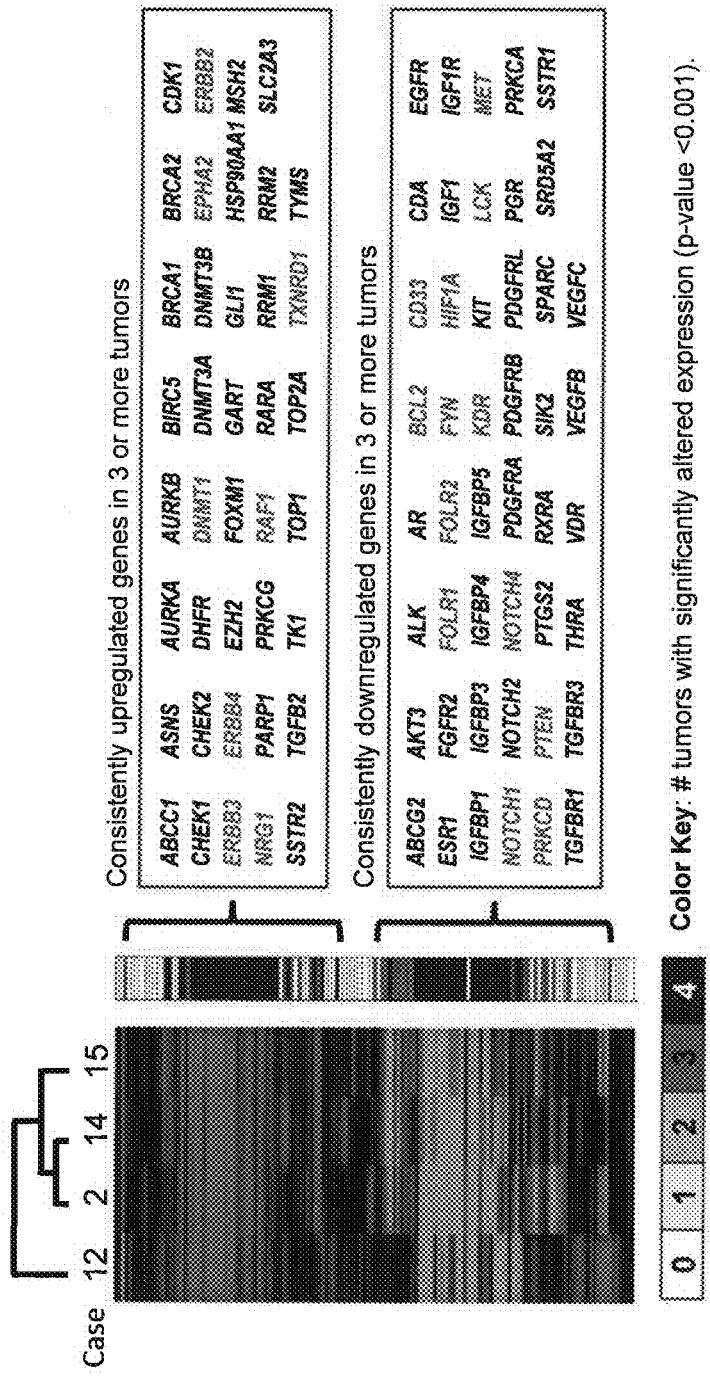
FIG. 14 depicts genes that were consistently upregulated or downregulated in three or more SCCOHT tumors.

To further explore the possibility of using gene expression profiling to select potential therapeutics for these aggressive tumors, we did a drug targets enrichment analysis in which we mapped genes differentially expressed between SCCOHT and normal ovary, onto the GeneGo drug-target database as well as genes of interest whose expression has been previously used to guide treatment selection for individual patients (TargetNow, CARIS Life Sciences). The results are shown in FIGS. 13 and 14.

Figure 15:
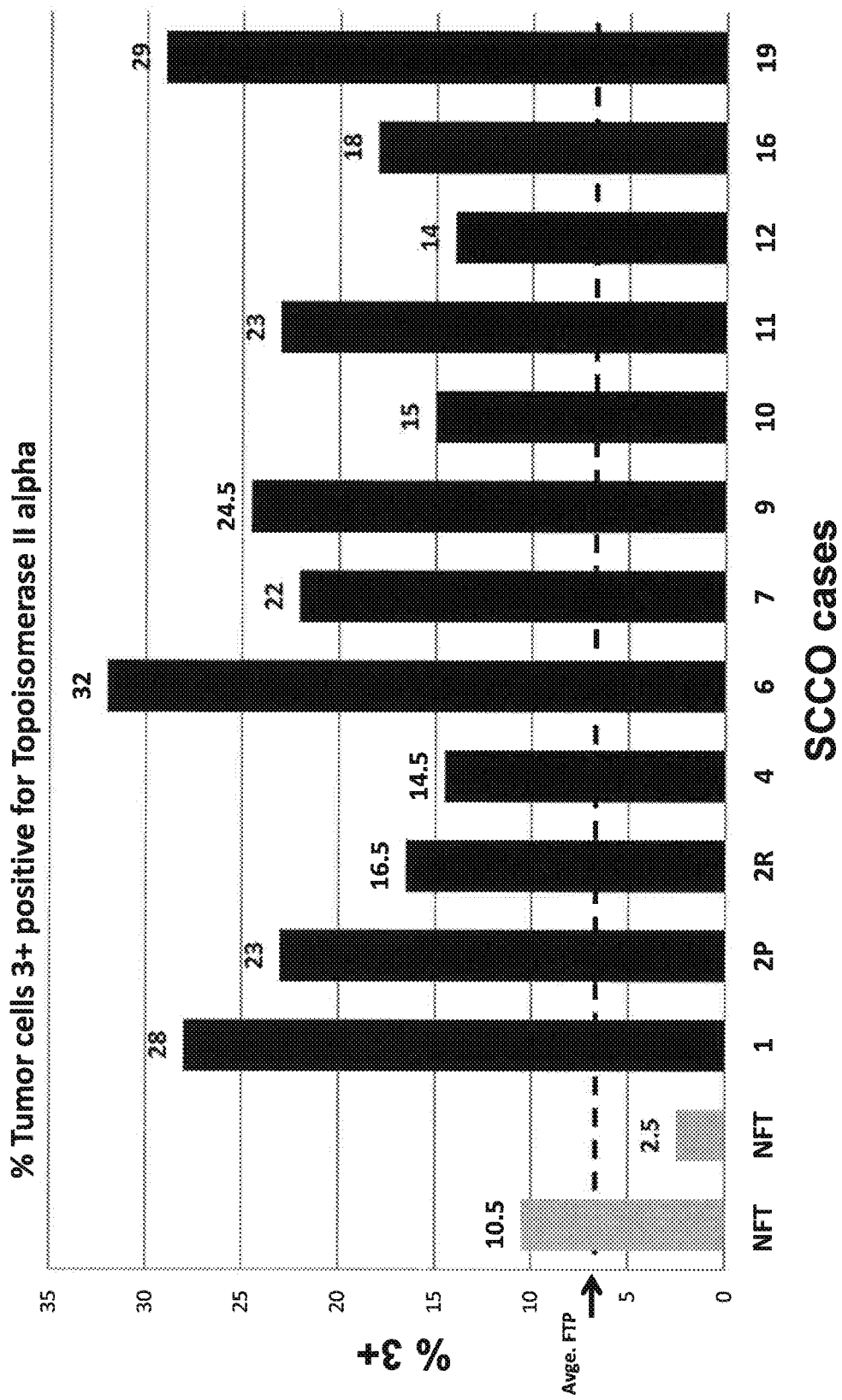
FIG. 15 shows an immunohistochemistry (IHC) analysis of SCCOHT tumor cells.

One of the identified upregulated gemes, TOP2A, is a marker of cell proliferation, a mediator of chromosome condensation, and a strong prognostic marker in some tumor types. TOP2A is also a direct target of etoposide and anthracycline drugs. To confirm that TOP2A is upregulated in SCCOHT tumors, an immunohistochemistry analysis was performed (FIG. 15). On average, 21.7% of SCCOHT tumor cells stained 3+ for TOP2A, 3.3 fold higher than in normal fallopian tube (NFT) epithelial cells.

Exome sequencing also revealed several single nucleotide polymorphisms that are unique to SCCOHT tumor cells (see FIG. 16).

Example 14. Additional Materials and Methods

Samples

At TGen, all patients and their relatives signed consent forms according to IRB-approved and Health Insurance Portability and Accountability Act-compliant protocols. At the University of British Columbia, biospecimens were obtained from the Ovarian Cancer Research Program (OvCaRe) tissue bank in Vancouver, British Columbia, Canada; the University of Toronto in Toronto, Ontario, Canada; the Children's Oncology Group at Nationwide Children's Hospital in Columbus, Ohio, USA; and the Hospital de la Santa Creu i Sant Pau at the Autonomous University of Barcelona in Barcelona, Spain, using an IRB-approved protocol. All of the specimens were SCCOHT, with 4 cases (SCCO-009, SCCO-010, SCCO-017 and SCCO-019) classified as large cell variants of SCCOHT in their pathology reports. Cases of small cell carcinoma of pulmonary type were excluded from the study.

DNA Extraction

FFPE DNA was extracted using Qiagen's All Prep DNA/RNA FFPE kit (Qiagen; Valencia, CA). Blood leukocytes (buffy coat) were isolated from whole blood by centrifugation at room temperature and resuspended in Buffer RLT plus. Samples were then processed for DNA isolation using the AllPrep kit (Qiagen). DNA was quantified using the Nanodrop spectrophotometer (Nanodrop; Wilmington, DE) on the basis of 260 nm/280 nm and 260 nm/230 nm absorbance ratios.

PCR Amplification and Sanger Sequencing Analysis

PCR amplification of SMARCA4 was performed using previously published primers (Witkowski L, et al. "Germline and somatic SMARCA4 mutations characterize small cell carcinoma of the ovary, hypercalcemic type," Nat Genet 2014; 46:438-443) targeting 34 coding exons (the alternative exon 29 was not sequenced). Amplification of all SMARCB1 coding exons was performed using the primers shown in Table 5, some of which have been previously published (Fruhwald M C, et al. "Non-linkage of familial rhabdoid tumors to SMARCB1 implies a second locus for the rhabdoid tumor predisposition syndrome," Pediatr Blood Cancer 2006; 47:273-841.

Universal M13 tails were added to all primers. Each primer pair was mixed with 10 ng of genomic DNA and subjected to the following cycling parameters: 94° C. for 2 min., 3 cycles at each temperature: 30 sec. at 94° C., 30 sec. at 60-57° C., 45 sec. at 72° C.; 25 cycles: 30 sec. at 94° C., 30 sec. at 62° C., 45 sec. at 72° C.; final extension of 5 min. at 72° C. All amplification reactions were performed using Platinum Taq DNA Polymerase #10966-034 (Life Technologies; Carlsbad, CA). PCR amplicons were sequenced using M13 forward and reverse primers at the Arizona State University's DNA Laboratory (Tempe, AZ).

TABLE 5

Primers used to amplify all SMARCB1 coding exons.

| Primer Name | Forward Sequence | Reverse Sequence |
| --- | --- | --- |
| Exon 1 | CTTCCGGCTTCGGTTTCCCT (SEQ ID NO: 6) | GATGAATGGAGACGCGCGCT (SEQ ID NO: 7) |
| Exon 2 | GTTGCTTGATGCAGTCTGCG (SEQ ID NO: 8) | TTCATGACATAAGCGAGTGG (SEQ ID NO: 9) |
| Exon 3 | GATGTGCTGCATCCACTTGG (SEQ ID NO: 10) | TTCAGAAAAGACCCCACAGG (SEQ ID NO: 11) |
| Exon 4 | TTAGTTGATTCCTGGTGGGC (SEQ ID NO: 12) | GAACTAAGGCGGAATCAGCA (SEQ ID NO: 13) |

TABLE 5-continued

Primers used to amplify all SMARCB1 coding exons.

| Primer Name | Forward Sequence | Reverse Sequence |
|---|---|---|
| Exon 5 | TGTGCAGAGAGAGAGGCTGA (SEQ ID NO: 14) | CACGTAACACACAGGGGTTG (SEQ ID NO: 15) |
| Exon 6 | CAATCTCTTGGCATCCCTTC (SEQ ID NO: 16) | CAGTGCTCCATGATGACACC (SEQ ID NO: 17) |
| Exon 7 | TGGGCTGCAAAAGCTCTAAC (SEQ ID NO: 18) | AGTTTTGCAGGGAGATGAGG (SEQ ID NO: 19) |
| Exon 8 | GGCCAAAGCTTTCTGAGGAT (SEQ ID NO: 20) | CATGGGAGACTGGGAAAGGC (SEQ ID NO: 21) |
| Exon 9 | CCCTGTAGAGCCTTGGGAAG (SEQ ID NO: 22) | GTCCTTGCCAGAAGATGGAG (SEQ ID NO: 23) |

Immunohistochemistry

Whole slide sections were prepared from paraffin blocks of formalin-fixed SCCOHT tumor cases and SCCO-1 cells. Unstained slides were processed using the Ventana Discovery Ultra system (Ventana Medical Systems), using a rabbit monoclonal antibody to SMARCA4 (BRG1; Abcam, ab110641; 1:25 dilution) and mouse monoclonal antibody to SMARCB1 (INI1; BD Transduction Laboratories, 612110; 1:50 dilution). The antibody to SMARCB1 was used to confirm the antigenic reactivity of the tumor cells and cell lines that were negative for SMARCA4 expression. Tumors were scored positive if any tumor cell nuclei showed moderate to strong (definite) positive nuclear staining. Tumors were scored negative when tumor cells showed no nuclear staining only if there was adequate nuclear staining of an internal positive control (endothelial cells, fibroblasts or lymphocytes). No cytoplasmic staining was seen for SMARCA4.

Example 15. Inactivating SMARCA4 Mutations in SCCOHT

Prior to the discoveries described below, SCCOHTs molecular etiology was understood primarily according to its clinical pathology and expression profile. No mutations had been identified by targeted sequencing of candidate genes such as KRAS, BRAF, BRCA1, BRCA2, and TP53 and the genome was seen to be predominantly diploid by comparative genomic hybridization. Now, next-generation sequencing analyses from independent laboratories have reframed our biological understanding of SCCOHT by revealing that nearly all tumors harbor inactivating, often bi-allelic, mutations in the chromatin-remodeling tumor suppressor gene SMARCA4. We previously sequenced tumor or germline DNA from 12 SCCOHT cases and the patient-derived BIN-67 cell line, identifying inactivating mutations in 9 of these samples. We also found 15 of 18 cases with loss of SMARCA4 protein expression by immunohistochemistry. We now report the SMARCA4 status of an additional 12 SCCOHT tumors, 3 matched germlines, and the cell line SCCO-114, bringing the total number of cases analyzed in our hands to 24. This analysis was performed by PCR amplification of all coding exons of the SMARCA4 gene using DNA extracted from formalin-fixed paraffin-embedded (FFPE) blocks followed by Sanger sequencing in addition to immunohistochemistry against SMARCA4 and SMARCB1 as previously described (Ramos P, et al. "Small cell carcinoma of the ovary, hypercalcemic type, displays frequent inactivating germline and somatic mutations in SMARCA4," Nat Genet 2014; 46:427-9). In total, we have now identified 19 of 24 sequenced tumors with SMARCA4 mutations and 16 of 19 stained tumors with loss of SMARCA4 protein as shown in Table 6.

TABLE 6

SMARCA4 mutations identified in DNA from SCCOHT patients and cell lines

| Sample ID | Age at diagnosis (years) | SMARCA4 mutations | | IHC | |
|---|---|---|---|---|---|
| | | Germline | Tumor | SMARCA4 | SMARCB1 |
| SCCO-001 | 22 | N/A | p.Ala161Val p.Ala532fs | Negative | Positive |
| SCCO-004 | 32 | None | p.Val204fs | Negative | Positive |
| SCCO-005 | 18 | None | p.Asp1299fs | N/A | N/A |
| SCCO-006 | 32 | None | p.Trp764fs p.Gly836* | Negative | Positive |
| SCCO-007 | 25 | N/A | p.Gln331* p.Ile542fs | Negative | Positive |
| SCCO-009 | 27 | N/A | p.Tyr1050fs | Negative | Positive |
| SCCO-011 | 30 | N/A | Homozygous p.Arg1189* | Negative | Positive |
| SCCO-016 | 12 | N/A | Homozygous p.Arg1329fs | Negative | Positive |
| SCCO-018 | 5 | N/A | None | Positive | Negative+ |
| SCCO-019 | 27 | N/A | p.Phe844fs | Negative | Positive+ |
| SCCO-1 | Tumor cell line | N/A | p.Pro1180fs p.Arg1077* | Negative+ | N/A |
| SCCO-002 | 26 | None | None | Negative | Positive |
| SCCO-008 | 9 | p.Arg979* | N/A | N/A | N/A |
| SCCO-010 | 6 | None | None$^{2+}$ | Positive | Negative |
| SCCO-012 | 21 | N/A | None | Negative | Positive |
| SCCO-014 | 33 | N/A | p.Glu667fs p.Leu1161fs | N/A | N/A |
| SCCO-015 | 27 | N/A | p.Arg1189* | N/A | N/A |
| SCCO-017 | 10 | p.Gly241fs | Homozygous p.Gly241fs$^{2+}$ | Negative | Positive |

TABLE 6-continued

SMARCA4 mutations identified in DNA from SCCOHT patients and cell lines

| Sample ID | Age at diagnosis (years) | SMARCA4 mutations Germline | SMARCA4 mutations Tumor | IHC SMARCA4 | IHC SMARCB1 |
|---|---|---|---|---|---|
| DAH23 | 30 | N/A | c.2438 + 1_2438 + 2ins TGA | Negative | N/A |
| DAH456 | 39 | None | None | Positive | Positive |
| DAH457 | 23 | N/A | p.Arg1093* | N/A | Positive |
| DG1006 | 34 | None | p.Glu952fs p.Ser1591fs | Negative | N/A |
| DG1219 | 37 | None | c.3168 + 1 > A | Negative | N/A |
| BIN-67 | Tumor cell line | N/A | c.2438 + 1G > A c.2439 − 2A > T | Negative | Positive |

Across all published studies to date and including the new data reported here, nearly 100 mutations have been identified in SMARCA4 (see FIG. 17) in 64 of 69 SCCOHT cases including 2 cell lines (see Table 6). With the exception of 3 missense mutations, all other SMARCA4 mutations identified in SCCOHT are truncating, frameshift, deletion, or splice-site mutations. Two of the 3 missense mutations were found in SMARCA4-negative tumors bearing a second inactivating SMARCA4 mutation, while in one case the tumor harbored the missense mutation p.Gly1080Asp and loss of heterozygosity (LOH) alongside SMARCA4 protein retention (Witkowski L, et al. "Germline and somatic SMARCA4 mutations characterize small cell carcinoma of the ovary, hypercalcemic type," Nat Genet 2014; 46:438-443). Bi-allelic inactivation of SMARCA4 in SCCOHT is common either through the presence of 2 mutations or a single mutation and LOH at the SMARCA4 locus. In keeping with these findings, immunohistochemistry has revealed loss of SMARCA4 protein in 54 of 61 SCCOHT tumors and cell lines presumably due to nonsense-mediated decay as has been shown in several cases. However, a number of SMARCA4 negative cases carry heterozygous nonsense mutations and 2 cases have been shown to lack SMARCA4 protein with no identified sequence, copy number, or methylation alterations in the SMARCA4 gene (see Table 6). Mechanisms leading to gene inactivation in SMARCA4-negative tumors with heterozygous or unidentified gene alterations remain to be elucidated.

Conversely, all but 4 SMARCA4-mutant SCCOHTs for which IHC has been performed also lack expression of SMARCA4 protein. These 4 SMARCA4-mutant, positive-staining tumors harbored either splice site or missense mutations or, in one case, an in-frame homozygous deletion of exons 25 and 26 that resulted in expression of an inactive protein product. In our cohort, we also found 3 tumors that had no SMARCA4 mutations and showed retention of protein expression by IHC. Two of these cases, both associated with paraneoplastic hypercalcemia, lacked the protein SMARCB1, a SWI/SNF-associated tumor suppressor gene known to be frequently mutated in rhabdoid tumors. Targeted Sanger sequencing of the coding exons of SMARCB1 in these tumors revealed a novel homozygous frameshift mutation, p.Asn34fs, resulting from the deletion of 14 base pairs in exon 2 of SMARCB1 in SCCO-010, a large cell variant SCCOHT. This finding supports the hypothesis that SCCOHT may share an etiological link with rhabdoid tumors and that SMARCB1 inactivation can also promote the development of SCCOHT. The third case retained both SMARCA4 and SMARCB1 protein expression and may bear an as-yet unidentified SCCOHT driver gene mutation or may simply be a misdiagnosis. Overall, SMARCA4 is clearly a tumor suppressor inactivated by 2 hits in the majority of SCCOHTs, but several of the above exceptional cases provide clues to a more complex disease etiology.

Further supporting the prominence of SMARCA4's tumor suppressor role in SCCOHT, germline mutations have been identified in 17 SCCOHT cases, predominantly in younger patients. Such mutations have been found to segregate in 4 families in which all affected members whose tumors could be tested developed either a second inactivating mutation or LOH in the remaining wild-type allele. Alongside previous clinical descriptions of SCCOHT families, these mutations elucidate a heritable component to the disease and suggest that the broad age distribution of SCCOHT could reflect inherited versus acquired SMARCA4 mutations. SMARCA4 mutation also occurs in the absence of recurrent secondary genomic alterations and amidst relative karyotypic stability and, therefore, appears to be the primary driving event in SCCOHT tumorigenesis. The total number of somatic non-silent mutations detected by paired exome or whole-genome sequencing analysis in SCCOHT tumors and matched normal DNAs ranges from 2 to 12, reflecting a low mutation rate, similar to other pediatric tumors and tumors of non-self-renewing tissues. Among paired tumor and normal samples evaluated by exome, whole-genome, or panel-based sequencing, few secondary mutations in cancer genes were discovered and each such mutation (those in ASXL1, JAK3, NOTCH2, and WT1) occurred in only a single case. Overall, the low SCCOHT mutation rate, the nearly universal presence of inactivating SMARCA4 mutations in SCCOHT, the presence of these mutations in patient germlines and families, and the lack of recurrent secondary alterations in these tumors strongly suggest that loss of SMARCA4 is sufficient for SCCOHT initiation.

Example 16. Biological, Diagnostic, and Therapeutic Implications of SMARCA4 Loss in SCCOHT SMARCA4 is one of 2 mutually-exclusive ATPases of the SWItch/Sucrose NonFermentable (SWI/SNF) chromatin-remodeling complex which was originally discovered to modulate mating type-switching and sucrose fermentation in yeast. This complex uses the energy of ATP hydrolysis to destabilize histone-DNA interactions and move, eject, or restructure nucleosomes, thereby regulating access to DNA of transcription, replication, and repair machinery. SWI/SNF subunits such as SMARCA4 have also been shown to interact with tumor suppressors such as p15INK4b, p16INK4a, p21CIP/WAF1, and hypophosphorylated RB to modulate cell cycle progression. Broadly, mutations in epigenetic regulators such as SWI/SNF members are enriched in many cancer types, particularly pediatric cancers in which as many as 30% of brain tumors and leukemias and 17% of solid tumors bear such mutations. This enrichment may be due to the pleiotropic effects these mutations exert on gene expression and cell differentiation programs. Many SWI/SNF subunits such as SMARCA4 have also been shown to interact with, or regulate, tumor suppressors with approximately 20% of cancers bearing mutations in these genes. SMARCA4 is one of the most commonly mutated subunits across cancer types, occurring at a frequency of about 4% in all cancers and arising regularly in non-small cell lung cancer, Burkitt's lymphoma, and medulloblastoma while also occurring occasionally in melanoma, pancreatic adenocarcinoma, ovarian clear cell carcinoma, and other tumor types. Loss of SMARCA4 is thought to lead to dependence on SMARCA2-bearing SWI/SNF complexes that induce gene expression changes driving oncogenic pro-survival and/or anti-apoptotic signaling. Elucidation of the impact of such mutations on SWI/SNF composition and downstream effects on expression programs and pathway regulation will shape future study of SCCOHT tumorigenesis and therapeutic vulnerability.

Given SCCOHT's complex histological appearance and the absence of known precursor lesions, the cellular origin of SCCOHT and its relationship to other tumor types remains unclear. SCCOHTs are characterized by poorly differentiated small tumor cells with scant cytoplasm and hyperchromatic nuclei, and the presence of follicle-like structures contained within sheets of cells. Despite SCCOHTs name, about half of tumors have populations of large cells with rhabdoid features. Indeed, there are many similarities between SCCOHT and atypical teratoid/rhabdoid tumors of the brain (AT/RTs) and malignant rhabdoid tumors (MRTs) of the kidney (MRTK). All 3 tumor types are linked to mutations in the SWI/SNF genes SMARCB1 (AT/RT, MRT, and now SCCOHT) or SMARCA4 (SCCOHT and AT/RT), all have diploid genomes and all occur in young or pediatric patients. Shared morphology and mutational spectra make a compelling case that SCCOHT may be a type of MRT. The strikingly similar morphology and genetics of rhabdoid tumors in 3 very different organs suggests either a common cell of origin or convergent morphologic evolution upon SMARCA4 or SMARCB1 loss (or both) although no MRT cell of origin has yet been identified. On the other hand, there is some histological evidence for a germ cell etiology for SCCOHT. In particular, a recent report identified immature teratoma in 2 SCCOHTs, one of which also contained foci of yolk-sac tumor. This finding agrees with Ulbright et al. who, in one of the earliest publications on SCCOHT in 1987, also suggested that SCCOHTs might be related to yolk-sac tumors based on presence of shared histopathological and ultrastructural features (Ulbright T M, et al. "Poorly differentiated (small cell) carcinoma of the ovary in young women: evidence supporting a germ cell origin," Hum Pathol 1987; 18:175-84). Unfortunately, no clear origin has been indicated by mouse models of SMARCA4 mutation. The homozygous Smarca4 null genotype is embryonic lethal and, while 10% of heterozygotes spontaneously develop mammary tumors at 1 year, these tumors are molecularly heterogeneous, genomically unstable, and lack LOH at the Smarca4 locus and therefore do not contain a genomic landscape resembling that of SCCOHTs. Engineered SMARCA4 knockouts in putative precursor cells in vitro and in vivo are needed to shed light on SCCOHT histogenesis.

Among ovarian tumors, the loss of SMARCA4 protein appears to be highly specific for SCCOHT. Our assessment of 485 primary ovarian epithelial, sex cord-stromal, and germ cell tumors showed only 2 tumors (0.4%), both clear cell carcinomas, with negative SMARCA4 staining. Other ovarian tumors in the differential diagnosis of SCCOHT—undifferentiated carcinomas, adult and juvenile granulosa cell tumor, and germ cell tumors—all expressed SMARCA4 protein or were wild-type for the SMARCA4 gene. The expression status of SMARCA4 remains to be determined in several other primary and metastatic ovarian tumors in the differential diagnosis of SCCOHT including endometrioid stromal sarcoma, desmoplastic small round cell tumor, primitive neuroectodermal tumor, neuroblastoma, and others. However to date, the absence of SMARCA4 protein is highly sensitive and specific for SCCOHT and can be used to distinguish it from other ovarian tumors with similar histology to facilitate diagnosis.

SCCOHTs are extremely aggressive and refractory to treatment that most commonly includes surgical debulking followed by high-dose chemotherapy and/or radiation. Some evidence suggests that chemotherapeutic combinations including cisplatin or carboplatin, etoposide and *vinca* alkaloids may be associated with improved survival, yet patient outcomes are abysmal in most cases with a 65% recurrence rate and 2-year survival less than 35%. SCCOHT rarity limits the implementation of prospective clinical trials to guide effective treatment and its infrequency has also limited the study of its pathogenesis to uncover potential therapeutic vulnerabilities. Our finding that the majority of SCCOHTs contain SMARCA4 mutations amidst otherwise simple genomic backgrounds provides an opportunity to empirically develop effective treatment strategies with a high probability of impact for many of these patients. Given that this disease derives in virtually all cases from the loss of a tumor suppressor, the path to an effective small molecule may hinge on identification of a synthetic lethal target. To this end, a synthetic lethal dependence of SMARCA4-deficient cancers cells on SMARCA2 has recently been described in non-small cell lung cancer, ovarian and liver cancer cell lines (Oike T, et al. "A synthetic lethality-based strategy to treat cancers harboring a genetic deficiency in the chromatin remodeling factor BRG1," Cancer Res 2013; 73:5508-18; Wilson B G, et al. "Residual complexes containing SMARCA2 (BRM) underlie the oncogenic drive of SMARCA4 (BRG1) mutation," Mol Cell Biol 2014; 34(6): 1136-44). This dependence is likely due to SMARCA2's status as the only known alternative ATPase subunit of the SWI/SNF complex. However, preliminary SMARCA2 staining in 2 SCCOHT cell lines showed lack of protein in both cases (data not shown), suggesting that SCCOHT may lack the expression of both SMARCA2 and SMARCA4 and that investigation of other synthetic lethal partners is therefore warranted. Although it has been shown in other cancers such as non-small cell lung adenocarcinoma cell lines that the SWI/SNF core complex still forms in the absence of both SMARCA4 and SMARCA2, it remains to be determined whether this complex retains chromatin remodeling activity and whether targeting the residual complex can selectively kill SCCOHT cells. Of further importance will be identification of the mechanism inactivating the second SMARCA4 allele in cases in which only monoallelic mutations have been identified. Epigenetic lesions may present compelling targets for re-expression of SMARCA4 and/or SMARCA2. Ultimately, future progress in SCCOHT treatment will depend on expansion of the currently limited number of in vitro and in vivo model systems. The BIN-67 and SCCOHT-1 cell lines are the only such models to have yet been described and they have been implemented in few studies in vivo.

The breakthrough identification of inactivating SMARCA4 mutations in almost all cases of SCCOHT is the first significant insight into the pathogenesis of the disease and offers the opportunity for genetic testing of family members at risk. The loss of the SMARCA4 protein is a highly sensitive and specific marker of the disease, highlighting its potential role as a diagnostic marker. Studies are currently in progress at our institutions to elucidate the cell of origin in hopes of better understanding the pathogenesis of this disease and to identify therapeutic vulnerabilities guiding clinical trials to further advance treatment options for patients with SCCOHT.

Example 17. Investigation of the Epigenetic Consequences of SMARCA4/A2 Re-Expression SWI/SNF Complex Mutations and Human Cancer.

Figure 17:
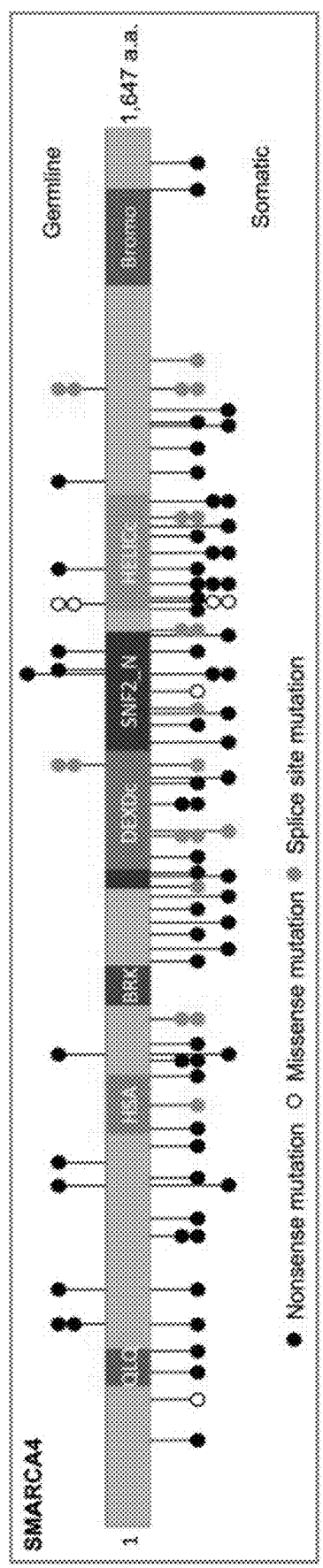
FIG. 17 depicts a schematic of SMARCA4 mutations in SCCOHT. SMARCA4 mutations identified in germline and tumor DNA from 62 SCCOHT patients, and in 2 SCCOHT cell lines. All but 4 of these cases also show SMARCA4 protein loss by IHC. QLQ, Gin, Leu, Gin motif; HSA, helicase/SANT-associated domain; BRK, brahma and kismet domain; DEXDc, DEAD-like helicase superfamily domain; HELICc, helicase superfamily C-terminal domain; Bromo, bromodomain.

Recent next generation sequencing studies have identified inactivating mutations in SMARCA4, one of two mutually exclusive ATPase subunits of the SWI/SNF chromatin-remodeling complex, in many human cancers. The consequences of these mutations have proved difficult to study because they usually present alongside additional driver mutations in a background of genomic instability. Recent studies have now identified inactivating germline and somatic SMARCA4 mutations and concomitant protein loss in ~90% of small cell carcinoma of the ovary, hypercalcemic type (SCCOHT) cases, a deadly cancer that primarily affects young women and children (FIG. 17). In contrast to most adult malignancies, SCCOHT genomes are predominantly diploid with rare secondary mutations in other cancer genes. We have also discovered that all tumors with SMARCA4 loss also lose expression of the alternative SWI/SNF ATPase SMARCA2 without apparent mutations, a phenomenon seen in some lung cancers that correlates with their poor prognosis. The presence of germline mutations, the frequency of bi-allelic somatic mutations coupled with loss of protein expression, and the absence of secondary recurrent genomic alterations in SCCOHT implicate SMARCA4 mutations as the driving lesion in SCCOHT tumorigenesis. However, the relevance of SMARCA2 loss to this process remains unclear. Several cell culture studies have indicated a synthetic lethal dependency between these ATPases. Our proposed studies will directly address this paradox by establishing the requirement for SMARCA4 inactivation and/or SMARCA2 loss in SCCOHT development and by determining the temporal order of these events. This work also has broader implications—the simple genetic background of SCCOHT provides a superior model for parsing out the mechanisms by which mutations in SWI/SNF subunits drive human tumor development.

Clinical Aspects of SCCOHT.

Since its identification in 1979, fewer than 500 cases of SCCOHT have been described, limiting the study of SCCOHT biology and clinical management. Diagnosis can be challenging due to nonspecific poorly-differentiated "small cell" histology and lack of diagnostic immunohistochemical markers. Patient outcomes are abysmal with a 65% recurrence rate and 2-year survival less than 35%. While standard treatment includes surgery and aggressive multi-agent chemotherapy, SCCOHT's rarity and lack of logical treatment options have limited clinical study. SCCOHT's aggressive clinical course and striking dearth of empirical characterization establish a great need for expanded understanding of its biology and for new diagnostic and treatment paradigms. Just as the discovery of ubiquitous inactivation of the SWI/SNF subunit SMARCB1 in malignant rhabdoid tumors (MRTs) has transformed functional studies and targeted therapeutic development in these tumors, our studies build on our characterization of SMARCA4 loss to transform our understanding of SCCOHT's etiology and therapeutic vulnerabilities.

It is proposed that 1) SMARCA4 mutations drive tumor development by altering gene expression and disrupting normal differentiation; and 2) these mutations define a therapeutic vulnerability in cancer. Furthermore, the paradigm of SMARCA4 mutations in the absence of confounding genetic backgrounds inform not only SCCOHT biology and clinical management, but also that of other lethal cancers bearing these mutations In some aspects, the current invention relates to the observation of ubiquitous SMARCA4 mutations and protein loss in SCCOHT and the accompanying loss of SMARCA2 protein expression. In other aspects, the invention relates to the hypothesis linking SWI/SNF complex dysregulation with aberrant differentiation during SCCOHT development and to therapeutic vulnerability. In yet other aspects, the current invention is directed to the generation of novel cell lines and reagents for exploring the consequences of SMARCA4 and SWI/SNF mutations in tumor development in a simple genetic background and for preclinical drug testing.

Our data show that SMARCA4 mutations drive SCCOHT development. Our studies will determine the effects of re-expressing SMARCA4, and/or SMARCA2, (referred to as SMARCA4/A2) in SCCOHT cell lines with respect to chromatin organization, SWI/SNF complex composition, and interactions with other epigenetic regulators. We will also model the histogenesis of SCCOHT by in vitro and in vivo assessment of the effects of SMARCA4/A2 loss on differentiation and transformation of potential precursor cells. Finally, we will utilize our expertise in high-throughput screening for unbiased discovery of biological targets to inform functional and ontological studies and identify therapeutic compounds for rapid clinical translation of new treatments for SCCOHT and for other deadly cancers with SMARCA4 mutations.

The SWI/SNF chromatin-remodeling complex regulates biological pathways including cell cycle arrest, DNA repair, apoptosis and cell differentiation. It has been shown that subunits of this complex are subject to inactivating mutations in ~20% of cancers, but few studies have comprehensively established the mechanisms by which these subunits act as tumor suppressors. SMARCA4, one of two mutually exclusive SWI/SNF ATPases, is one of the most commonly mutated SWI/SNF subunits across cancer types, occurring at an overall frequency of ~4% and arising more frequently in cancers such as lung adenocarcinoma, Burkitt lymphoma, and medulloblastoma. It has been established that somatic and/or germline inactivating SMARCA4 mutations occur in >90% of SCCOHTs. SMARCA4 behaves as a classical tumor suppressor in these cancers through inactivating bi-allelic mutations that lead to protein loss. Furthermore, we have also found loss of SMARCA2 protein, the other ATPase subunit, in SCCOHTs with SMARCA4 mutations. In SCCOHT, stable diploid genomes and lack of recurrent secondary mutations suggest that epigenetic changes may drive oncogenic progression. We will determine the effects of SMARCA4/A2 re-expression in SCCOHT cell lines on cell survival, SWI/SNF complex composition and the primary functions of the SWI/SNF complex including nucleosome positioning and histone modification. We will also carry out gene expression analyses to identify potential downstream targets of SMARCA4/A2 for validation in primary tumors and for therapeutic development. We will thereby obtain insights into the role of SMARCA4/A2 inactivation in the etiology of SCCOHT. As SMARCA4/A2 exert profound effects on epigenetic control of diverse cellular programs, identifying variation in SWI/SNF complex membership and charting the downstream effects of these changes after re-expression of SMARCA4/A2 in SCCOHT will be central to understanding the roles of these SWI/SNF ATPases in homeostasis and tumorigenesis.

SMARCA4 and SMARCA2 Status in SCCOHT—

In addition to whole genome or exome sequencing of 12 samples, we have now performed targeted sequencing of SMARCA4 in an additional 12 SCCOHT formalin-fixed, paraffin-embedded (FFPE) cases, 3 matched germline samples, and the cell line SCCOHT1. In total, 19 of 24 SCCOHT tumors show SMARCA4 mutations and 16 of 19 tumors lack SMARCA4 protein by immunohistochemistry (IHC). We also examined the alternative SWI/SNF ATPase, SMARCA2, and found no protein expression in SCCOHT tumors and cell lines that lack SMARCA4. No SMARCA2 mutations have been identified in SCCOHT; the underlying inactivating mechanism is unknown.

SMARCA4/A2 Re-Expression in BIN67 Cells—

Figures 18A, 18B:
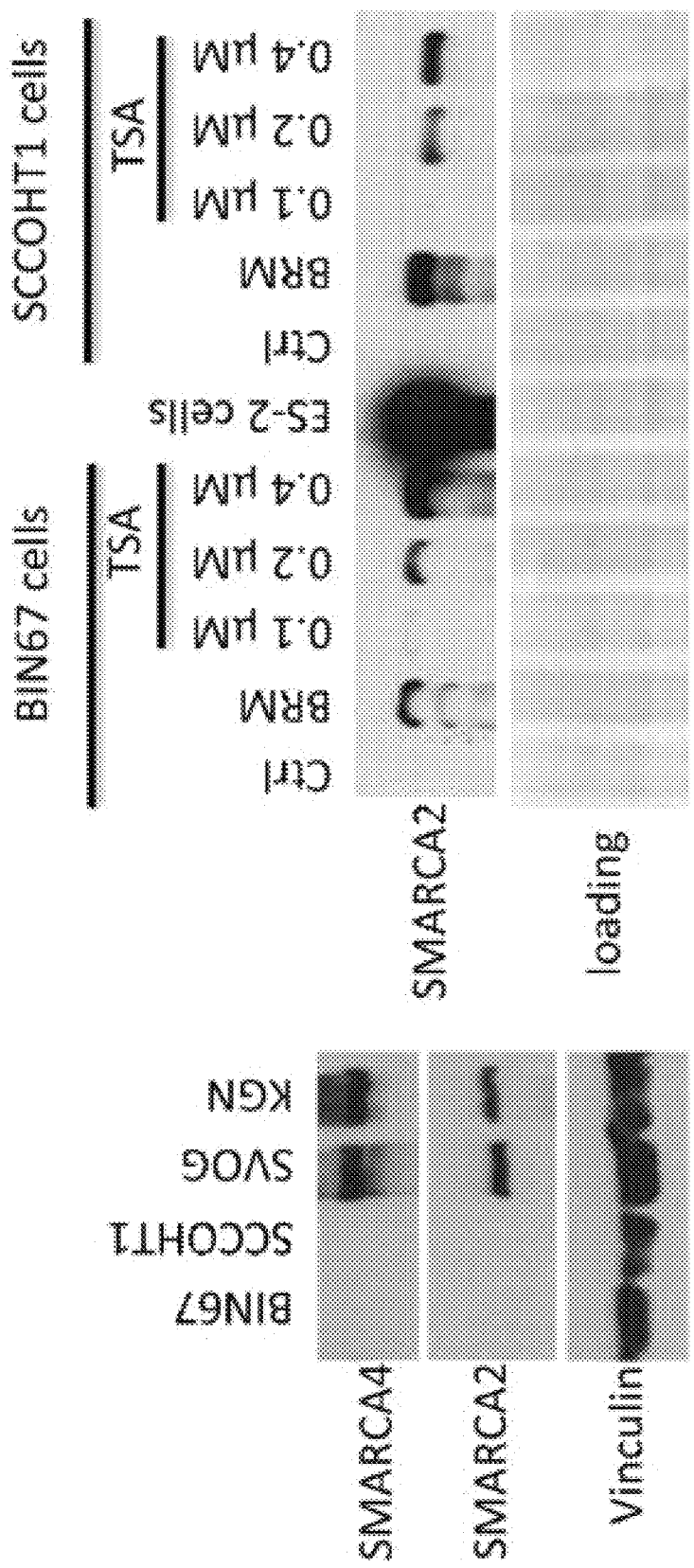
FIGS. 18A-18D depict characterization of SMARCA4/A2 expression in SCCOHT cell lines.
Figure 18D:
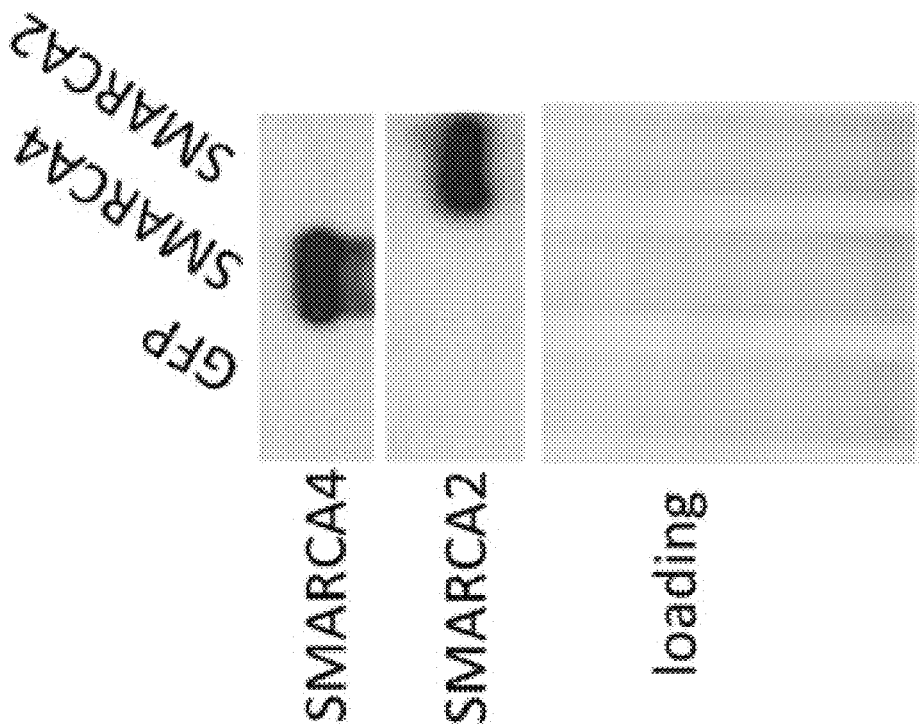
Figure 18C:
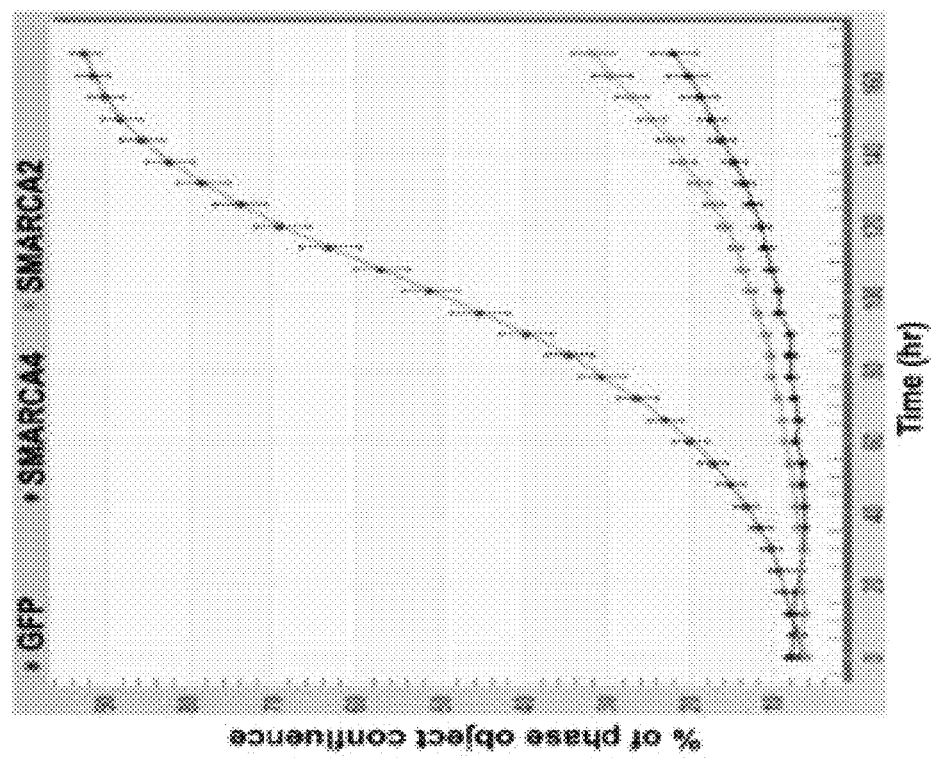

As observed in primary tumors, 2 SCCOHT cell lines (BIN67 and SCCOHT1) displayed no detectable level of SMARCA4/A2 by Western blotting (FIG. 18A). Consistent with the hypothesis that SMARCA2 is epigenetically silenced, treatment of BIN67 and SCCOHT1 cells with the histone deacetylase inhibitor trichostatin A (TSA) resulted in dose-dependent upregulation of SMARCA2 protein (FIG. 18B). Re-expression of SMARCA4 in BIN67 cells slowed cell proliferation (FIG. 18C) but did not restore SMARCA2 expression (FIG. 18D). While these data support a role for inactivation of SMARCA4 in SCCOHT development, the importance of SMARCA2 loss remains unclear. To understand the roles of these two mutually exclusive ATPases in SCCOHT etiology, we will elucidate the epigenetic consequences of re-expression of one or both SWI/SNF complex ATPases in SCCOHTs.

Immunoprecipitation (IP) and Mass Spectrometry (MS) Analysis of the SWI/SNF Complex in SCCOHT—

To investigate the integrity of SWI/SNF complex in SCCOHT, we examined component levels by Western blotting in BIN67 and SCCOHT1 cells. As we recently reported for MRTs, several complex members showed altered levels as compared to a HeLa cell derivative (FIG. 19A). We also successfully isolated the same proteins by MS after IP with an antibody against SMARCC1 (FIG. 19B).

Nucleosome Positioning—

Using the H358 human lung adenocarcinoma cell line, we found that SMARCA4 loss is associated with altered nucleosome positioning and occupancy surrounding the transcriptional start sites (TSS) of genes that are important for tumor progression (Orvis, T., et al. "Inactivation of the SWI/SNF complex ATPase BRG1/SMARCA4 leads to gene silencing during non-small cell lung cancer development," Cancer Research Published Online First Aug. 12, 2014; doi: 10.1158/0008-5472.CAN-14-0061 (2014)). We will determine the effects of SMARCA4/A2 re-expression on global nucleosome positioning in SCCOHT cell lines using a similar approach.

Research Design and Methods
Identify Effects of SMARCA4/A2 Re-Expression on Chromatin Organization and Gene Expression—
Cell Lines:

We have previously used the pINDUCER20 vector to provide inducible expression of SMARCB1 in human tumor cells. We have now generated an inducible SMARCA4 expression vector, pINDUCER20-SMARCA4, to regulate expression of this gene in the BIN67 and SCCOHT1 cell lines. We have also derived a pINDUCER20-SMARCA2 vector expressing a different selection marker to allow generation of cell lines with inducible expression of SMARCA4, SMARCA2 or both. These cell lines will allow us to distinguish between the effects of either ATPase subunit as well as the consequences of re-expression of both, representative of the pattern we observed in most normal tissues. For all experiments described below, we will compare each cell line+/−doxycycline (DOX) for 24 hours. The level of SMARCA4/A2 induction will be titrated to fall into the range found in the immortalized primary granulosa cell line SVOG3e and in the yolk sack tumor cell line NOY1.

MNase-seq:

To search for changes in nucleosomal positioning, we will carry out MNase-seq as previously described (Orvis, T., et al. "Inactivation of the SWI/SNF complex ATPase BRG1/SMARCA4 leads to gene silencing during non-small cell lung cancer development," Cancer Research Published Online First Aug. 12, 2014; doi:10.1158/0008-5472.CAN-14-0061 (2014)). Briefly, we will initially determine the optimal conditions of MNase digestion to generate a distribution of ~35% mononucleosomes for each SCCOHT cell line. We will also confirm a similar distribution of nucleosomes after MNase digestion of chromatin for each cell line to preferentially analyze nucleosomes with similar sensitivity to MNase and avoid overdigestion. After digestion, nucleosomes are separated on an agarose gel, with the mononucleosome excised and purified for library production. Libraries will be created following manufacturer's specifications (Illumina). After library generation, paired-end sequencing will be performed. Paired-end reads will be aligned to the reference human genome (hg19) using Bowtie v1.0.0 28, and SAMtools v0.1.19 29 and DANPOS 30 will be used to predict size and positions of nucleosomes.

Gene Expression Analyses:

Gene and miRNA expression analyses will be performed by RNA-seq as previously described (Orvis, T., et al. "Inactivation of the SWI/SNF complex ATPase BRG1/SMARCA4 leads to gene silencing during non-small cell lung cancer development," Cancer Research Published Online First Aug. 12, 2014; doi:10.1158/0008-5472.CAN-14-0061 (2014)). Following isolation of RNA samples, libraries will be created using TruSeq RNA Sample Preparation Kit v2 (Illumina), which includes a poly A selection step. Libraries will be pooled and then subjected to cBot cluster generation using TruSeq Rapid PE Cluster Kit (Illumina). The amplified libraries will be sequenced using the TruSeq Rapid SBS Kit on the HiSeq 2500 (Illumina). mRNA-seq data will be aligned with Mapsplice33 and genes will be quantified with RSEM34. Gene expression estimates will be upper quartile normalized. For comparison of gene expression in SCCOHT cells lines +/−SMARCA2/4, gene expression measurements will be computed by replacing all RSEM values identically equal to zero with the smallest non-zero RSEM value and then applying a log 2 transformation. The SAMR package will be used to detect genes that are differentially expressed after SMARCA2/4 reexpression compared to the parental cell lines (Tusher, V. G., et al.

"Significance analysis of microarrays applied to the ionizing radiation response," Proc Natl Acad Sci USA 98, 5116-21 (2001)).

Bioinformatics/Integration Studies:

Our ultimate goal is to identify downstream targets regulated by SMARCA4/A2 that are likely involved in SCCOHT development for further validation in the histogenesis studies and as potential treatment targets. We will first divide the gene expression data into 3 classes—those regulated by SMARCA4, those regulated by SMARCA2 and those regulated by both ATPases. We will then identify those genes whose changes in expression correlate with altered nucleosome positioning in their promoter regions and at their TSSs. Thus, genes with the greatest changes in expression that correlate with alterations in chromatin organization will receive the highest priority for further study. We will further filter the target gene set by eliminating genes whose expression differ between SCCOHT cell lines and xenografts. As a final filter, we will search for genes who show similar expression changes after growth inhibition by SMARCA2/4 reexpression and HDACi treatment.

We will validate the top target genes by qPCR using primers sets from Life Technologies for TaqMan® Gene Expression Assay, bisulfite sequencing and by ChIP. For genes that show altered mRNA expression, we will confirm concomitant changes in protein levels by Western blotting where antibodies exist. We plan to characterize 10 genes each, regulated by SMARCA4/A2, a feasible goal considering that a preliminary gene expression analysis revealed 3,096 genes significantly ($p<0.001$) up- or down-regulated in BIN67 overexpressing SMARCA4 relative to parental cells. Validated differentiation-associated genes upregulated upon SMARCA4/A2 re-expression will inform the model the histogenesis of SCCOHT while significantly downregulated genes will be considered as candidate targets for SCCOHT treatment.

Examine how SMARCA4/A2 Inactivation Impacts Epigenetic Modifications of Histones and DNA—

Previous studies have implicated relationships between SWI/SNF complex activity and other chromatin remodeling activities including histone modification and DNA methylation. To determine whether SMARCA4/A2 re-expression causes changes in histone modifications and/or DNA methylation, we will look at 4 histone marks and DNA methylation along the length of upstream promoter regions through the 3' ends of the 10 target genes identified in the experiments described above. We will use standard ChIP protocols to determine changes in H3 acetylation and methylation at H3K4 (activation), H3K9 (repression) and H3K27 (silencing). These histone marks provide a representative chromatin landscape for an initial analysis of SMARCA2/4 induced changes.

DNA Methylation:

We will also search for global DNA methylation changes using methylation array analysis based upon studies linking DNA methylation to chromatin remodeling. Genomic DNA extracted from cultured cells using the DNeasy Kit (Qiagen) will be processed for global methylation analysis by MeDIP-seq.

Determine how SMARCA4/A2 Loss Affects the Integrity of the SWI/SNF Complex—

Mass Spectrometry:

We have shown that loss of SMARCB1 in human rhabdoid tumors causes important changes in SWI/SNF complex composition. As shown in our data, similar changes in complex component abundance occur in the absence of SMARCA4 and SMARCA2 (FIG. 19A). We therefore plan to carry out MS on nuclear extracts of SCCOHT cell lines after SMARCA4/A2 re-expression to assess SWI/SNF complex composition. We will harvest nuclear extracts from SCCOHT cells, untreated or treated with DOX and IP overnight with an anti-SMARCC1 antibody as previously shown by Wilson et al (Wilson, B. G. et al. "Residual complexes containing SMARCA2 (BRM) underlie the oncogenic drive of SMARCA4 (BRG1) mutation," Mol Cell Biol 34, 1136-44 (2014)). Samples will be fractionated by SDS-PAGE and prepared for MS analysis using an adapted in-gel digestion protocol (Shevchenko, A., et al. "In-gel digestion for mass spectrometric characterization of proteins and proteomes," Nature protocols 1, 2856-2860 (2007)). Tryptic peptides will be separated by two-dimensional reverse-phase/reverse phase chromatography on a Waters nanoAcquity UPLC system and analyzed on TGen's Thermo LTQ Orbitrap Velos. Proteins will be identified using Mascot and Sequest search engines (tryptic fragmentation rules, maximum 2 missed cleavages, FDR<1%). Spectral matches will be manually validated. Protein confidence will be tiered using Scaffold and analytical pipelines developed at TGen.

Validation Studies:

To confirm MS results, we will separate IP'ed proteins as prepared above by SDS-PAGE and identify each complex component by Western blotting as previously described (Wei, D. et al. "SNF5/INI1 Deficiency Redefines Chromatin Remodeling Complex Composition During Tumor Development," Molecular Cancer Research 10.1158/1541-7786.MCR-14-0005(2014)). For those proteins whose presence in the complex changes after SMARCA4/A2 reintroduction, we will also determine if this reflects changes in overall protein levels or cellular location by Western blotting and immunofluorescence. Finally, for proteins with overall level changes, we will assess if the mechanism results from altered transcription by qPCR as previously described (Wei, D. et al., 2014 supra). We will also assess whether genes with altered expression are direct targets of the SWI/SNF complex by ChIP, initially using anti-SMARCC1 or anti-SMARCB1 reagents. We will also determine direct binding of other complex members that we identify as differentially included in the complex +/−SMARCA2/4. Proteins that show differential complex inclusion will be further characterized and assessed as potential targets for treatment in for SCCOHT.

Expected Results and Interpretation.

The proposed studies will reveal major mechanisms by which SMARCA4/A2 loss fuels SCCOHT tumor development including altered nucleosome positioning and/or histone modifications, DNA methylation and changes in complex composition. If significant changes in histone modifications and/or DNA methylation appear, this will raise the possible use of inhibitors of these processes for treatment that can be tested. Any epigenetic modifiers whose loss causes synthetic lethality in our genome-wide screen will be further studied to help understand the mechanisms underlying the epigenetic modifications upon SMARCA4/A2 loss. We may also identify specific genes and pathways whose expression changes correlate with SMARCA4/A2 activity. For example, SMARCA4 overexpression in BIN67 cells was associated with alterations in wound and inflammatory responses, API transcription and DNA repair processes. These putative downstream targets can also be validated with functional studies. Our studies will allow us to uncouple loss of the two ATPase subunits and determine the significance of their concomitant loss in SCCOHT. Our results, combined with the cell of origin studies should also pinpoint downstream effectors of SMARCA4/A2 loss, especially key target genes. We may also observe differences between the 2 SCCOHT cell lines used in these studies that would prove useful for histogenesis studies. Finally, we will determine whether the remaining SWI/SNF complex components can interact in the absence of these known ATPases. A recent report indicates that partial complexes remain in the absence of SMARCA4 and SMARCA2 but their functional nature is unclear (See Wilson B G, et al. "Residual complexes containing SMARCA2 (BRM) underlie the oncogenic drive of SMARCA4 (BRG1) mutation," Mol Cell Biol 2014; 34(6):1136-44)). Lack of ATPase activity should yield an inactive complex, so we may identify a different ATPase family member, such as SMARCA1 or SMARCA5, in the residual complex. Alternatively, non-enzymatic residual complexes may bind chromatin and block expression of pro-apoptotic or pro-survival genes. Further functional studies can also test whether any residual complexes drive oncogenesis.

Example 18. Modeling the Histogenesis of SCCOHT

The poorly differentiated state of SCCOHT indicates that SMARCA4 loss may drive tumorigenesis by rewiring the normal differentiation program in their precursor cells. However, the cellular origin of SCCOHT remains unclear. Histologically, SCCOHT is characterized by sheets and occasional follicles of poorly differentiated small cells. The age range, peaking in mid 20s and absent after menopause, implicates 2 normal cell types present only before menopause—oocytes (germ cells) and granulosa cells—or tumors derived thereof. Two recent cases of SCCOHT arose within an immature teratoma, a rare type of malignant germ cell tumor with primitive neuroepithelium, supporting the hypothesis that SCCOHT arises within a germ cell tumor. Alternatively, granulosa cells, which form a follicle around the oocyte to support its development, can be another candidate origin of SCCOHT since both juvenile granulosa cell tumor (jGCT, a sex cord-stromal tumor likely derived from granulosa cells) and SCCOHT make follicle-like spaces and express common immunohistochemical markers such as calretinin, WT1 and CD1016. To understand SMARCA4's role in SCCOHT histogenesis, we will a) compare/contrast gene expression profiles of SCCOHT with potential precursor cells to gain insight into SCCOHT's cellular origin, b) determine the effect of SMARCA4/A2 re-expression on genes involved in cell differentiation and c) determine the effects of SMARCA4/A2 inactivation on the differentiation and transformation of potential precursor cells of SCCOHT.

Immunohistochemical Analysis of SWI/SNF Subunits in SCCOHT and Other Gynecological Cancers—

Immunohistochemistry analysis has shown that inactivating mutations are associated with complete or partial loss of SMARCA4 protein in 59/63 (94%) of SCCOHT tumors. The loss of SMARCA4 protein is highly specific to SCCOHT. Our assessment of 485 primary ovarian epithelial, sex cord-stromal (including 8 jGCTs), and germ cell tumors showed only 2 tumors (0.4%), both clear cell carcinomas, with negative SMARCA4 staining. Other ovarian tumors in the differential diagnosis of SCCOHT—undifferentiated carcinomas, adult and juvenile granulosa cell tumor, and germ cell tumors-expressed SMARCA44 or were wild type for SMARCA443. No SMARCA4 mutation was identified in germ cell tumors including 29 yolk sac tumors (YSTs) and 14 immature teratomas. All granulosa cell tumors also expressed SMARCA2. To date, the absence of SMARCA4 protein serves as a sensitive and specific diagnostic marker for SCCOHT to distinguish it from several ovarian tumors with similar histology.

Expression of SMARCA4/A2 in Reproductive Age Ovaries—

To determine whether SMARCA2 absence in SCCOHT arises from silencing during tumor evolution or from lack of expression in the cell of origin, we examined the expression of SMARCA4/A2 by IHC. In reproductive age ovaries, SMARCA2 is expressed in all ovarian cells. With the exception of ovarian stroma, which was weak or negative, we also observed SMARCA4 expression in the same cells. Similar results were seen in pre-pubertal ovaries. We are currently analyzing SMARCA4/A2 in fetal ovaries. These results suggest that SCCOHT may originate from a double-positive cell that loses both SMARCA4/A2 during tumorigenesis although we cannot rule out rare SMARCA4-positive, SMARCA2-negative cells.

Depletion of SMARCA4/A2 by CRISPR/Cas9 Technology—

Figure 20:
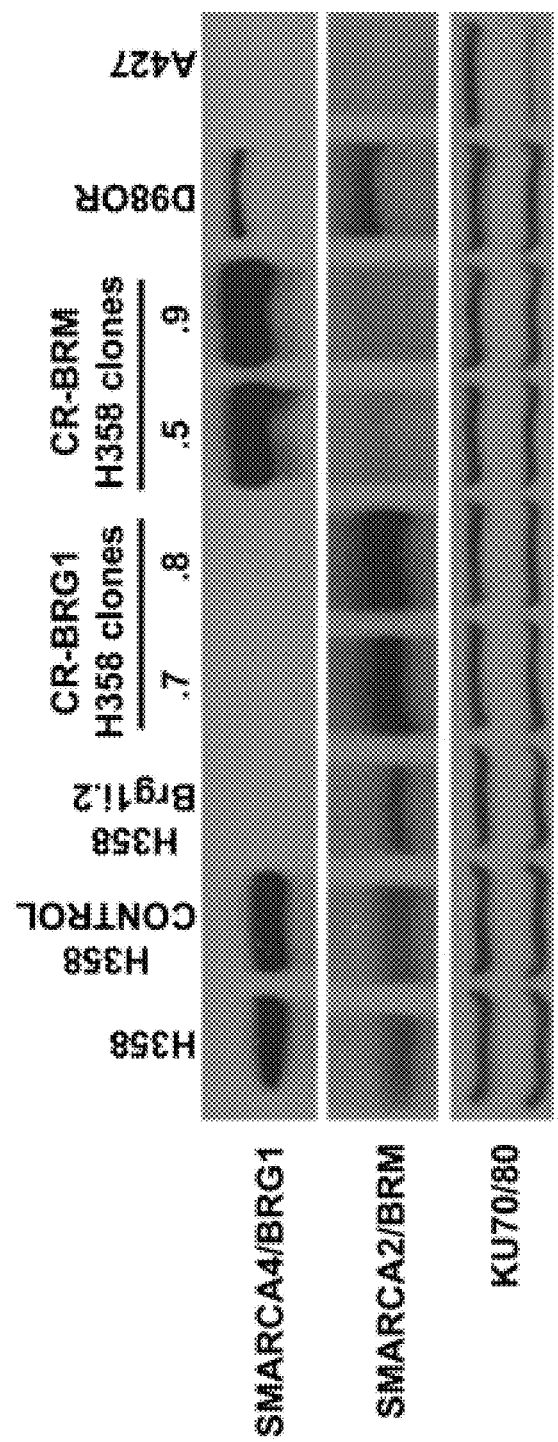
FIG. 20 depicts knock out of SMARCA4 or A2 in human NSCLC cells. SMARCA4 and SMARCA2 CRISPR guides were transfected with CAS9 into the H358 NSCLC cell line. SMARCA4 and SMARCA2 protein levels were determined by Western blotting. The H358, H358 CONTROL and a HeLa derivative, D980R served as positive controls while the H358Brg1i.2 and A427 NSCLC cell lines served as negative ones. Nuclear KU70/80 proteins served as loading controls.

To fully knock out SMARCA4/A2 expression in our proposed experiments, we will generate genetic null variants of these genes by CRISPR/cas9. We have successfully applied this approach to generate complete knockouts in the H358 NSCLC cell line (FIG. 20).

Research Design and Methods

Compare/Contrast SCCOHT Gene and Protein Expression to Potential SCCOHT Precursor Cells Sample Collection and Immunohistochemistry:

To establish the gene expression signatures for SCCOHT and each putative precursor, we will assemble a collection of archived local normal human ovary and tumor cases (~100 cases each). We currently have access to hundreds of normal human ovaries and immature teratomas (FFPE) and have banked 6 frozen immature teratomas and 34 SCCOHTs (5 frozen, 2 PDXs, 27 FFPE). We will collect additional samples through international repositories and locally. A gynecologic pathologist will confirm the diagnosis of each tumor by reviewing diagnostic reports and H&E staining slides. Tissue microarrays containing 100 normal ovaries and all SCCOHTs and immature teratomas will be constructed. IHC will be performed to determine the expression of SMARCA4 and SMARCA2 in addition to clinically-used granulosa cell/stromal cell differentiation markers (CALB2, WT1, CD10, INHA, FOXL2), the germ cell tumor markers (SALL4, POU5FI, NANOG, SOX2) and selected differentiation markers identified via gene expression analysis as described above.

Molecular Profiling of Related Tumors:

We will use expression profiling to gain insight into the putative cell of origin for SCCOHT. Due to the limited access to frozen samples, we will mainly use FFPE samples for gene expression profiling analysis. RNA will be extracted from immature regions of immature teratomas, microdissected granulosa cells from normal ovary and SCCOHTs using Qiagen RNeasy FFPE Kits. The quality of RNA samples will be monitored by Agilent Bioanalyzer analysis and realtime PCR analysis of RPL13A expression using Taqman assay46. The gene expression profiles of SCCOHT, granulosa cells and immature teratoma (20 samples of each group with high quality RNA) will be determined by Affymetrix gene expression array (GeneChip Human Gene 2.0 ST with SensationPlus FFPE Amplication and WT labeling kit). Expression of genes in SCCOHT, granulosa cells and immature teratoma will be compared by supervised and unsupervised methods including hierarchical and NMF clustering and examination of differentially expressed genes using SAM and/or LIMMA software packages. The genes that are uniquely expressed in each tumor type in addition to the genes encoding the IHC markers specific for sex-cord stromal versus germ cell tumors will be considered as a tumor-type specific gene signature. A condensed set of genes (~150 genes) will then be validated in a cohort of additional 40-50 FFPE samples of each putative precursor using the digital Nanostring nCounter system. Further refinement of our molecular signatures for each cell or tumor type will be undertaken after analysis of these additional cases.

Determine the Effect of SMARCA4/A2 Re-Expression on Genes Involved in Differentiation Gene expression profiles will be collected as described above for BIN67 and SCCOHT1 cells re-expressing SMARCA4/A2. Dysregulated genes will be compared to gene signatures of each putative precursor tumor type to reveal similarities suggestive of the SCCOHT cell of origin. The top 10 genes whose expression matches one of the molecular signatures will be validated by real-time RT-PCR and Western blots in cell lines and by IHC in tumor samples. The epigenetic modifications associated with these top deregulated genes will be analyzed and assessed for treatment potential for SCCOHT.

Determine the Effects of SMARCA4/A2 Inactivation on the Differentiation and Transformation of Potential Precursor Cells of SCCOHT—

In Vitro Characterization of Isogenic SMARCA4/A2 Cell Lines:

To test the hypothesis that SMARCA4 inactivation transforms candidate precursor cells into SCCOHT-like cells, we will deplete SMARCA4/A2 in NOY1 cells, a YST cell line, and immortalized primary human granulosa cell lines (we have established a series of these lines, such as SVOG3e) using CRISPR/cas9 technology as previously described (FIG. 20). We will then determine the phenotypic effects of their inactivation. Differentially expressed genes will be obtained using Affymetrix gene expression array which will be compared with the specific signatures to reveal similarities. We will also interrogate gene expression data upon inactivation of SMARCA4/A2 for evidence of pathway dysregulation, particularly pathways involved in differentiation and various aspects of transformation such as cell proliferation, invasion and apoptosis. We will evaluate the impact of SMARCA4/A2 loss on cell growth by monitoring doubling time using an Incucyte live cell monitor, and on cell cycle distribution by flow cytometry. Their effect on cell migration and invasion will be assessed using quantitative wound healing scratch assays and matrigel migration assays monitored in real-time with the Incucyte system.

In Vitro Characterization of an Inducible SMARCA4/A2 Silencing Embryonic Stem (ES) Cell Model:

As a complementary approach, we will generate an ES cell model with inducible SMARCA4/A2 silencing. Pluripotent ES cells have the potential to differentiate into all three germ cell layers. Induction of ES cells by various growth factors or transcriptional factors can drive their differentiation into primordial germ cell or granulosa cell lineages, thereby providing a model to test whether SMARCA4 inactivation can block cell differentiation and give rise to SCCOHT. Because absence of SMARCA4 is embryonic lethal at an early developmental stage in mice (E6.5), we will generate human H9 ES cell lines (genotype: XX) with inducible SMARCA4/A2 silencing using the pINDUCER-shRNA lentiviral system. To facilitate the isolation of primordial germ cells or granulosa cells, we will stably express the VASA:GFP (germ cell) and CYP19A1:GFP (granulosa cell) 51 reporters, respectively, into the inducible shSMARCA4/A2 ES cells. The pluripotency of isogenic shSMARCA4/A2 ES cells (−/+doxycycline) will be determined using the in vitro embryoid body formation assay and the in vivo teratoma assay. We will treat inducible shSMARCA4 ES cells with bone morphogenetic proteins (BMPs) to induce their differentiation into the primordial germ cell lineage in differentiation media and with a cocktail of growth factors to induce their differentiation into the granulosa cell lineage. The primordial germ and granulosa cells will be isolated using a FACS sorter. The status of germ cell or granulosa cell lineage will be verified by gene expression profiling using Affymetrix gene expression array and Western blot analysis of lineage specific gene expression. The inducible shSMARCA4/A2 primordial germ cells or granulosa cells will be cultured in the presence or absence of DOX for 1-10 weeks to monitor cell growth and morphology changes. Cells will be harvested at 1, 2, 4, 6, 8 and 10 weeks for expression analysis of SCCOHT-specific genes by real time RT-PCR and Western blot.

Orthotopic Models of SMARCA4/A2 Isogenic Cell Lines:

To evaluate whether SMARCA4/A2-inactivation in potential precursor cells of SCCOHT display phenotypic features of SCCOHTs in vivo, we will establish orthotopic mouse models by injecting parental and SMARCA4/A2-depleted NOY1 and immortalized granulosa cells into the ovarian bursae of IL2RKO2 mice ($5 \times 10^4$ cells/injection, 6 mice/group). Tumor formation will be monitored for 20 weeks. Similarly, the shSMARCA4/A2 inducible primordial germ cells or granulosa cells will be injected into the ovarian bursae of IL2RKO2 mice ($5 \times 10^4$ cells/injection, 6 mice/group) and mice will be fed with or without DOX for 20 weeks. Blood samples will be collected to determine serum calcium levels (Abcam calcium detection kit). Tumors will be processed for standard histopathology and evaluated independently by 2 gynecologic pathologists. Immunohistochemistry will be performed using antibodies against SMARCA4, SMARCA2, Ki-67 and other SCCOHT tumor markers detailed above to characterize the immunophenotypic features of lesions that develop upon SMARCA4/A2 depletion. RNA will be extracted from fresh frozen tumors for analysis of molecular signatures using Affymetrix gene expression array, which will be compared with the gene expression signatures of each tumor type as described above to reveal the similarity.

Expected Results and Interpretation.

Our proposed study will establish the gene expression signatures of each cell and tumor type to distinguish between jGCTs, immature teratomas and SCCOHTs with greater resolution than currently possible using IHC and will likely identify new diagnostic markers for validation. Re-expression of SMARCA4/A2 at physiological levels in BIN67 and SCCOHT1 is expected to induce the expression of a number of genes specific to SCCOHT's cell of origin (primary granulosa cells, primary germ cells, or tumors derived thereof). Our in vitro and in vivo studies with multiple cell line models will further reveal whether inactivation of SMARCA4 alone is sufficient to induce granulosa cell or germ cell de-differentiation, immortalization, or transformation. We expect that dual loss of SMARCA4 and SMARCA2 in primary granulosa or germ cells will cause loss of their cell lineage signatures and de-differentiate into SCCOHT-like cell lines. The accumulated epigenetic modifications, as a result of SMARCA4/A2 inactivation, will help interpret how SMARCA4/A2 inactivation rewires the differentiation program. Last, this aim will provide useful isogenic cell line models for understanding the epigenetic consequences of SMARCA4/A2 inactivation and for validation of synthetic lethal targets and drugs for treatment of SCCOHT.

Example 19. Identification and Validation of Targets for SCCOHT Treatment

SCCOHTs are aggressive and refractory to standard treatment including surgical debulking, high-dose chemotherapy and/or radiation. Chemotherapeutic Drug combinations including etoposide, platinum agents, and *vinca* alkaloids may improve survival, but prospective clinical trials are lacking. Patient outcomes are abysmal with a 65% recurrence rate and 2-year survival less than 35%. Study of SCCOHT's biology and pathogenesis has been limited and no clinical trials have been undertaken. Thus little is known about its therapeutic vulnerabilities. The biological studies proposed above will identify target genes for development as drug targets for SCCOHT. High-throughput RNAi screening coupled with validation of preliminary data will also drive discovery. This approach will speed identification of lead compounds for testing in preclinical animal models and in clinical trials and will more widely suggest therapeutic candidates for exploration in other cancers with SMARCA4 and SWI/SNF mutations. Further, although SCCOHT model systems are exceedingly rare, our unique collection of SCCOHT model cell lines—(BIN67, SCCOHT1, and the patient-derived xenografts (PDXs), SCCO-040 and SCCO-065) will enable the studies proposed here.

SCCOHT Sensitivity to Epigenetic Agents.

Stable diploid genomes and low mutation rates in SCCOHTs suggest that epigenetic changes drive oncogenic progression upon mutational inactivation of SMARCA4. Thus, as in MRTs, targeting epigenetic modifications may have therapeutic potential in SCCOHT. To evaluate the activity of a panel of epigenetic drugs in SCCOHT we performed high-throughput screening in the SMARCA4/A2 negative SCCOHT cell lines BIN67 and SCCOHT1. Effects of epigenetic modifiers from all main classes of epigenetic agents—modifiers of acetylated histones as well as inhibitors of DNA methylation, histone methyltransferases and HDACs—are shown in FIG. 21. BIN67 and SCCOHT1 cells are not sensitive to many of these agents. Notably, unlike MRTs21 SCCOHT cells are not sensitive to EZH2 inhibition despite its overexpression in both cell lines. BIN67 and SCCOHT1 were most sensitive to Rombidepsin, a potent FDA-approved class 1 HDAC inhibitor with affinity for HDACs 1 and 2. We have found HDAC2 to be overexpressed in most SCCOHTs including these cell lines. These data warrant further validation of the activity of Romidepsin in in vivo models of SCCOHT and further investigation of its mechanism of action in SCCOHT.

High-Throughput Screening (HTS) Assay Optimization.

The BIN67 cell line has been characterized for optimal growth conditions, doubling time, cell seeding density, FBS concentration, siRNA transfection conditions (transfection reagent and lipid-to-siRNA ratio to achieve transfection efficiency of 95% or higher), and DMSO tolerance. We have also banked large numbers of BIN67 cells from the same passage to facilitate future screening. Furthermore, we have performed pilot compound and RNAi screens on this cell line.

Pilot Compound Screen.

In BIN67 we screened the LOPAC and Prestwick chemical libraries, diverse libraries of small molecules with good bioavailability and toxicity profiles. These libraries contain 2,400 drugs with subsets of FDA-approved drugs and pharmacologically active compounds. We completed 2 runs in BIN67 with duplicates at concentrations of 5 µM and 10 µM and measured cell viability at 72 hours post-treatment with CellTiter Glo (Promega). The high quality screen was exceeded NIH standards with covariance <5% and Z'-factor 0.83-0.91. After filtering shared hits from a counterscreen in HepG2 (a cell line routinely used to filter out broadly cytotoxic hits due to parenchymal morphology and expression of drug-metabolizing enzymes), BIN67 displayed hypersensitivity to 68 compounds representing a hit rate of 3%. Notable classes of lead compounds enriched in these hits included 9 cardiac glycosides, 6 tubulin polymerization inhibitors, 2 topoisomerase II inhibitors, and 2 Src/FGFR family kinase inhibitors. In particular, the tubulin inhibitors vincristine and etoposide are currently used clinically for SCCOHT patients. This serves as a positive confirmation for the robustness and reliability of our screen.

Pilot HT-RNAi Screen.

As a first step towards assessing druggable and synthetic lethal targets in SCCOHT, we designed an HT-RNAi screen consisting of a library of kinome-targeted siRNAs and a custom library targeting 80 genes and putative drug targets—SWI/SNF genes, ATPases of the DEAD/H helicase family (in addition to SMARCA4 and SMARCA2), and other candidate synthetic lethal targets derived from the literature or gene expression data of SCCOHT tumors compared to normal ovaries. We performed the screen using optimized conditions in BIN67 with a cell viability endpoint (CellTiter Glo). The screen was deemed high quality with covariance <7.3%, transfection efficiency of >99% and Z'-factor >0.77. Multivariate hit selection methodology was employed. After filtering for common essential genes from previous screens to reduce the off-target effects, hits were identified with at least 2 siRNAs per target, 40% or less viability remaining after siRNA knockdown, and Redundant SiRNA Activity (RSA) 70 score of ≥0.2. Fifty-six gene targets were prioritized including 2 FGFRs (clinical drug targets), 3 glycolytic enzymes, 3 enzymes involved in cytidine generation, 3 chromosome condensation and spindle formation genes, the Src family kinases FYN and FAK, and 3 kinases in the JNK pathway. The findings of Src family kinase and spindle assembly genes intersect with hits identified in the preliminary compound screen and represent targets for further study.

Rapid Development of FGFR and MERTK Inhibitors Based on HTS.

Figure 22A:
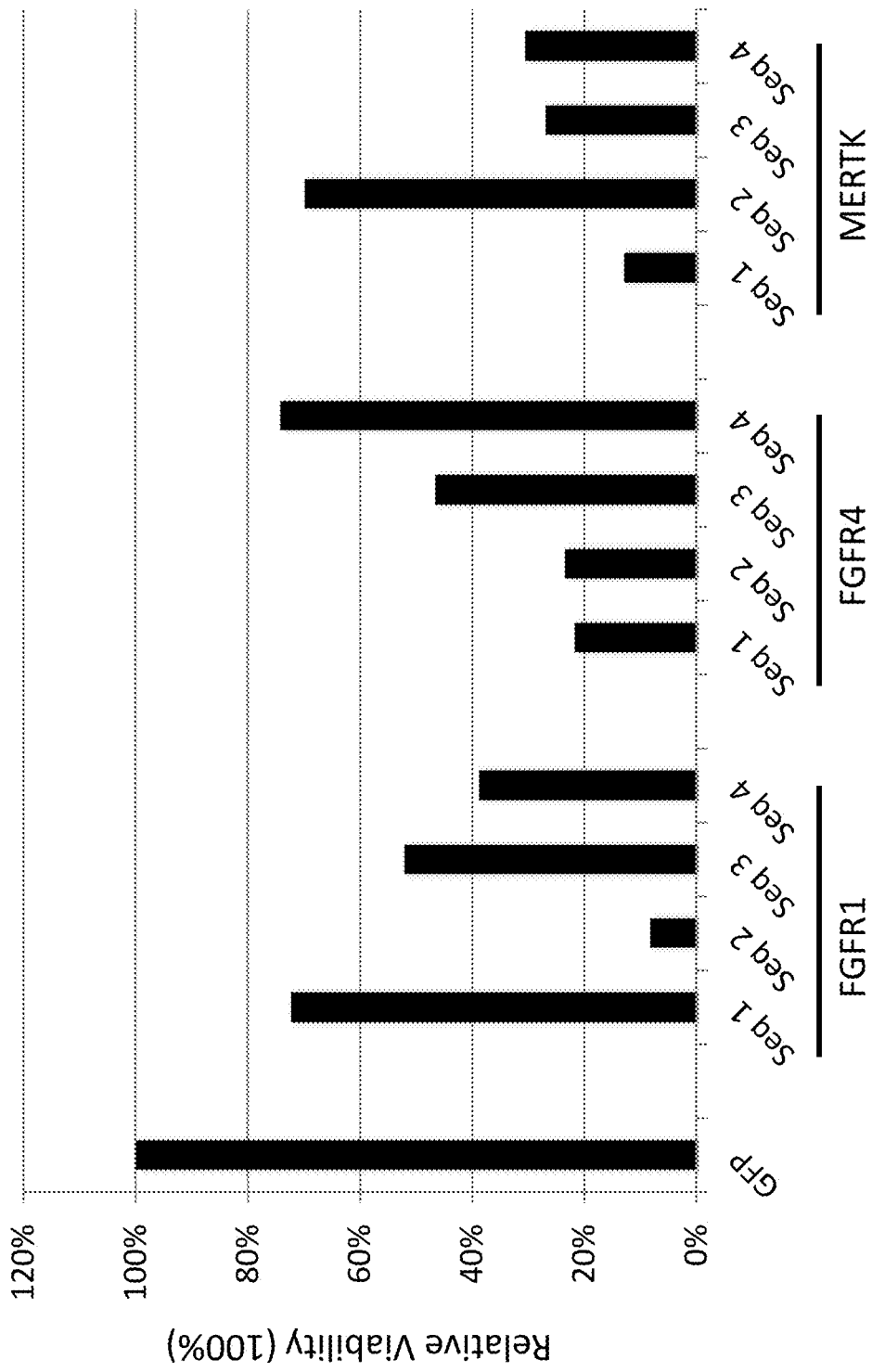
FIGS. 22A and 22B show the characterization of FGFR and MERTK inhibition in BIN67 cell line.
Figure 22B:
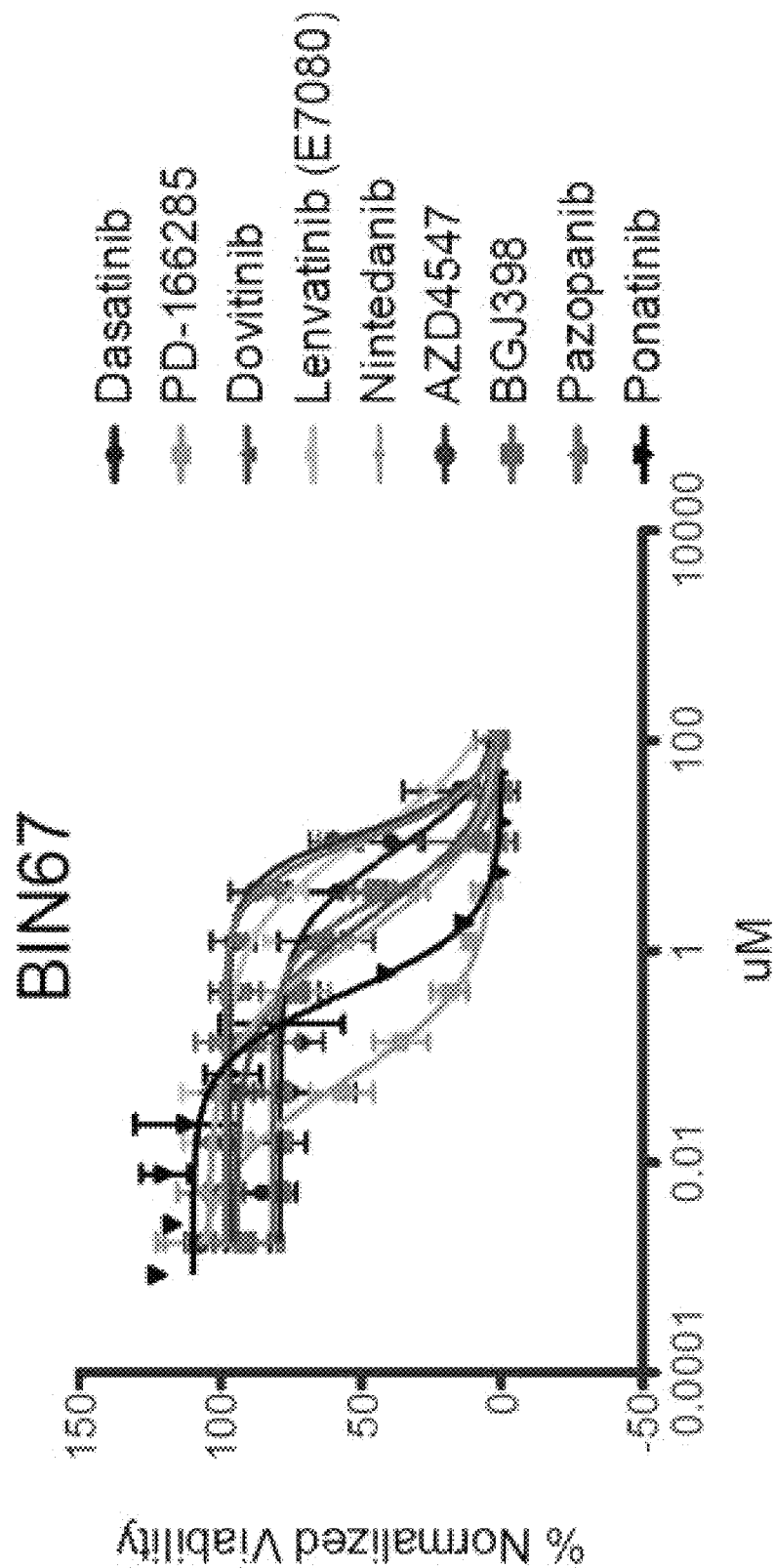

Our finding of FGFRs as synthetic lethal targets, in both our HT-RNAi and compound pilot screens, in SCCOHT is novel. Three unique siRNA sequences for both FGFR1 and FGFR4 demonstrated lethality in BIN67 cells, suggesting their dependency on loss of SMARCA4 (FIG. 22A). As we also identified FGFR inhibitors in our pilot compound screen, we further tested 8 FGFR inhibitors in vitro. Specifically, ponatinib, an FDA-approved oral drug for leukemia subtypes was potent in both SCCOHT cell lines with IC50s from 5-333 nM (FIG. 22B). Similarly, 3 out of 4 unique siRNA sequences against MERTK, a member of the TAM family of receptor tyrosine kinases that is implicated in the development and metastasis of several human cancers resulted in loss of SCCOHT cell viability (FIG. 22A). These data show our ability to rapidly translate synthetic lethal RNAi hits to preclinical compound testing.

Xenograft and PDX Model Preparation.

We have established 2 PDX models of SCCOHT with SMARCA4/A2 loss (SCCO-040 and SCCO-065 from 2 patients diagnosed at 19 and 20 years of age) in immunodeficient NOG mice by subcutaneous injection of $4 \times 10^5$-$3 \times 10^6$ viable tumor cells. Established models were confirmed by histologic analysis and have been passaged 4 times each with excellent growth profiles. For each model, we used Agilent gene expression microarray analysis and SMARCA4 targeted sequencing to confirm presence of SMARCA4 mutations and expression profiles resembling those of other SCCOHTs. FFPE tumor sections from each model were assessed by IHC to confirm the absence of SMARCA4 and SMARCA2 protein. We are currently deriving cell lines from these tumors alongside continuous passaging in nude mice.

Research Design and Methods

Identify Synthetic Lethal Partners for SMARCA4/A2 Loss to Serve as Therapeutic Targets in SCCOHT Druggable Genome HT-RNAi Screen:

To expand upon preliminary data, we will pursue HT-RNAi-based gene silencing to knock down expression of ~7,000 druggable genes in BIN67 cells. Quality control, hit selection, filtering and ranking will be performed as outlined in the preliminary results. From this stage, the 150 top synthetic lethal hits from the primary screen will be confirmed in two SCCOHT cell lines in addition to the 2 PDX cell lines. These hits will be further validated and integrated.

Validate Candidate Biological and Therapeutic Targets in SCCOHT In Vitro and In Vivo Development of Targets from Preliminary Screens:

Targets suggested by preliminary drug and siRNA screens, i.e. HDACs, FGFRs, and MERTK, will first be validated in vitro by Western blotting or qPCR after knockdown or inhibition in the SCCOHT cell lines. As the endpoint assays used for our initial screens function as surrogate markers of viability but do not provide mechanistic data, we will also use high-content automated microscopy to acquire multi-parametric data to ascertain differences in cell cycle, cell death, and apoptosis. We will then test validated therapeutic agents in SCCO-040 and SCCO-065 PDXs in mice. The agents derived from the experiments described above will be ranked for selection and in vivo evaluation according to cytotoxicity and existing clinical profiles that facilitate rapid clinical translation with priority given to compounds whose targets have been identified and validated in synthetic lethal screens. Treatments and tumor measurements will be performed using standard protocols for tumor implantation, mouse monitoring, and tumor measurement. Mice will be pair-matched into treatment groups to reduce variability of tumor sizes. To achieve reasonable statistical power we anticipate requiring 10 mice per agent and tumor line. Tumors will be established by subcutaneous injection of $4 \times 10^5$-$3 \times 10^6$ cells mixed with Matrigel into the right flank and treatment will begin once they have reached 150-200 mm$^3$ with the study endpoint being mean control tumor volume$\geq$700 mm$^3$. Median and average tumor measurements will be plotted over time with 95% confidence intervals for each regimen. A p-value of $\leq 0.05$ will be used to identify statistically significant associations except where adjustments for multiple comparisons are noted. We anticipate evaluating 2-4 agents based on preliminary data in these models in the first year.

Development of Targets from Druggable Genome RNAi Screen:

Targets from the expanded RNAi screen will be validated in 4 SCCOHT cell lines (BIN67, SCCOHT1, SCCO-040, and SCCO-065), where the top 20 genes that demonstrate synthetic lethality in two or more tested cell lines will be prioritized. We will further verify knockdown of these 20 candidate genes as described above. We will also identify and purchase the commercially available inhibitors of top-ranked druggable targets (3-5 compounds per target). These compounds will be evaluated with 20-point DDR curves in the 4 SCCOHT cell lines to confirm sensitivities at therapeutically-relevant doses. These targets can also be evaluated in new models and will further drive mechanistic experiments. Validated agents will be prioritized for in vivo evaluation according to the same criteria as described above.

Development of Targets from Biological Studies:

Genes and gene products implicated as essential for SCCOHT tumorigenesis by ChIP-seq, MNase-seq, and SWI/SNF pulldown analyses in engineered cell lines in addition to IHC, methylation, and expression profiling in precursor models will be additionally validated in vitro and in vivo according to the rigorous methods described herein.

Expected Results and Interpretation.

These experiments have an overarching goal: empirical identification of agents to present to clinical partners to initiate trials to benefit women with SCCOHT. Prioritization of the targets will be achieved through the tiered validation approach and by evaluating both discovery- and hypothesis-derived targets. Mechanistic experiments will suggest drug targets and sensitivities (such as genes or proteins dysregulated in model cell lines) that will be validated in vitro and in vivo here, and synthetic lethal dependencies and drug sensitivities identified by broad HTS in an unbiased manner will provide feedback to guide mechanistic studies.

Unless defined otherwise, all technical and scientific terms herein have the same meaning as commonly understood by one of ordinary skill in the art to which this invention belongs. Although any methods and materials, similar or equivalent to those described herein, can be used in the practice or testing of the present invention, the preferred methods and materials are described herein. All publications, patents, and patent publications cited are incorporated by reference herein in their entirety for all purposes.

The publications discussed herein are provided solely for their disclosure prior to the filing date of the present application. Nothing herein is to be construed as an admission that the present invention is not entitled to antedate such publication by virtue of prior invention.

It is understood that the disclosed invention is not limited to the particular methodology, protocols and materials described as these can vary. It is also understood that the terminology used herein is for the purposes of describing particular embodiments only and is not intended to limit the scope of the present invention which will be limited only by the appended claims.

Those skilled in the art will recognize, or be able to ascertain using no more than routine experimentation, many equivalents to the specific embodiments of the invention described herein. Such equivalents are intended to be encompassed by the following claims.

REFERENCES

Abdueva, D., Wing, M., Schaub, B., Triche, T. & Davicioni, E. Quantitative expression profiling in formalin-fixed paraffin-embedded samples by affymetrix microarrays. J Mol Diagn 12, 409-17 (2010).

Abeler V, Kjorstad K E, Nesland J M: Small cell carcinoma of the ovary. A report of six cases. Int J Gynecol Pathol 7:315-29, 1988 Amanda L. Willis N L T, Julie M. Chatigny, Nichole Charlton, Hong Vu, Sharron A. N.

Brown, Michael A. Black, Wendy S. McDonough, Shannon P. Fortin, Joshua R. Niska, Jeffrey A. Winkles and Heather E. Cunliffe: The Fibroblast Growth Factor-Inducible 14

Receptor is Highly Expressed in HER2-Positive Breast Tumors and Regulates Breast Cancer Cell Invasive Capacity. Molecular Cancer Research 6:725-734, 2008

Atalay F, Taskiran C, Taner M Z, et al: Detection of human papillomavirus DNA and genotyping in patients with epithelial ovarian carcinoma. J Obstet Gynaecol Res 33:823-8, 2007

Bartlett, C., Orvis, T. J., Rosson, G. S. & Weissman, B. E. BRG1 mutations found in human cancer cell lines inactivate Rb-mediated cell-cycle arrest. Journal of cellular physiology 226, 1989-97 (2011).

Berdasco, M. & Esteller, M. Genetic syndromes caused by mutations in epigenetic genes. Hum Genet 132, 359-83 (2013).

Beroukhim R, Getz G, Nghiemphu L, et al: Assessing the significance of chromosomal aberrations in cancer: methodology and application to glioma. Proc Natl Acad Sci USA 104:20007-12, 2007

Bullard, J. H., Purdom, E., Hansen, K. D. & Dudoit, S. Evaluation of statistical methods for normalization and differential expression in mRNA-Seq experiments. BMC Bioinformatics 11, 94 (2010).

Bultman, S. et al. A Brg1 null mutation in the mouse reveals functional differences among mammalian SWI/SNF complexes. Mol Cell 6, 1287-95. (2000).

Burton P B, Moniz C, Quirke P, et al: Parathyroid hormone-related peptide: expression in fetal and neonatal development. J Pathol 167:291-6, 1992

Carlson J W, Nucci M R, Brodsky J, et al: Biomarker-assisted diagnosis of ovarian, cervical and pulmonary small cell carcinomas: the role of TTF-1, WT-1 and HPV analysis. Histopathology 51:305-12, 2007

Cerami, E. et al. Cancer discovery 2, 401-404 (2012).

Chen, K. et al. DANPOS: dynamic analysis of nucleosome position and occupancy by sequencing. Genome Research 23, 341-351 (2013).

Cheng Z, Yin H, Du J, et al: Bilateral breast metastasis from small-cell carcinoma of the ovary. Journal of clinical oncology: official journal of the American Society of Clinical Oncology 26:5129-30, 2008

Clark, A. T. et al. Spontaneous differentiation of germ cells from human embryonic stem cells in vitro. Human molecular genetics 13, 727-739 (2004).

Clement, P. B. Selected miscellaneous ovarian lesions: small cell carcinomas, mesothelial lesions, mesenchymal and mixed neoplasms, and non-neoplastic lesions. Modern pathology 18, S113-S129 (2005).

Craig D W, O'Shaughnessy J A, Kiefer J A, et al: Genome and transcriptome sequencing in prospective metastatic triple-negative breast cancer uncovers therapeutic vulnerabilities. Mol Cancer Ther 12:104-16, 2013

Daniel D. Von Hoff J J S J, Peter Rosen, David M. Loesch, Mitesh J. Borad, Stephen Anthony, Gayle Kameson, Susan Brown, Nina Cantaflo, Donald A. Richards, Tom R. Fitch, Ernesto Wasserman, Cristian Fernandez, David Mallery and Robert Penny: Pilot Study Using Molecular Profiling of Patients' Tumors to Find Potential Targets and Select Treatments for Their Refractory Cancers. Journal of Clinical Oncology 28:4877-83, 2010 de Roda Husman A M, Walboomers J M, van den Brule A J, et al: The use of general primers GP5 and GP6 elongated at their 3' ends with adjacent highly conserved sequences improves human papillomavirus detection by PCR. J Gen Virol 76 (Pt 4): 1057-62, 1995

Deodhar, K. K., Suryawanshi, P., Shah, M., Rekhi, B. & Chinoy, R. F. Immature teratoma of the ovary: a clinico-pathological study of 28 cases. Indian J Pathol Microbiol 54, 730-5 (2011).

Dhruv, H. et al. Structural basis and targeting of the interaction between fibroblast growth factor-inducible 14 and tumor necrosis factor-like weak inducer of apoptosis. Journal of Biological Chemistry 288, 32261-32276 (2013).

Di Cesare, S. et al. Expression profiling of formalin-fixed paraffin embedded primary human uveal melanomas using DASL matrices. J Cancer Res Clin Oncol 136, 577-86 (2010).

Distelmaier F, Calaminus G, Harms D, et al: Ovarian small cell carcinoma of the hypercalcemic type in children and adolescents: a prognostically unfavorable but curable disease. Cancer 107:2298-306, 2006

Eaton, K. W., Tooke, L. S., Wainwright, L. M., Judkins, A. R. & Biegel, J. A. Pediatric blood & cancer 56, 7-15 (2011).

Edson, M. A. et al. Granulosa cell-expressed BMPR1A and BMPR1B have unique functions in regulating fertility but act redundantly to suppress ovarian tumor development. Molecular Endocrinology 24, 1251-1266 (2010).

Eichhorn J H, Bell D A, Young R H, et al: DNA content and proliferative activity in ovarian small cell carcinomas of the hypercalcemic type. Implications for diagnosis, prognosis, and histogenesis. Am J Clin Pathol 98:579-86, 1992

Eisen M B, Spellman P T, Brown P O, et al: Cluster analysis and display of genome-wide expression patterns. Proc Natl Acad Sci USA 95:14863-8, 1998

Elizabeth K. Senekjian P A W, Aleksander Talerman, Arthur L. Herbst: Vinblastine, Cisplatin, Cyclophosphamide, Bleomycin, Doxorubicin, and Etoposide in the Treatment of Small Cell Carcinoma of the Ovary. Cancer 64:1183-1187, 1989

Ercan, S., Lubling, Y., Segal, E. & Lieb, J. D. High nucleosome occupancy is encoded at X-linked gene promoters in C. elegans. Genome Res 21, 237-44 (2011).

Estel R, Hackethal A, Kalder M, et al: Small cell carcinoma of the ovary of the hypercalcaemic type: an analysis of clinical and prognostic aspects of a rare disease on the basis of cases published in the literature. Archives of gynecology and obstetrics 284:1277-82, 2011

Estel, R., Hackethal, A., Kalder, M. & Munstedt, K. Small cell carcinoma of the ovary of the hypercalcaemic type: an analysis of clinical and prognostic aspects of a rare disease on the basis of cases published in the literature. Archives of gynecology and obstetrics 284, 1277-82 (2011).

Evans M F, Adamson C S, Simmons-Arnold L, et al: Touchdown General Primer (GP5+/GP6+) PCR and optimized sample DNA concentration support the sensitive detection of human papillomavirus. BMC Clin Pathol 5:10, 2005

F. A. Tavassoeli P D E: World Health Organization classification of Tumours. Pathology and genetics of tumours of the breast and female genital organs. Lyon, IARC Press, 2003

Florell S R, Bruggers C S, Matlak M, et al: Ovarian small cell carcinoma of the hypercalcemic type in a 14 month old: the youngest reported case. Med Pediatr Oncol 32:304-7, 1999

Forster C, Ostertag H, Schmitt J, et al: Small cell carcinoma of the ovary, hypercalcemic type. A case report with immunohistochemical, ultrastructural and cytophotometric analysis and review of the literature. Gen Diagn Pathol 142:365-70, 1997

Furumai, R. et al. FK228 (depsipeptide) as a natural prodrug that inhibits class I histone deacetylases. Cancer Res 62, 4916-21 (2002).

G. Richard Dickersin I W K, Robert E. Scully: Small Cell Carcinoma of the OVary with Hypercalcemia. A Report of Eleven Cases. Cancer 49:188-197, 1982

Gamwell L F, Gambaro K, Merziotis M, et al: Small cell ovarian carcinoma: genomic stability and responsiveness to therapeutics. Orphanet journal of rare diseases 8:33, 2013

Gao, J. et al. Science signaling 6, p 11 (2013).

Giselle L. Saulnier Sholler F L, Shamlal Mangray, Sandra J. Meech: Advanced Small Cell Carcinoma of the Ovary in a Pediatric Patient with Long-Term Survival and Review of the Literature. Journal of Pediatric Hematology/Oncology 27:169-172, 2005

Graham, C. et al. Evaluation of the antitumor efficacy, pharmacokinetics, and pharmacodynamics of the histone deacetylase inhibitor depsipeptide in childhood cancer models in vivo. Clin Cancer Res 12, 223-34 (2006).

Hargreaves, D. C. & Crabtree, G. R. ATP-dependent chromatin remodeling: genetics, genomics and mechanisms. Cell Res 21, 396-420 (2011).

Harrison M L, Hoskins P, du Bois A, et al: Small cell of the ovary, hypercalcemic type—analysis of combined experience and recommendation for management. A GCIG study. Gynecologic oncology 100:233-8, 2006 Hasselblatt, M. et al. Nonsense mutation and inactivation of SMARCA4 (BRG1) in an atypical teratoid/rhabdoid tumor showing retained SMARCB1 (INI1) expression. The American Journal of Surgical Pathology 35, 933-935 (2011).

Hauptmann S. S H, Bilkenroth U.: Small cell carcinma of the ovary of the hypercalcemic type: A highly aggressive neoplasm without CGH aberrations., US and Canadian Academy of Pathology 2006 Annual Meeting. Atlanta, Georgia, 2006

Heinrich Walt R H, Daniel Fink, Diana Dobler-GIrdziunaite, Thomas Stallmach, Max A. Spycher, Fritz Maly, Urs Haller, Nicole Bürki: Hypercalcemic-type of Small Cell Carcinoma of the Ovary: Characterization of a New Tumor Line. Anticancer Research 21:3253-3260, 2001

Henderson-Smith, A. et al. SMG1 identified as a regulator of Parkinson's disease-associated alpha-synuclein through siRNA screening. PLoS One 8, e77711 (2013).

Hoffman, G. R. et al. Functional epigenetics approach identifies BRM/SMARCA2 as a critical synthetic lethal target in BRG1-deficient cancers. Proceedings of the National Academy of Sciences 111, 3128-3133 (2014).

Holley T, Lenkiewicz E, Evers L, et al: Deep clonal profiling of formalin fixed paraffin embedded clinical samples. PLoS ONE 7:e50586, 2012

Hornung R, Fink D, Dobler-Girdziunaite D, et al: Photodynamic therapy for the hypercalcemic type of the small cell carcinoma of the ovary in a mouse xenograft model. Gynecologic oncology 75:447-52, 1999

Jacobson, T. A., Lundahl, J., Mellstedt, H. & Moshfegh, A. Gene expression analysis using long-term preserved formalin-fixed and paraffin-embedded tissue of non-small cell lung cancer. Int J Oncol 38, 1075-81 (2011).

Jamin, S. P., Arango, N. A., Mishina, Y., Hanks, M. C. & Behringer, R. R. Requirement of Bmpr1a for Müllerian duct regression during male sexual development. Nature genetics 32, 408-410 (2002).

Jelinic, P. et al. Recurrent SMARCA4 mutations in small cell carcinoma of the ovary. Nat Genet 46, 424-6 (2014).

Kadoch, C. et al. Proteomic and bioinformatic analysis of mammalian SWI/SNF complexes identifies extensive roles in human malignancy. Nature genetics 45, 592-601 (2013).

Katherine S. Upchurch L M P, Robert E. Scully, Stephen M. Krane: Differential cyclic AMP responses to calcitonin among human ovarian carcinoma cell lines: A calcitonin responsive line derived from a rare tumor type. Journal of Bone and Mineral Research 1:299-304, 1986

Kathryn Pennington T W, Ming Lee, Christopher Pennil, Maria Harrell, Kathy Agnew, Mara Rendi, Rochelle Garcia, Mary-Claire King, Elizabeth Swisher.: Homologous recombination defects are common in non-serous ovarian, fallopian tube, and peritoneal carcinomas. Presented at the Poster presented at: 2013 Society of Gynecologic Oncology Annual Meetin on Women's Cancer, Los Angeles, CA, Mar. 9-12, 2013, 2012

Kee, K., Angeles, V. T., Flores, M., Nguyen, H. N. & Reijo Pera, R. A. Human DAZL, DAZ and BOULE genes modulate primordial germ-cell and haploid gamete formation. Nature 462, 222-5 (2009).

Kiefer, J., Yin, H. H., Que, Q. Q. & Mousses, S. High-throughput siRNA screening as a method of perturbation of biological systems and identification of targeted pathways coupled with compound screening. in Protein Networks and Pathway Analysis 275-287 (Springer, 2009).

Knutson, S. K. et al. Durable tumor regression in genetically altered malignant rhabdoid tumors by inhibition of methyltransferase EZH2. Proceedings of the National Academy of Sciences 110, 7922-7927 (2013).

König, R. et al. A probability-based approach for the analysis of large-scale RNAi screens. Nature methods 4, 847-849 (2007).

Kononen J, BubendorfL, Kallioniemi A, et al: Tissue microarrays for high-throughput molecular profiling of tumor specimens. Nature medicine 4:844-7, 1998

Krishnansu Tewari C B, Fabio Capuccini, Cynthia Macri, Lowell W. Rogers, Michael L. Bernman: Advanced-Stage Small Cell Carcinoma of the Ovary in Pregnancy: Long-Term Survival after Surgical Debulking and Multiagent Chemotherapy. Gynecologic oncology 66:531-534, 1997

Kupryjanczyk, J. et al. Ovarian small cell carcinoma of hypercalcemic type—evidence of germline origin and SMARCA4 gene inactivation. a pilot study. Pol J Pathol 64, 238-46 (2013).

Lamovec J, Bracko M, Cerar O: Familial occurrence of small-cell carcinoma of the ovary. Arch Pathol Lab Med 119:523-7, 1995

Lan, C. W., Chen, M. J., Jan, P. S., Chen, H. F. & Ho, H. N. Differentiation of human embryonic stem cells into functional ovarian granulosa-like cells. J Clin Endocrinol Metab 98, 3713-23 (2013).

Langmead, B., Trapnell, C., Pop, M. & Salzberg, S. L. Ultrafast and memory-efficient alignment of short DNA sequences to the human genome. Genome Biology 10, R25 (2009).

Lauren J, Airaksinen M S, Saarma M, et al: A novel gene family encoding leucine-rich repeat transmembrane proteins differentially expressed in the nervous system. Genomics 81:411-21, 2003

Lee, R. S. et al. A remarkably simple genome underlies highly malignant pediatric rhabdoid cancers. The Journal of clinical investigation 122, 2983-2988 (2012).

Lei Chen T A D, Abida Haque: Small Cell Carcinoma of the Ovary with Hypercalcemia and Ectopic Parathyroid Hormone Production. Archives of Pathology and Laboratory Medicine 129:531-533, 2005

Li, B. & Dewey, C. RSEM: accurate transcript quantification from RNA-Seq data with or without a reference genome. BMC bioinformatics (2011).

Li, H. et al. The Sequence Alignment/Map format and SAMtools. Bioinformatics (Oxford, England) 25, 2078-2079 (2009).

Linger, R. M., Keating, A. K., Earp, H. S. & Graham, D. K. Taking aim at Mer and Axl receptor tyrosine kinases as novel therapeutic targets in solid tumors. Expert Opin Ther Targets 14, 1073-90 (2010).

M. Longy C T, P. Mage, J. Chauvergne, M. Trojani: Familial cluster of ovarian small cell carcinoma: a new mendelian entity? Journal of Medical Genetics 33:333-335, 1996

Malisic E, Jankovic R, Jakovljevic K, et al: TP53 gene status and human papilloma virus infection in response to platinum plus taxane-based chemotherapy of epithelial ovarian carcinomas. J BUON 16:701-7, 2011

Martinez-Borges A R, Petty J K, Hurt G, et al: Familial small cell carcinoma of the ovary. Pediatric blood & cancer 53:1334-6, 2009

Matias-Guiu X, Prat J, Young R H, et al: Human parathyroid hormone-related protein in ovarian small cell carcinoma. An immunohistochemical study. Cancer 73:1878-81, 1994

McCluggage W G, Oliva E, Connolly L E, et al: An Immunohistochemical Analysis of Ovarian Small Cell Carcinoma of Hypercalcemic Type. International Journal of Gynecological Pathology 23:330-336, 2004

McCormick T C, Muffly T, Lu G, et al: Aggressive small cell carcinoma of the ovary, hypercalcemic type with hypercalcemia in pregnancy, treated with conservative surgery and chemotherapy. International journal of gynecological cancer: official journal of the International Gynecological Cancer Society 19:1339-41, 2009

McDonald J M, Karabakhtsian R G, Pierce H H, et al: Small cell carcinoma of the ovary of hypercalcemic type: a case report. Journal of pediatric surgery 47:588-92, 2012

Meerbrey, K. L. et al. The pINDUCER lentiviral toolkit for inducible RNA interference in vitro and in vivo. Proceedings of the National Academy of Sciences of the United States of America 108, 3665-70 (2011).

Middlebrook, B. S., Eldin, K., Li, X., Shivasankaran, S. & Pangas, S. A. Smad1-Smad5 ovarian conditional knockout mice develop a disease profile similar to the juvenile form of human granulosa cell tumors. Endocrinology 150, 5208-5217 (2009).

Mootha V K, Lindgren C M, Eriksson K F, et al: PGC-1 alpha-responsive genes involved in oxidative phosphorylation are coordinately downregulated in human diabetes. Nat Genet 34:267-73, 2003

Navone N M, Troncoso P, Pisters L L, et al: p53 protein accumulation and gene mutation in the progression of human prostate carcinoma. J Natl Cancer Inst 85:1657-69, 1993

Newbold, A. et al. Characterisation of the novel apoptotic and therapeutic activities of the histone deacetylase inhibitor romidepsin. Mol Cancer Ther 7, 1066-79 (2008).

Niimi S, Kiyokawa T, Takakura S, et al: Recurrent small cell carcinoma of the ovary treated with docetaxel: A case report. International journal of gynecological cancer: official journal of the International Gynecological Cancer Society 16:1944-6, 2006

Nussbaum S R, Gaz R D, Arnold A: Hypercalcemia and ectopic secretion of parathyroid hormone by an ovarian carcinoma with rearrangement of the gene for parathyroid hormone. The New England journal of medicine 323: 1324-8, 1990

Ohi S, Niimi S, Okada N, et al: Establishment and characterization of a human ovarian small cell carcinoma, hypercalcemic type, cell line (OS-1) secreting PTH, PthrP and ACTH-special reference to the susceptibility of anticancer drugs. Human cell 17:203-9, 2004

Oike, T. et al. A synthetic lethality-based strategy to treat cancers harboring a genetic deficiency in the chromatin remodeling factor BRG1. Cancer research 73, 5508-5518 (2013).

Orvis, T., Hepperla, A., Walter, V., Song, S., Simon, J., Parker, J., Wilkerson, M. D., Desai, N., Major, M. B., Hayes, D. N., Davis, I. J. and Weissman, B. Inactivation of the SWI/SNF complex ATPase BRG1/SMARCA4 leads to gene silencing during non-small cell lung cancer development. Cancer Research Published OnlineFirst Aug. 12, 2014; doi:10.1158/0008-5472.CAN-14-0061 (2014).

Pautier P, Ribrag V, Duvillard P, et al: Results of a prospective dose-intensive regimen in 27 patients with small cell carcinoma of the ovary of the hypercalcemic type. Annals of oncology: official journal of the European Society for Medical Oncology/ESMO 18:1985-9, 2007

Pressey J G, Kelly D R, Hawthorne H T: Successful Treatment of Preadolescents With Small Cell Carcinoma of the Ovary Hypercalcemic Type. Journal of pediatric hematology/oncology, 2013

Pressey J G: The treatment of small cell carcinoma of the ovary hypercalcemic type. Oncology Reviews 5:61-66, 2010

Prokhorova, T. A. et al. Teratoma formation by human embryonic stem cells is site dependent and enhanced by the presence of Matrigel. Stem cells and development 18, 47-54 (2009).

Ramos, P. et al. Small cell carcinoma of the ovary, hypercalcemic type, displays frequent inactivating germline and somatic mutations in SMARCA4. Nat Genet 46, 427-9 (2014).

Reid B J, Blount P L, Rabinovitch P S: Biomarkers in Barrett's esophagus. Gastrointest Endosc Clin N Am 13:369-97, 2003

Reisman, D. N., Sciarrotta, J., Bouldin, T. W., Weissman, B. E. & Funkhouser, W. K. The expression of the SWI/SNF ATPase subunits BRG1 and BRM in normal human tissues. Applied Immunohistochemistry & Molecular Morphology 13, 66-74 (2005).

Reisman, D. N., Sciarrotta, J., Bouldin, T. W., Weissman, B. E. & Funkhouser, W. K. The expression of the SWI/SNF ATPase subunits BRG1 and BRM in normal human tissues. Appl Immunohistochem Mol Morphol 13, 66-74 (2005).

Reisman, D. N., Sciarrotta, J., Wang, W., Funkhouser, W. K. & Weissman, B. E. Loss of BRG1/BRM in human lung cancer cell lines and primary lung cancers: correlation with poor prognosis. Cancer Res 63, 560-6 (2003).

Robert H. Young E O, Robert E. Scully: Small Cell Carcinoma of the Ovary, Hypercalcemic Type. The American Journal of Surgical Pathology 18:1102-1116, 1994

Roberts, C. & Biegel, J. A. The role of SMARCB1/INI1 in development of rhabdoid tumor. Cancer Biol Ther 8, 412-416 (2009).

Schneppenheim, R. et al. Germline Nonsense Mutation and Somatic Inactivation of SMARCA4/BRG1 in a Family with Rhabdoid Tumor Predisposition Syndrome. The American Journal of Human Genetics 86, 279-284 (2010).

Scully, R. Tumors of the ovary and maldeveloped gonads. 2nd Series, Fascicle 16. Washington: AFIP (1979).

Seidman J D: Small Cell Carcinoma of the Ovary of the Hypercalcemic Type: p53 Protein Accumulation and Clinicopathologic Features. Gynecologic Oncology 59:283-287, 1995

Serber, D. W. et al. PloS one 7, e31346 (2012).

Shain, A. H. & Pollack, J. R. The spectrum of SWI/SNF mutations, ubiquitous in human cancers. PLoS One 8, e55119 (2013).

Shen, Y. et al. X-inactivation in female human embryonic stem cells is in a nonrandom pattern and prone to epigenetic alterations. Proceedings of the National Academy of Sciences 105, 4709-4714 (2008).

Shevchenko, A., Henrik Tomas, J. H., sbreve, Olsen, J. V. & Mann, M. In-gel digestion for mass spectrometric characterization of proteins and proteomes. Nature protocols 1, 2856-2860(2007).

Shibata, K. et al. Establishment and characterization of an ovarian yolk sac tumor cell line reveals possible involvement of Nkx2.5 in tumor development. Oncology 74, 104-11 (2008).

Shrimali, R. K., Correa, P. D. & Reed, N. S. Medical oncology 28, 766-70 (2011). Siegel, R., Naishadham, D. & Jemal, A. Cancer statistics, 2013. C A: a cancer journal for clinicians 63, 11-30 (2013).

Stephens B, Anthony S P, Han H, et al: Molecular Characterization of a Patient's Small Cell Carcinoma of the Ovary of the Hypercalcemic Type. Journal of Cancer 3:58-66, 2012

Stricker, T. P. et al. Validation of a prognostic multi-gene signature in high-risk neuroblastoma using the high throughput digital NanoString nCounter system. Mol Oncol 8, 669-78 (2014).

Subramanian A, Tamayo P, Mootha V K, et al: Gene set enrichment analysis: a knowledge-based approach for interpreting genome-wide expression profiles. Proc Natl Acad Sci USA 102:15545-50, 2005

Tiedemann, R. E. et al. Kinome-wide RNAi studies in human multiple myeloma identify vulnerable kinase targets, including a lymphoid-restricted kinase, GRK6. Blood 115, 1594-1604 (2010).

Tsunematsu R, Saito T, Iguchi H, et al: Hypercalcemia due to parathyroid hormone-related protein produced by primary ovarian clear cell adenocarcinoma: case report. Gynecologic oncology 76:218-22, 2000

Tusher, V. G., Tibshirani, R. & Chu, G. Significance analysis of microarrays applied to the ionizing radiation response. Proc Natl Acad Sci USA 98, 5116-21 (2001).

Ulbright T M, Roth L M, Stehman F B, et al: Poorly differentiated (small cell) carcinoma of the ovary in young women: evidence supporting a germ cell origin. Hum Pathol 18:175-84, 1987

Versteege, I. et al. Nature 394, 203-206 (1998).

Vikramjit S. Kanwar J H, Carolyn N. Krasner, Jennifer M. Pearce: Advanced Small Cell Carcinoma of the Ovary in a Seventeen-Year-Old Female, Succesfully Treated with Surgery and Multi-Agent Chemotherapy. Pediatric blood & cancer 50:1060-1062, 2008

Vogelstein, B. et al. Cancer Genome Landscapes. Science 339, 1546-1558 (2013).

Wang X, Wang Q, Ives K L, et al: Curcumin inhibits neurotensin-mediated interleukin-8 production and migration ofHCT116 human colon cancer cells. Clin Cancer Res 12:5346-55, 2006

Wang, K. et al. MapSplice: accurate mapping of RNA-seq reads for splice junction discovery. Nucleic Acids Res 38, e178 (2010).

Wei, D. et al. SNF5/INI1 Deficiency Redefines Chromatin Remodeling Complex Composition During Tumor Development Molecular Cancer Research 10.1158/1541-7786.MCR-14-0005(2014).

Wen, J., Kawamata, Y., Tojo, H., Tanaka, S. & Tachi, C. Expression of whey acidic protein (WAP) genes in tissues other than the mammary gland in normal and transgenic mice expressing mWAP/hGH fusion gene. Molecular reproduction and development 41, 399-406 (1995).

Wiegand, K. C. et al. N Engl J Med 363, 1532-43 (2010).

Wilson, B. G. & Roberts, C. W. Nature Reviews Cancer 11, 481-492 (2011).

Wilson, B. G. et al. Epigenetic antagonism between polycomb and SWI/SNF complexes during oncogenic transformation. Cancer cell 18, 316-328 (2010).

Wilson, B. G. et al. Residual complexes containing SMARCA2 (BRM) underlie the oncogenic drive of SMARCA4 (BRG1) mutation. Mol Cell Biol 34, 1136-44 (2014).

Witkowski, L. et al. Familial rhabdoid tumour 'avant la lettre'—from pathology review to exome sequencing and back again. J Pathol 231, 35-43 (2013).

Witkowski, L. et al. Germline and somatic SMARCA4 mutations characterize small cell carcinoma of the ovary, hypercalcemic type. Nat Genet 46, 438-43 (2014).

Wongtrakoongate, P., Jones, M., Gokhale, P. J. & Andrews, P. W. STELLA facilitates differentiation of germ cell and endodermal lineages of human embryonic stem cells. PLoS One 8, e56893 (2013).

Wu Q J, Guo M, Lu Z M, et al: Detection of human papillomavirus-16 in ovarian malignancy. Br J Cancer 89:672-5, 2003

Wynn D, Everett G D, Boothby R A: Small cell carcinoma of the ovary with hypercalcemia causes severe pancreatitis and altered mental status. Gynecologic oncology 95:716-8, 2004

Xie, L. et al. Kinome-wide siRNA screening identifies molecular targets mediating the sensitivity of pancreatic cancer cells to Aurora kinase inhibitors. Biochemical pharmacology 83, 452-461 (2012).

Young, R. H., Oliva, E. & Scully, R. E. Small cell carcinoma of the ovary, hypercalcemic type: The American journal of surgical pathology 18, 1102-1116 (1994).

Yuka Idei S K, Takahiro Fujimori, Tetsuo Ajiki, Kazuyuki Asaka, Satoshi Takeuchi, Masuto Mochizuki, Tsutomu Chiba, Sakan Maeda: Ovarian Small Cell Carcinoma with K-ras Mutation: A Case Report with Genetic Analysis. Human Pathology 27:77-79, 1996

What is claimed is:

1. A method of treating a subject having small cell carcinoma of the ovary, hypercalcemic type (SCCOHT), or having a germline inactivating mutation in SMARCA4 indicating a genetic predisposition for SCCOHT, the method comprising administering to the subject a histone deacetylase (HDAC) inhibitor.

2. The method of claim 1, wherein the subject has SCCOHT.

3. The method of claim 1, wherein the HDAC inhibitor has affinity for HDAC2.

4. The method of claim 1, wherein the HDAC inhibitor is selected from the group consisting of Romidepsin, Panobinostat, Belinostat, Suberoylanilide Hydroxamic Acid (SAHA), and Entinostat.

5. The method of claim 4, wherein the HDAC inhibitor is Romidepsin.

6. The method of claim 1, wherein the germline inactivating mutation in SMARCA4 comprises a heterozygous nonsense mutation (c.T2935G) of the wild type SMARCA4 gene upstream of the helicase and bromodomains or a frameshift mutation in exon 4 (c.722-735del TCCCGGCCCGGCA) (SEQ ID NO: 1) of the wild type SMARCA4 gene removing all essential SMARCA4 functional domains.

7. The method of claim 1, further comprising treating the subject with an inhibitor of a target gene that is synthetic lethal with the SMARCA4 gene.

8. The method of claim 7, wherein the inhibitor of a target gene that is synthetic lethal with the SMARCA4 gene is an siRNA.

9. The method of claim 7, wherein the target gene that is synthetic lethal with the SMARCA4 gene is selected from the group consisting of ARID1A, SMARCA2, SMARCC1, SMARCD1, SMARCE1, BRD7, SMARCD2, and SMARCB1.

* * * * *